United States Patent
Berberian et al.

(10) Patent No.: US 11,200,433 B2
(45) Date of Patent: Dec. 14, 2021

(54) DETECTION AND CLASSIFICATION SYSTEMS AND METHODS FOR AUTONOMOUS VEHICLE NAVIGATION

(71) Applicant: MOBILEYE VISION TECHNOLOGIES LTD., Jerusalem (IL)

(72) Inventors: Oded Berberian, Jerusalem (IL); Barak Cohen, Modiin (IL)

(73) Assignee: MOBILEYE VISION TECHNOLOGIES LTD., Jerusalem (IL)

(*) Notice: Subject to any disclaimer, the term of this patent is extended or adjusted under 35 U.S.C. 154(b) by 235 days.

(21) Appl. No.: 16/608,589

(22) PCT Filed: May 3, 2018

(86) PCT No.: PCT/US2018/030904
§ 371 (c)(1),
(2) Date: Oct. 25, 2019

(87) PCT Pub. No.: WO2018/204656
PCT Pub. Date: Nov. 8, 2018

(65) Prior Publication Data
US 2020/0184233 A1  Jun. 11, 2020

Related U.S. Application Data

(60) Provisional application No. 62/500,878, filed on May 3, 2017, provisional application No. 62/500,896, filed (Continued)

(51) Int. Cl.
*G06K 9/00* (2006.01)
*G06T 7/12* (2017.01)
(Continued)

(52) U.S. Cl.
CPC ....... *G06K 9/00798* (2013.01); *G06K 9/4633* (2013.01); *G06T 7/12* (2017.01); *G06T 7/74* (2017.01); *G06T 2207/30256* (2013.01)

(58) Field of Classification Search
CPC .......... G06K 9/00798; G06K 9/00805; G06K 9/4633; G06T 7/12; G06T 7/74; G06T 2207/30256
See application file for complete search history.

(56) References Cited

U.S. PATENT DOCUMENTS

| | | | |
|---|---|---|---|
| 2003/0235327 A1* | 12/2003 | Srinivasa | G06K 9/00805 382/104 |
| 2010/0086174 A1* | 4/2010 | Kmiecik | G06T 7/12 382/103 |
| 2011/0063097 A1 | 3/2011 | Naka et al. | |

(Continued)

FOREIGN PATENT DOCUMENTS

| | | |
|---|---|---|
| EP | 0827127 | 3/1998 |
| EP | 2779025 | 9/2014 |
| EP | 2924614 | 9/2015 |

OTHER PUBLICATIONS

Tan, Jun, Jian Li, Xiangjing An, and Hangen He. "Robust curb detection with fusion of 3d-lidar and camera data." Sensors 14, No. 5 (2014): 9046-9073. (Year: 2014).*

(Continued)

*Primary Examiner* — Carol Wang
(74) *Attorney, Agent, or Firm* — Finnegan, Henderson, Farabow, Garrett & Dunner, LLP

(57) ABSTRACT

The present disclosure relates to systems and methods for road edge detection and mapping, for vehicle wheel identification and navigation based thereon, and for classification of objects as moving or non-moving. Such systems and methods may include the use of trained systems, such as one or more neural networks. Further, autonomous vehicle systems may incorporate aspects of one or more of the disclosed systems and methods.

27 Claims, 53 Drawing Sheets

Related U.S. Application Data on May 3, 2017, provisional application No. 62/500,910, filed on May 3, 2017, provisional application No. 62/659,470, filed on Apr. 18, 2018, provisional application No. 62/662,965, filed on Apr. 26, 2018, provisional application No. 62/663,529, filed on Apr. 27, 2018.

(51) Int. Cl.
*G06T 7/73* (2017.01)
*G06K 9/46* (2006.01)

(56) References Cited

U.S. PATENT DOCUMENTS

| | | | |
|---|---|---|---|
| 2011/0085738 A1* | 4/2011 | Kitamura | G06T 5/002 382/199 |
| 2011/0235861 A1* | 9/2011 | Nitanda | G06K 9/00798 382/103 |

OTHER PUBLICATIONS

International Search Report and Written Opinion dated Sep. 12, 2018, in International Application No. PCT/US2018/030904 (18 pgs.).

Oniga, Florin, Sergiu Nedevschi, and Marc Michael Meinecke. "Curb detection based on a multi-frame persistence map for urban driving scenarios." *2008 11th International IEEE Conference on Intelligent Transportation Systems*. IEEE, 2008.

Strygulec, Sarah, et al. "Road boundary detection and tracking using monochrome camera images." *Proceedings of the 16th International Conference on Information Fusion*. IEEE, 2013.

Nedevschi, Sergiu, et al. "3D lane detection system based on stereovision." *Proceedings. The 7th International IEEE Conference on Intelligent Transportation Systems (IEEE Cat. No. 04TH8749)*. IEEE, 2004.

\* cited by examiner

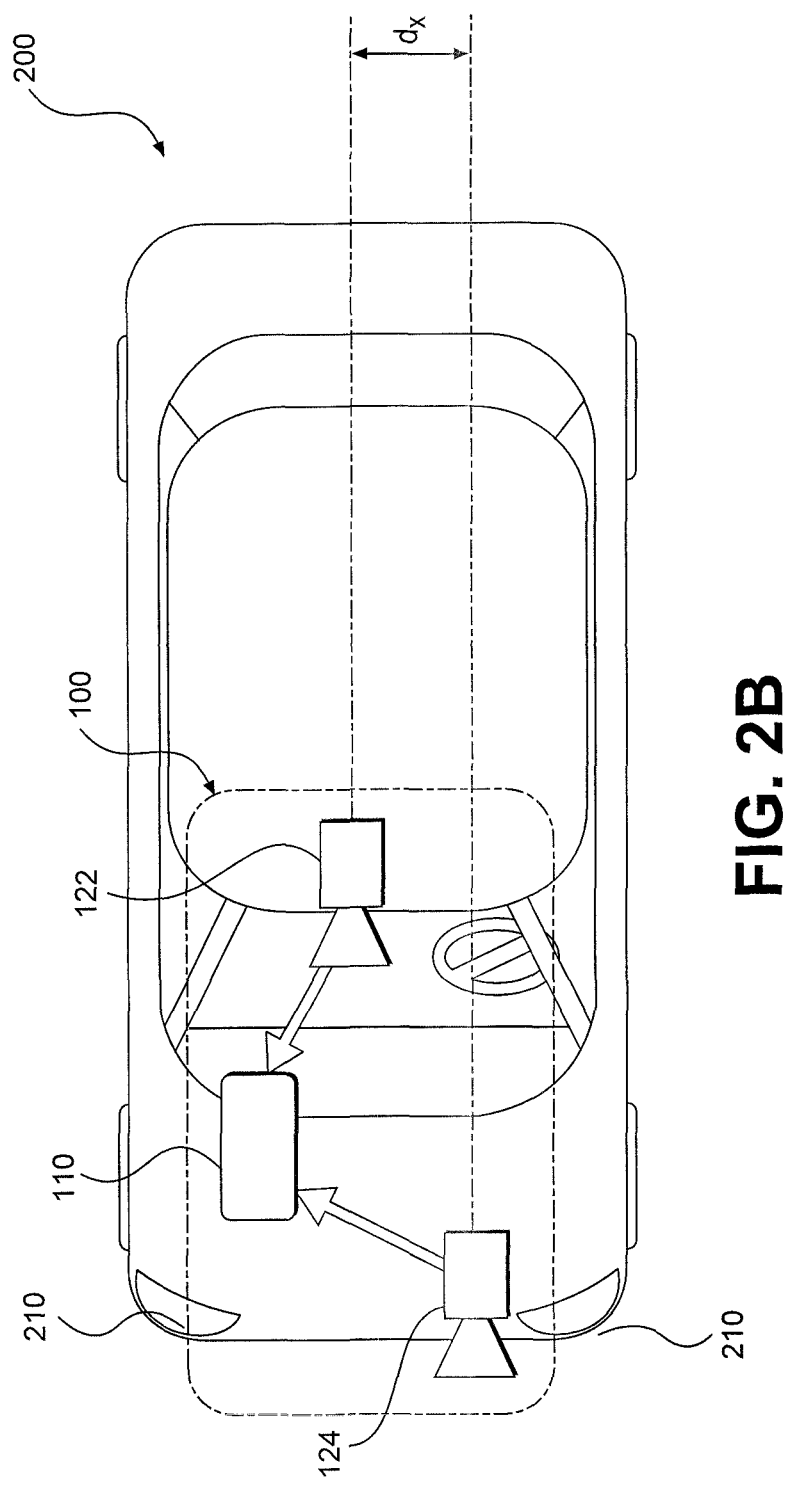

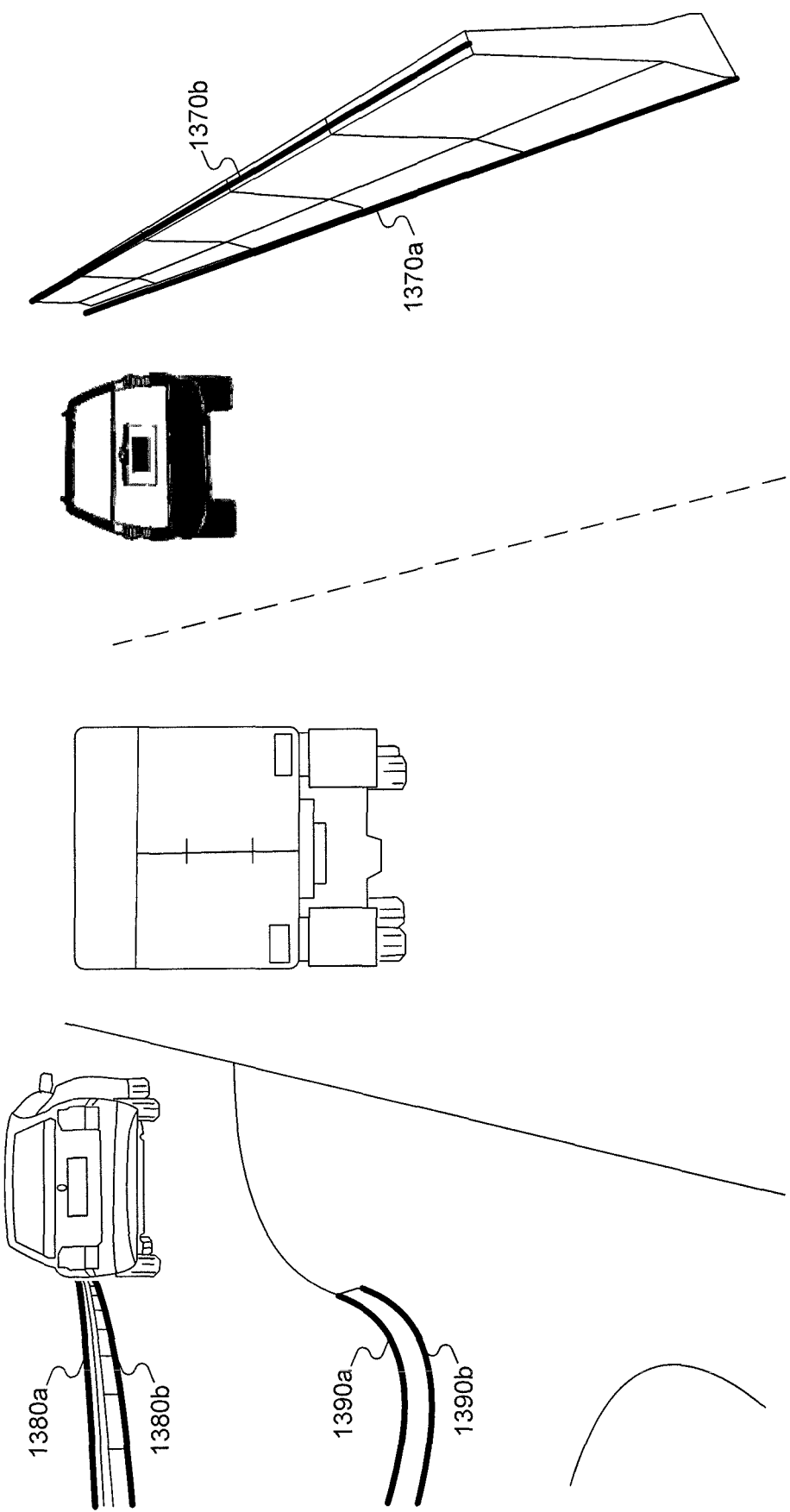

DETECTION AND CLASSIFICATION SYSTEMS AND METHODS FOR AUTONOMOUS VEHICLE NAVIGATION

CROSS REFERENCES TO RELATED APPLICATIONS

This application is a National Stage Entry of International Application No. PCT/US2018/030904, filed May 3, 2018, which is based on and claims the benefit of priority of U.S. Provisional Patent Application No. 62/500,878, filed on May 3, 2017; U.S. Provisional Patent Application No. 62/500,896, filed on May 3, 2017; U.S. Provisional Patent Application No. 62/500,910, filed on May 3, 2017; U.S. Provisional Patent Application No. 62/659,470, filed on Apr. 18, 2018; U.S. Provisional Patent Application No. 62/662,965, filed on Apr. 26, 2018; U.S. Provisional Patent Application No. 62/663,529, filed Apr. 27, 2018. All of the foregoing applications are incorporated herein by reference in their entirety entireties.

BACKGROUND

Technical Field

The present disclosure relates generally to systems and methods for detecting and classifying aspects of an environment of a vehicle. In particular, the disclosure relates to systems and methods for detecting a road boundary edge, detecting a wheel of a vehicle, and detecting and classifying objects as moving or not moving.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from on road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The disclosed systems may also provide for constructing and navigating with a crowdsourced sparse map. Other disclosed systems may use relevant analysis of images to perform localization that may supplement navigation with a sparse map. The navigational response may also take into account other data including, for example, global positioning system (GPS) data, sensor data (e.g., from an accelerometer, a speed sensor, a suspension sensor, etc.), and/or other map data.

In one embodiment, a system for mapping features of a roadway traversed by a host vehicle may comprise at least one processor programmed to receive, from an image capture device, at least one image representative of an environment of the host vehicle, wherein the at least one image includes a plurality of image features representing a corresponding plurality of road boundary edges; identify, based on analysis of the plurality of image features, a predetermined number of vertical functions and a predetermined number of horizontal functions that, when taken together, map to each of the plurality of image features; merge the predetermined number of vertical functions and the predetermined number of horizontal functions into at least one curve representing the plurality of road boundary edges; and output the at least one curve representing the plurality of road boundary edges.

In one embodiment, a method for mapping features of a roadway traversed by a host vehicle may comprise receiving, from an image capture device, at least one image representative of an environment of the host vehicle, wherein the at least one image includes a plurality of image features representing a corresponding plurality of road boundary edges; identifying, based on analysis of the plurality of image features, a predetermined number of vertical functions and a predetermined number of horizontal functions that, when taken together, map to each of the plurality of image features; merging the predetermined number of vertical functions and the predetermined number of horizontal functions into at least one curve representing the plurality of road boundary edges; and outputting the at least one curve representing the plurality of road boundary edges.

In one embodiment, a system for mapping features of a roadway traversed by a host vehicle may comprise at least one processor programmed to receive, from an image capture device, at least one image representative of an environment of the host vehicle. The at least one image may include a plurality of image features representing a corresponding plurality of road boundary edges. The at least one processor may be further programmed to identify, based on analysis of the plurality of image features, a predetermined number of vertical functions and a predetermined number of horizontal functions that, when taken together, map to each of the plurality of image features and output the identified predetermined number of vertical functions and the identified predetermined number of horizontal functions mapping to the plurality of image features representative of the corresponding plurality of road edge boundaries.

In one embodiment, a system for navigating a host vehicle may comprise at least one processor programmed to receive, from at least one image capture device, a plurality of images representative of an environment of the host vehicle; identify in a first image from among the plurality of images a representation of a wheel of a target vehicle; and identify in a second image from among the plurality of images another representation of the wheel of the target vehicle. The second image may be captured by the at least one image capture device after the first image. The at least one processor may be further programmed to cause at least one adjustment of a navigational actuator of the host vehicle in response to identification of a representation of the wheel of the target vehicle in the first image and in the second image.

In one embodiment, a computer-implemented method for navigating a host vehicle may comprise receiving, from at least one image capture device, a plurality of images representative of an environment of the host vehicle; identifying in a first image from among the plurality of images a representation of a wheel of a target vehicle; identifying in a second image from among the plurality of images another representation of the wheel of the target vehicle, wherein the second image was captured by the at least one image capture device after the first image; and causing at least one adjustment of a navigational actuator of the host vehicle in response to identification of a representation of the wheel of the target vehicle in the first image and in the second image.

In one embodiment, a system for classifying objects in an environment of a host vehicle may comprise at least one processor programmed to receive, from at least one image capture device of the host vehicle, a plurality of images representative of the environment of the host vehicle; provide, to an evaluator system, a first image of the plurality of images and a second image from the plurality of images, the second image being captured later than the first image; provide, to the evaluator system, at least one image segment for the first image and at least one corresponding image segment for the second image, the evaluator system being configured to provide an output, based on a comparison between image features in the at least one image segment of the first image and image features in the at least one image segment of the second image, indicative of whether the at least one image segment is associated with moving image features; and determine, based on the output, a classification of the image segment as at least one of moving or not moving.

In one embodiment, a method for classifying objects in an environment of a host vehicle may comprise receiving, from at least one image capture device of the host vehicle, a plurality of images representative of the environment of the host vehicle; providing, to an evaluator system, a first image of the plurality of images and a second image from the plurality of images, the second image being captured later than the first image; providing, to the evaluator system, at least one image segment for the first image and at least one corresponding image segment for the second image, the evaluator system being configured to provide an output, based on a comparison between image features in the at least one image segment of the first image and image features in the at least one image segment of the second image, indicative of whether the at least one image segment is associated with moving image features; and determining, based on the output, a classification of the image segment as at least one of moving or not moving.

In one embodiment, a system for classifying objects in an environment of a host vehicle may comprise at least one processor programmed to receive, from at least one image capture device of the host vehicle, a plurality of images representative of the environment of the host vehicle, and for an image segment defining a particular image area, provide to a first evaluator system a portion of a first image, from among the plurality of images, corresponding to the image segment and provide to the first evaluator system a portion of a second image, from the plurality of images, corresponding to the image segment. The first evaluator system may be configured to provide a first output, based on a comparison between image features in the provided portion of the first image and image features in the provided portion of the second image, indicative of whether the image segment is associated with moving image features. The at least one processor may be further programmed to provide to a second evaluator system the portion of the first image corresponding to the image segment and provide to the second evaluator system the portion of the second image corresponding to the image segment. The second evaluator system may be configured to provide a second output, based on a comparison between image features in the provided portion of the first image and image features in the provided portion of the second image, indicative of whether the image segment is associated with stationary image features. The at least one processor may be further programmed to determine, based on the first output and the second output, a classification of the image segment as at least one of moving or not moving.

In one embodiment, a system for classifying objects in an environment of a host vehicle may comprise at least one processor programmed to receive, from at least one image capture device of the host vehicle, a plurality of images representative of the environment of the host vehicle, and for a plurality of image segments defining a particular image area, provide to a first evaluator system a portion of a first image, from among the plurality of images, corresponding to the plurality of image segments and provide to the first evaluator system a portion of a second image, from the plurality of images, corresponding to the plurality of image segments. The first evaluator system may be configured to provide first outputs, based on a comparison between image features in the provided portion of the first image and image features in the provided portion of the second image, indicative of whether the image segments are associated with moving image features. The at least one processor may be further programmed to provide to a second evaluator system the portion of the first image corresponding to the plurality of image segments and provide to the second evaluator system the portion of the second image corresponding to the plurality of image segments. The second evaluator system may be configured to provide second outputs, based on a comparison between image features in the provided portion of the first image and image features in the provided portion of the second image, indicative of whether the image segments are associated with stationary image features. The at least one processor may be further programmed to determine a composite output for the particular image area based on the first outputs and the second outputs and determine, based on the composite output, a classification of the particular image area as at least one of moving or not moving.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2B is a diagrammatic top view representation of the vehicle and system shown in FIG. 2A consistent with the disclosed embodiments.

FIG. 13H illustrates another example of using an algorithm of the present disclosure for road edge detection consistent with the disclosed embodiments.

DETAILED DESCRIPTION

Figure 1:
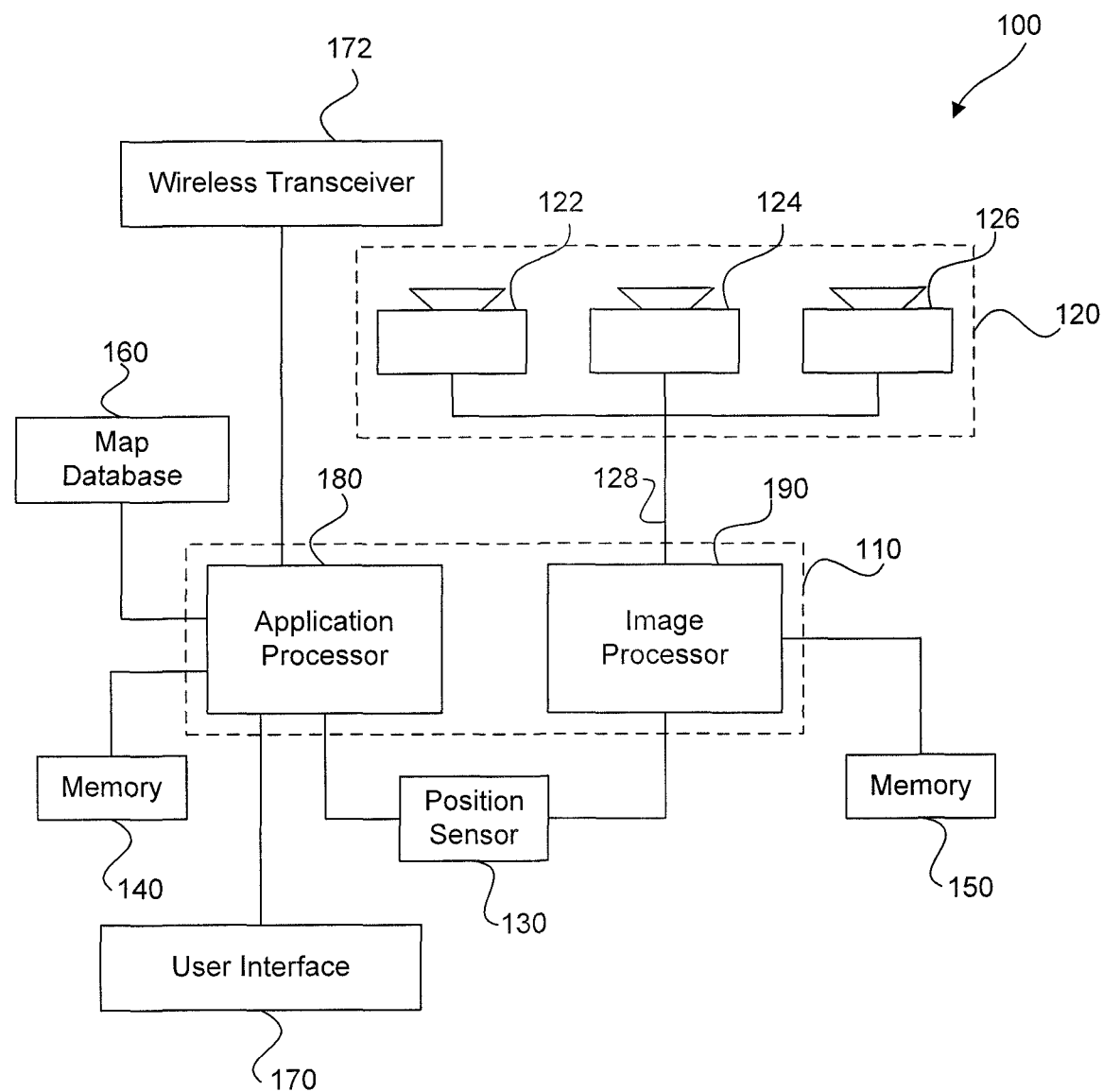
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
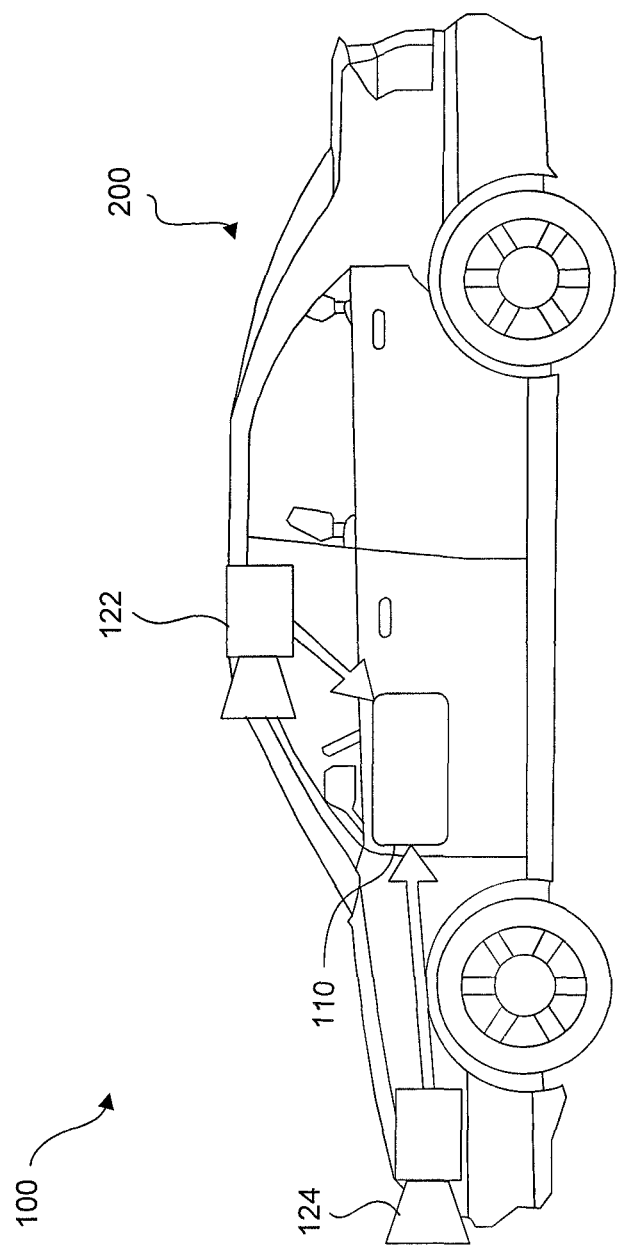
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and/or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
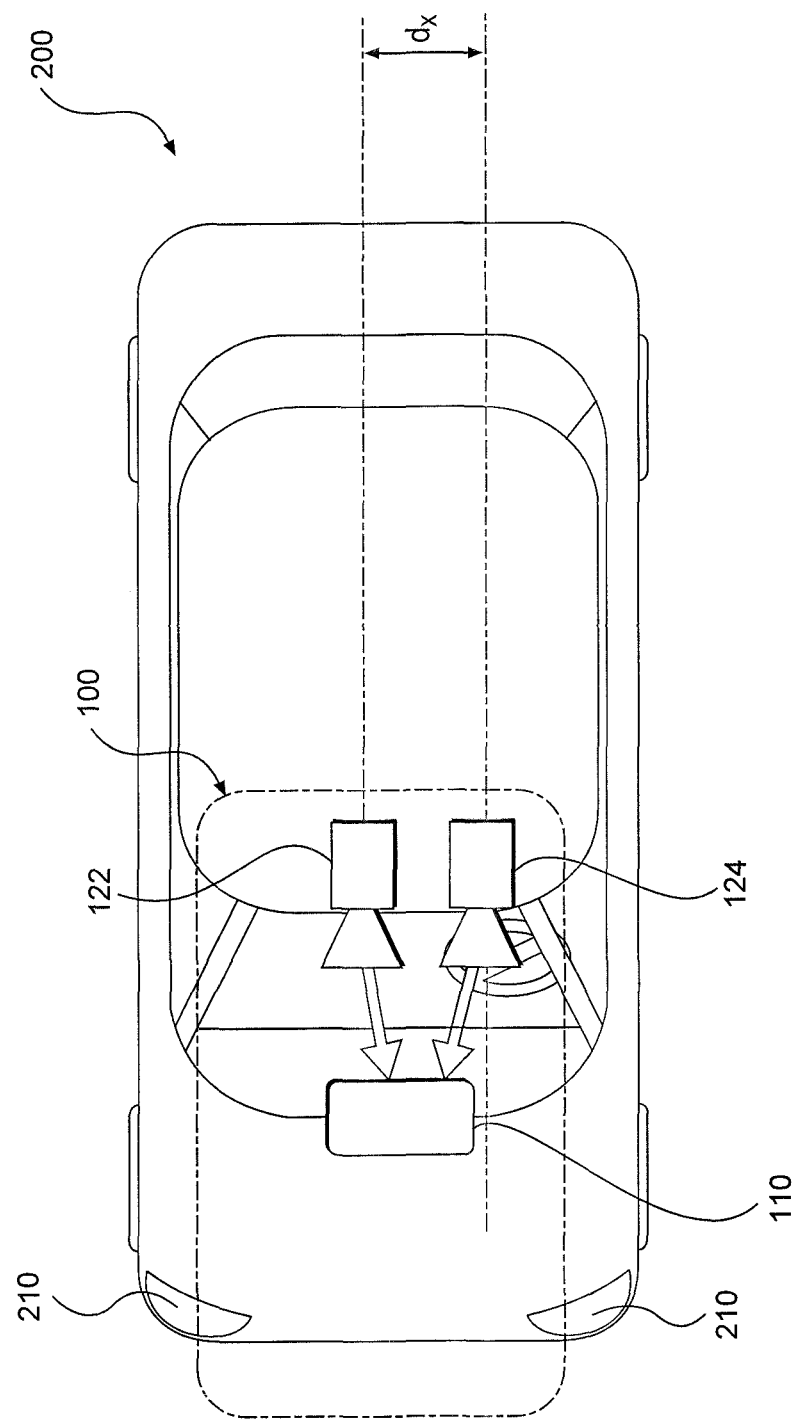
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
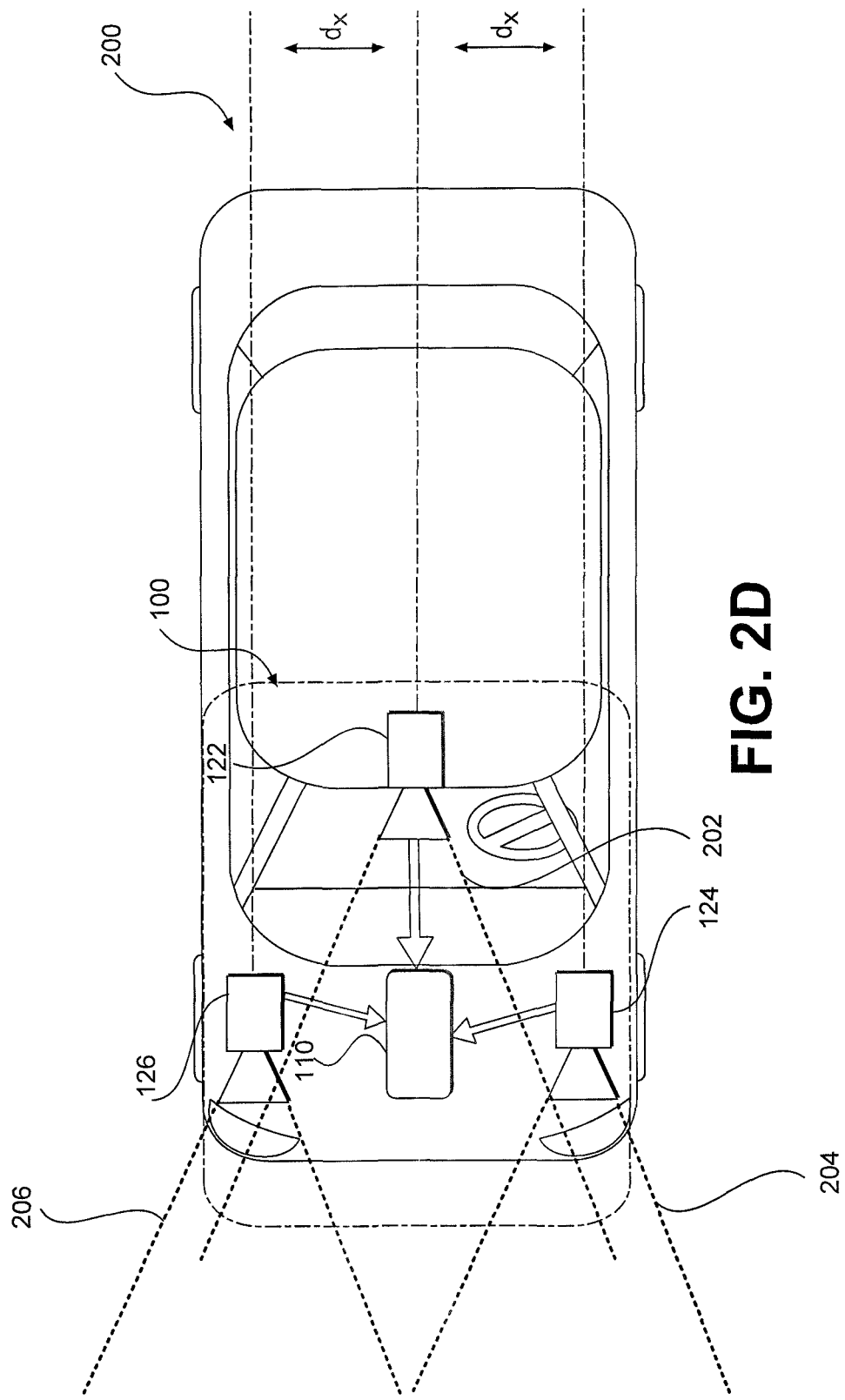
FIG. 2D is a diagrammatic top view representation of yet another embodiment of a vehicle including a system consistent with the disclosed embodiments.
Figure 2E:
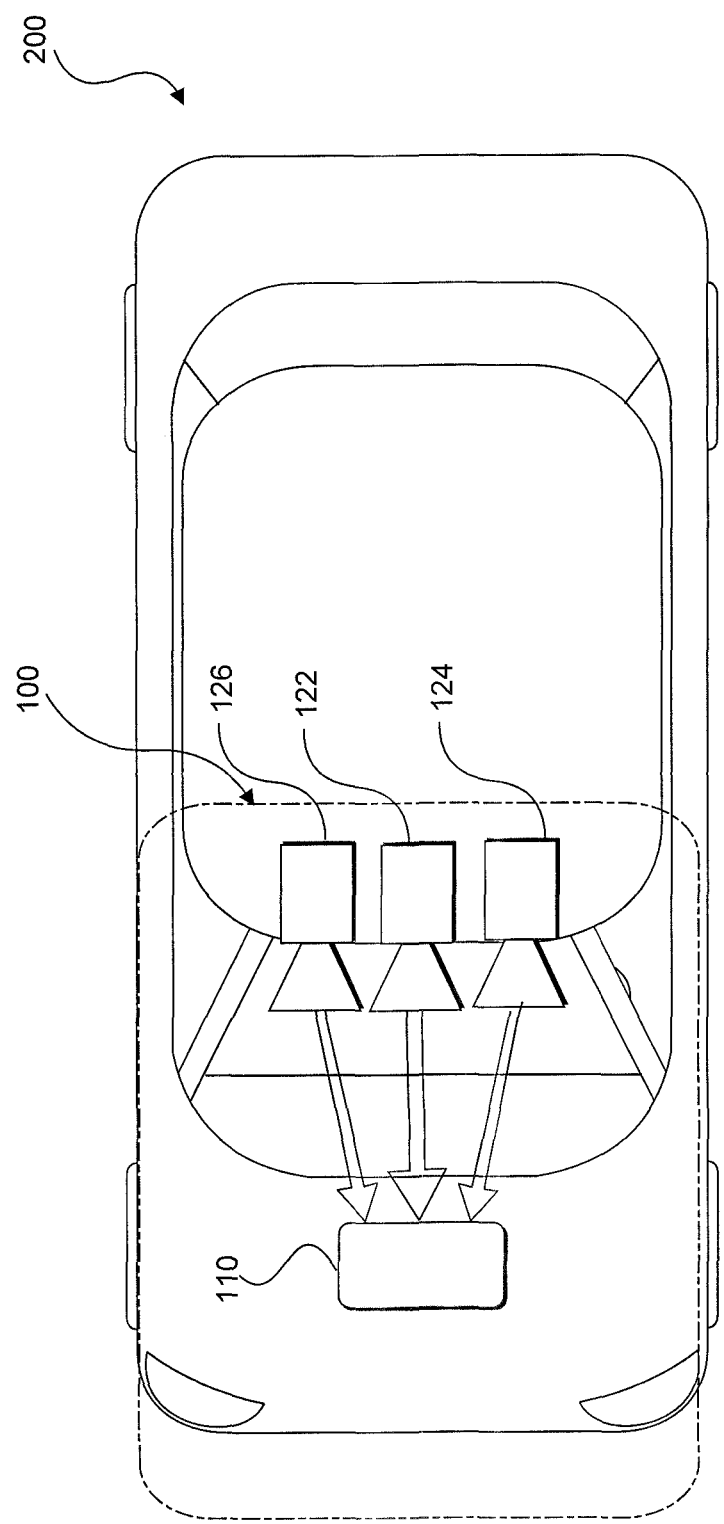
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., HxV=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
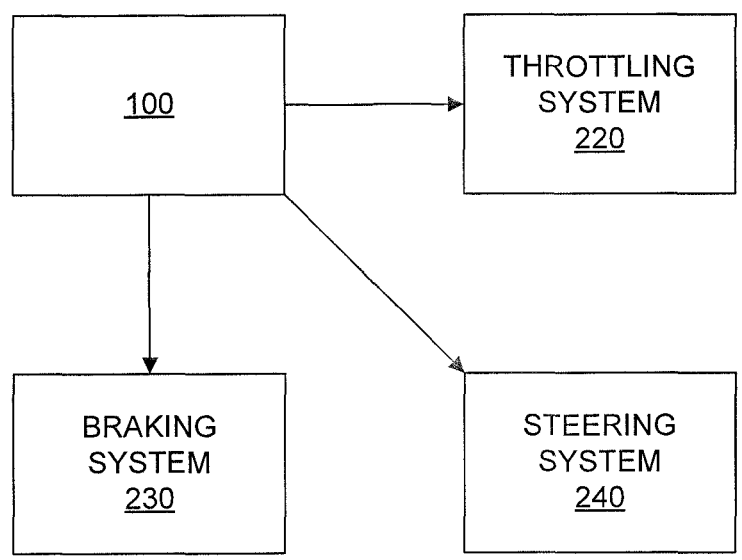
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
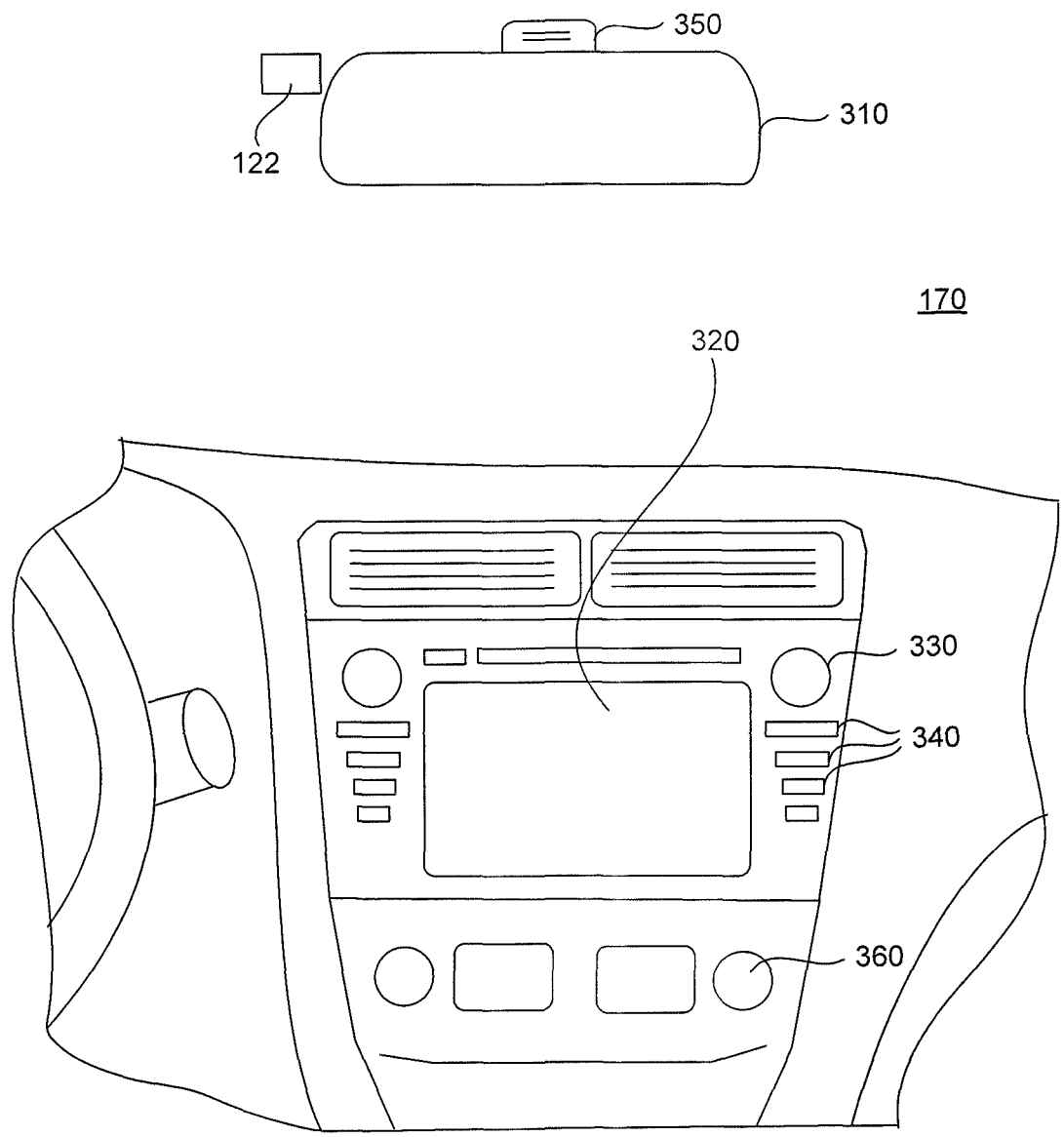
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
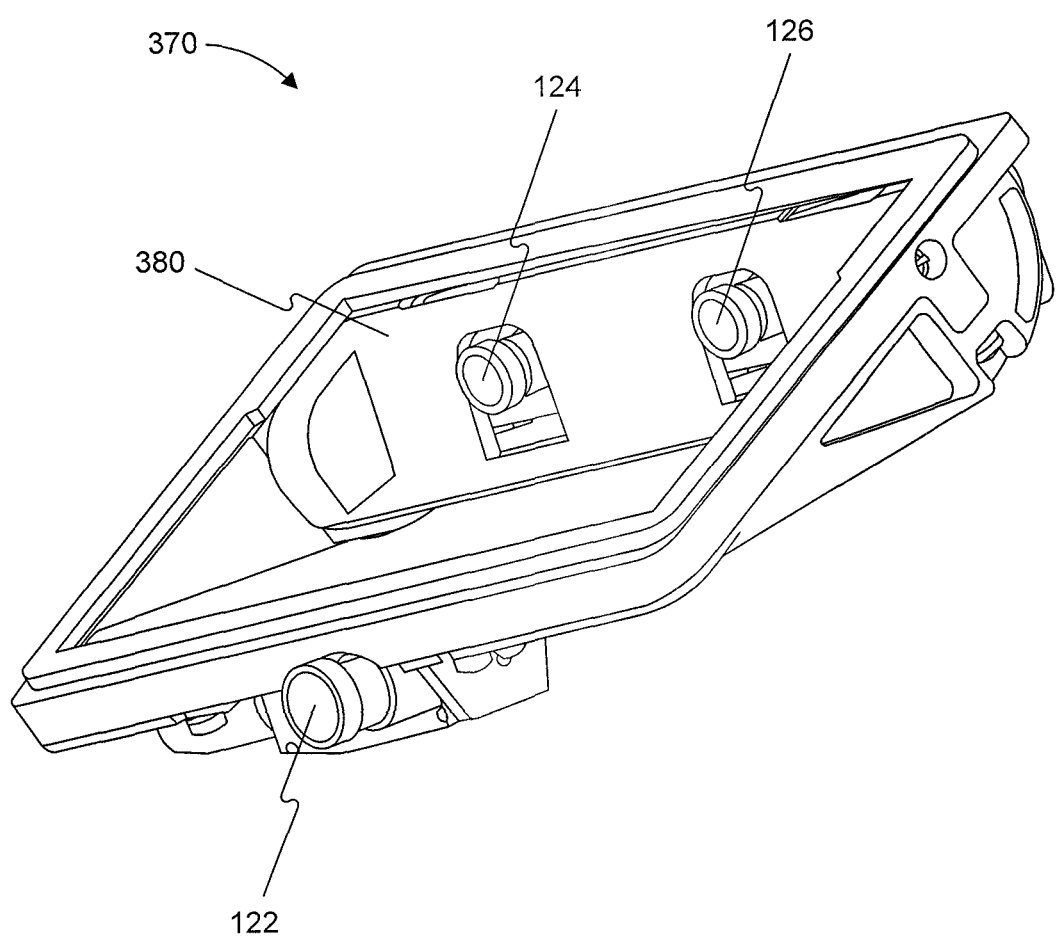
FIG. 3B is an illustration of an example of a camera mount that is configured to be positioned behind a rearview mirror and against a vehicle windshield consistent with the disclosed embodiments.
Figure 3C:
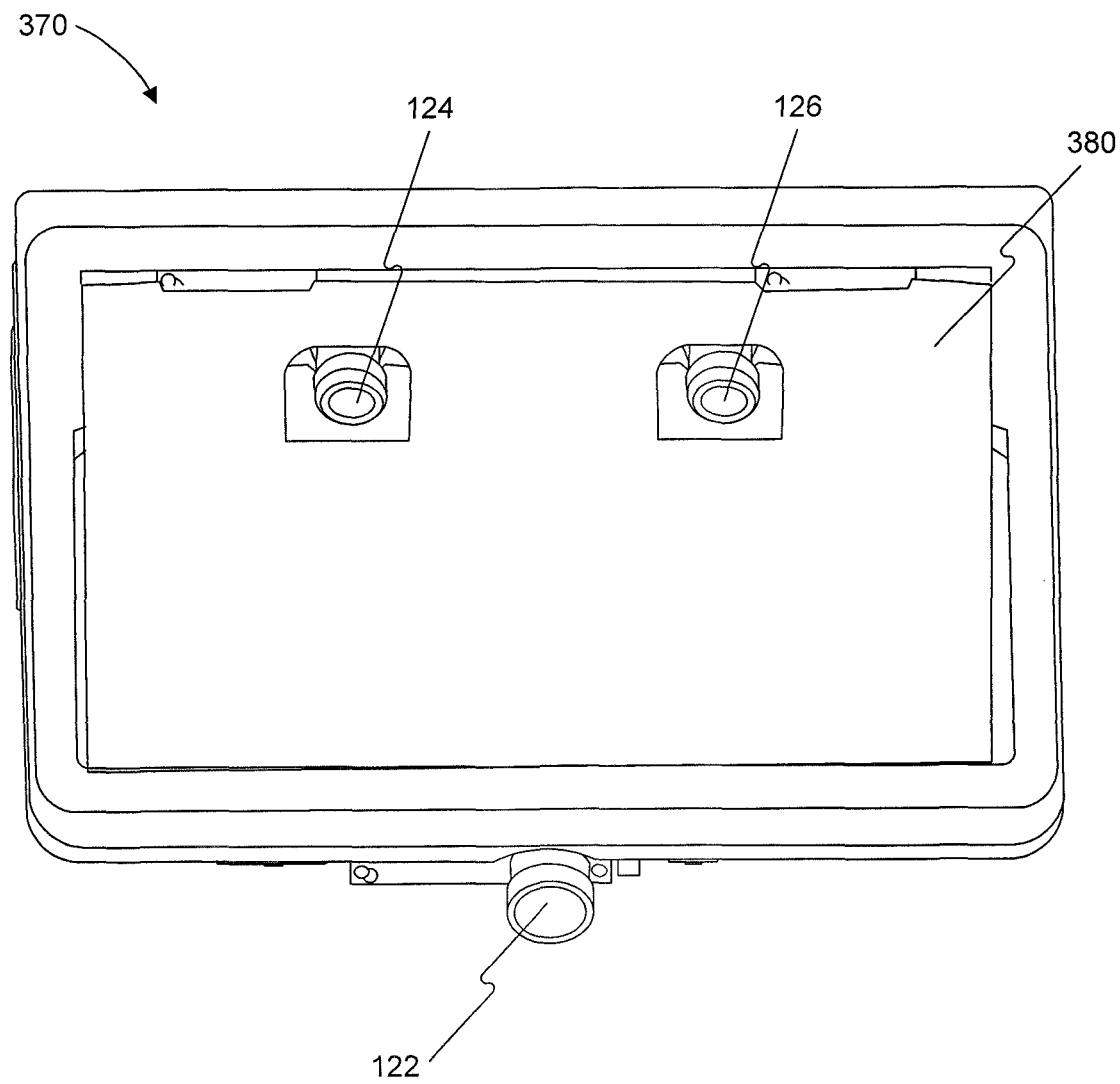
FIG. 3C is an illustration of the camera mount shown in FIG. 3B from a different perspective consistent with the disclosed embodiments.
Figure 3D:
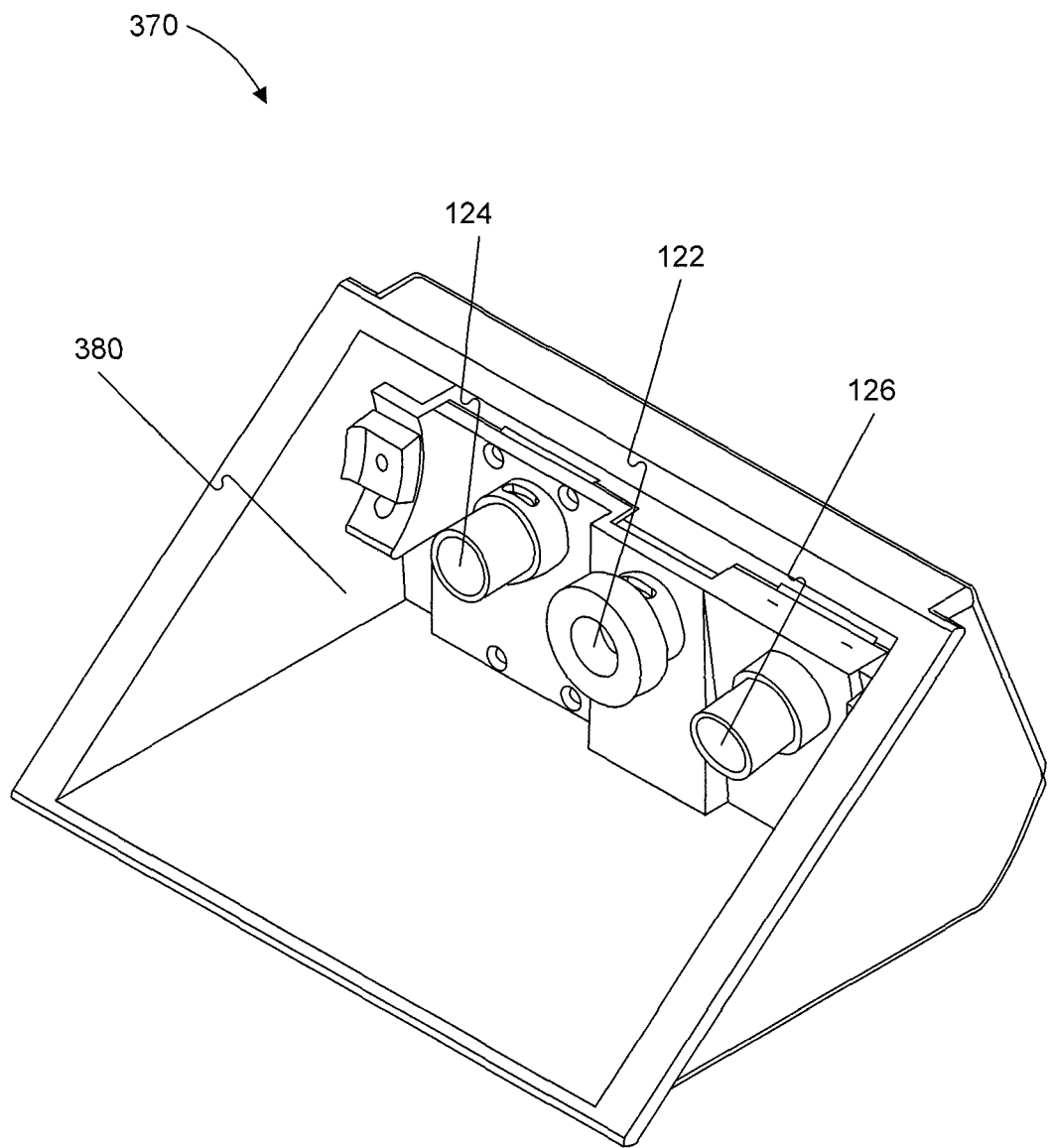
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
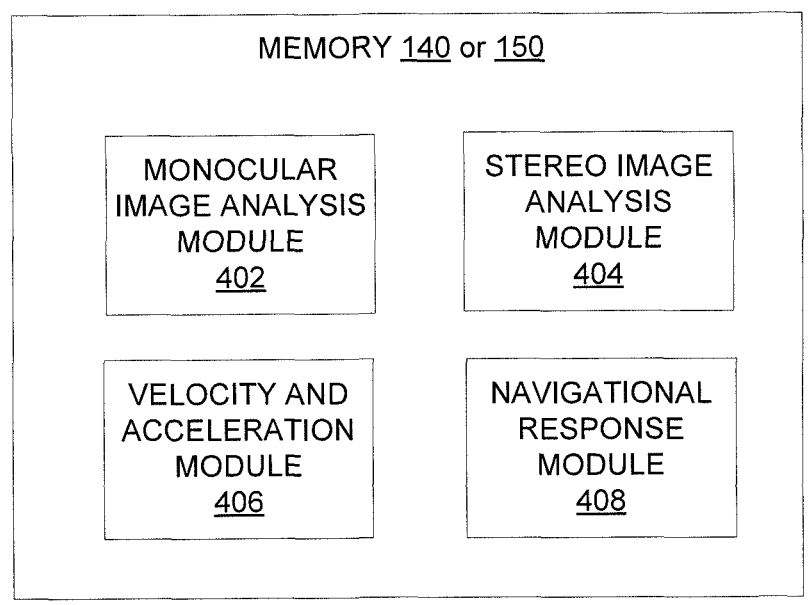
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
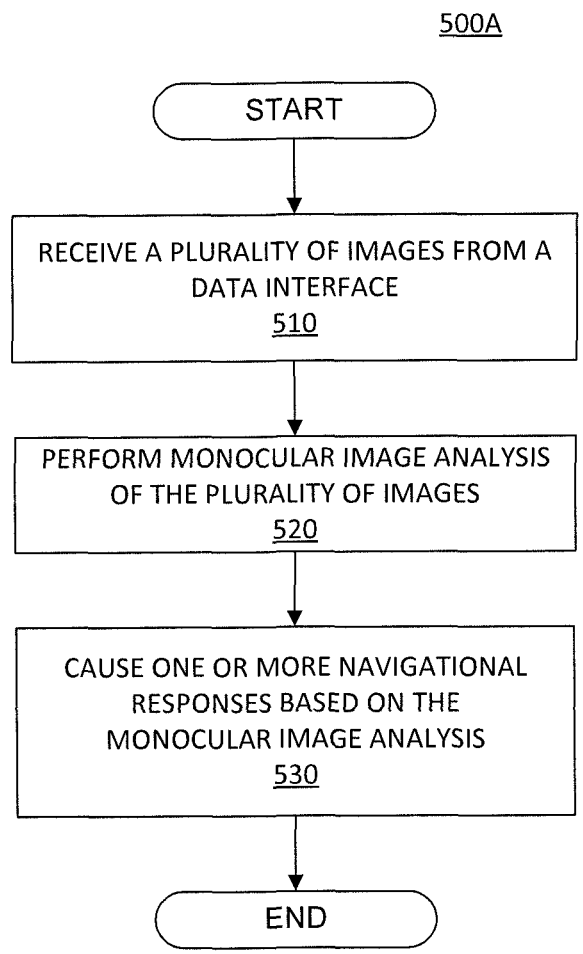
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
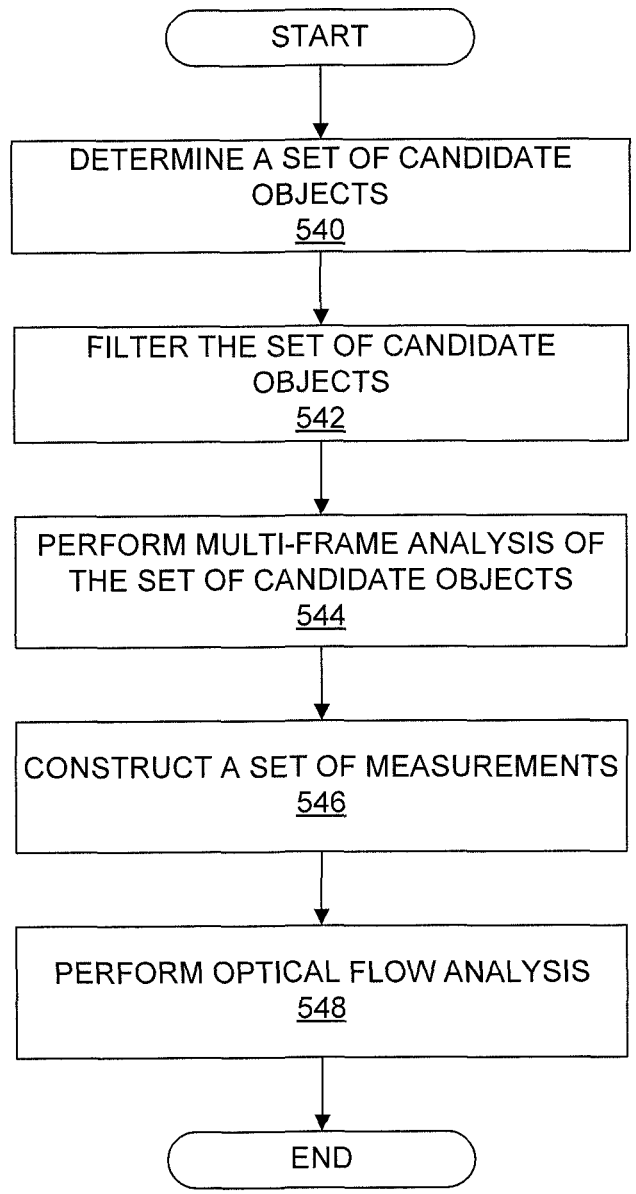
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
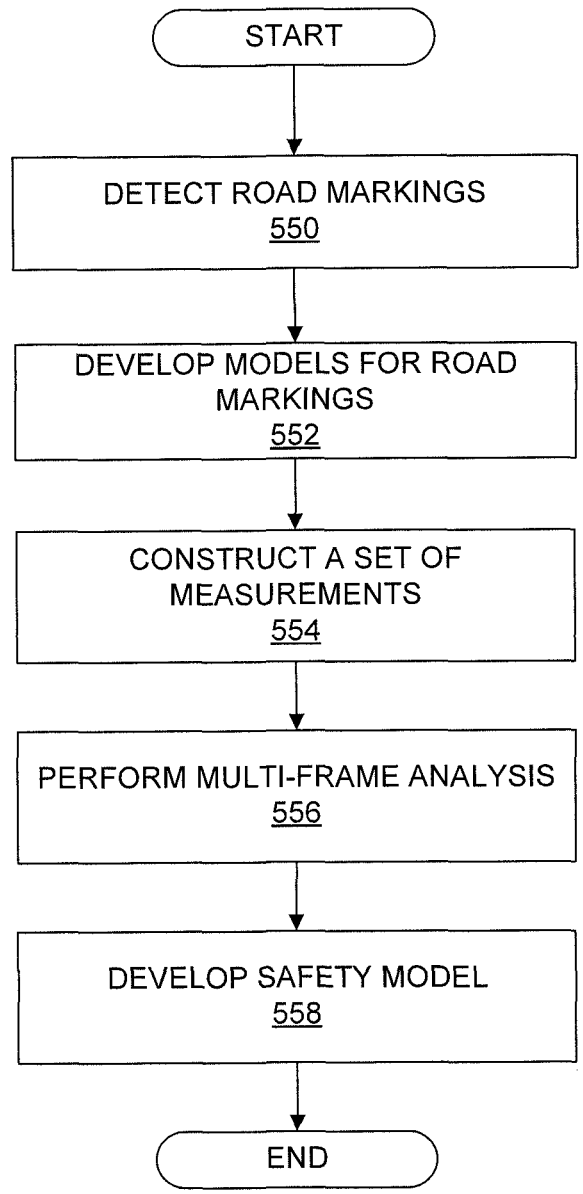
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
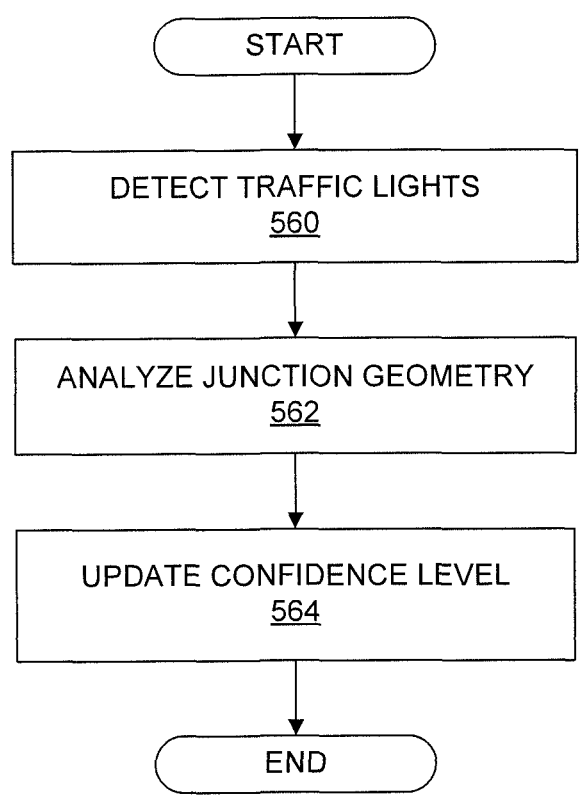
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
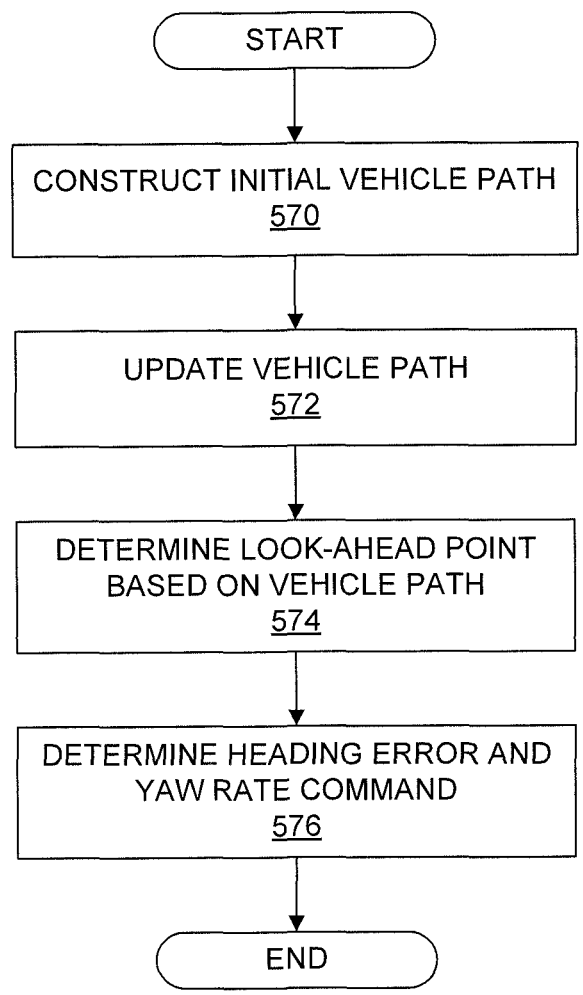
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance d, between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
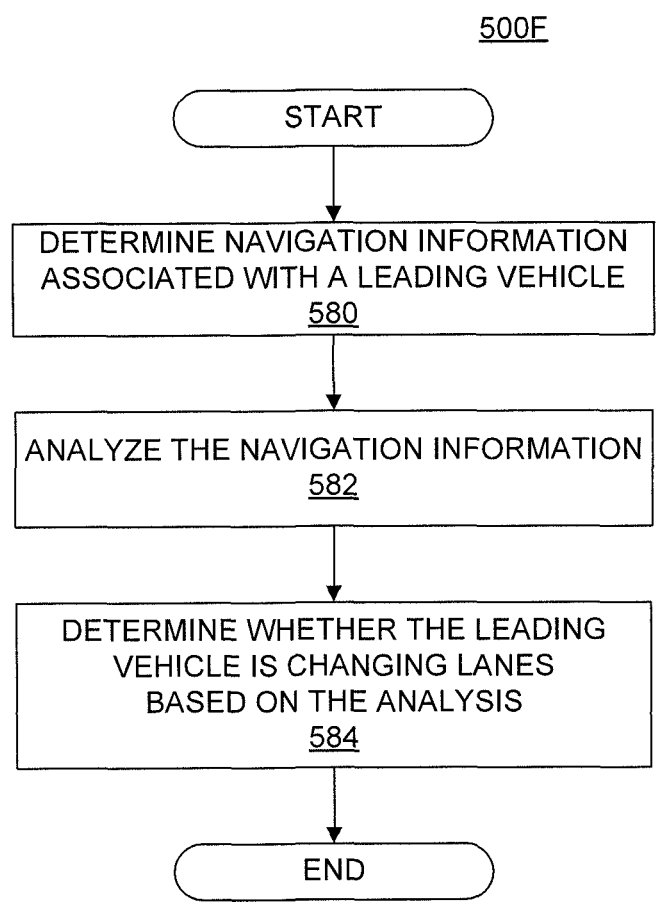
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_s)$, where $\delta_x$ represents the lateral distance traveled and $\delta_x$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
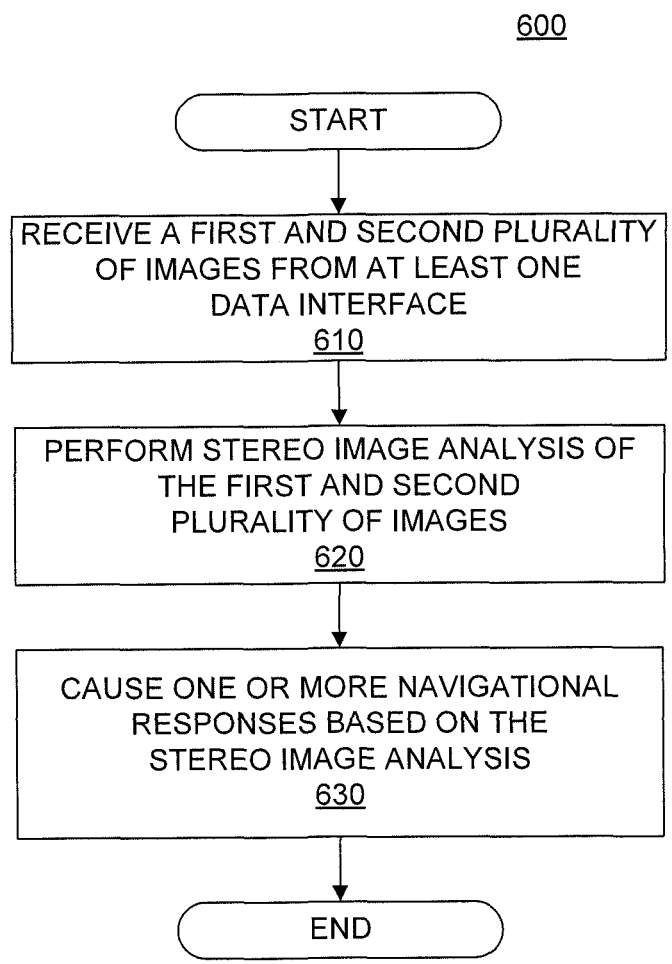
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
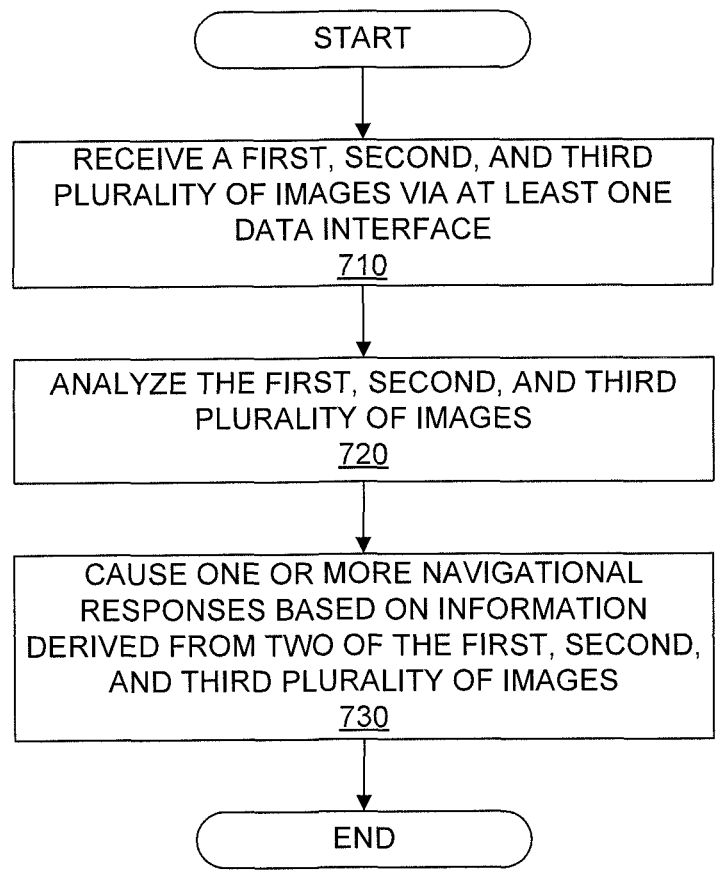
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Analysis of captured images may allow for the generation and use of a sparse map model for autonomous vehicle navigation. In addition, analysis of captured images may allow for the localization of an autonomous vehicle using identified lane markings. Embodiments for detection of particular characteristics based on one or more particular analyses of captured images and for navigation of an autonomous vehicle using a sparse map model will be discussed below with reference to FIGS. 8-28.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Road Feature Representation

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8A:
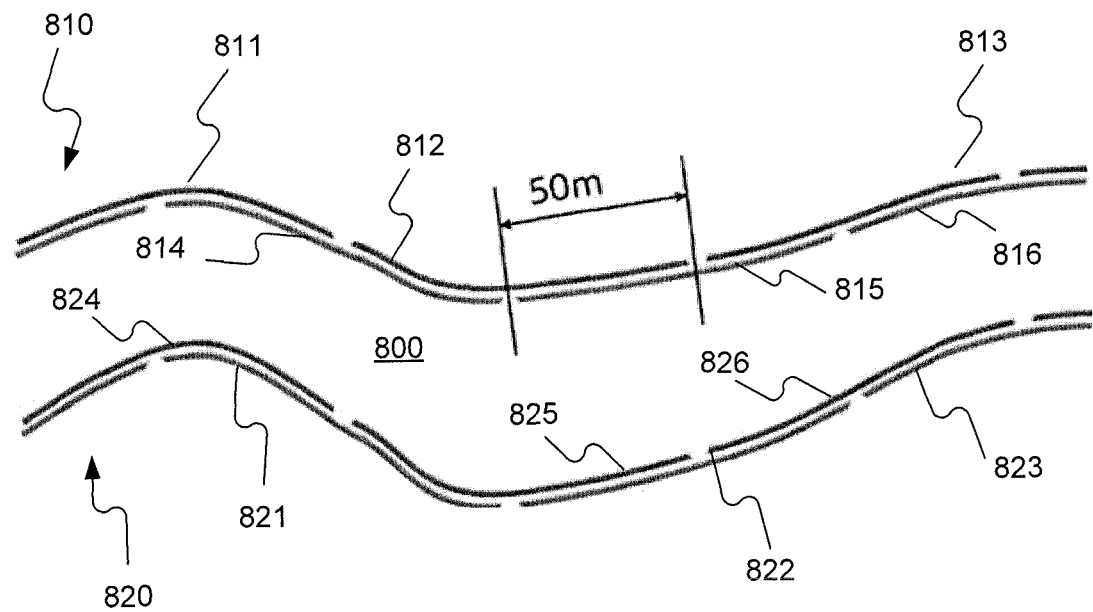
FIG. 8A illustrates a polynomial representation of a portions of a road segment consistent with the disclosed embodiments.
Figure 9A:
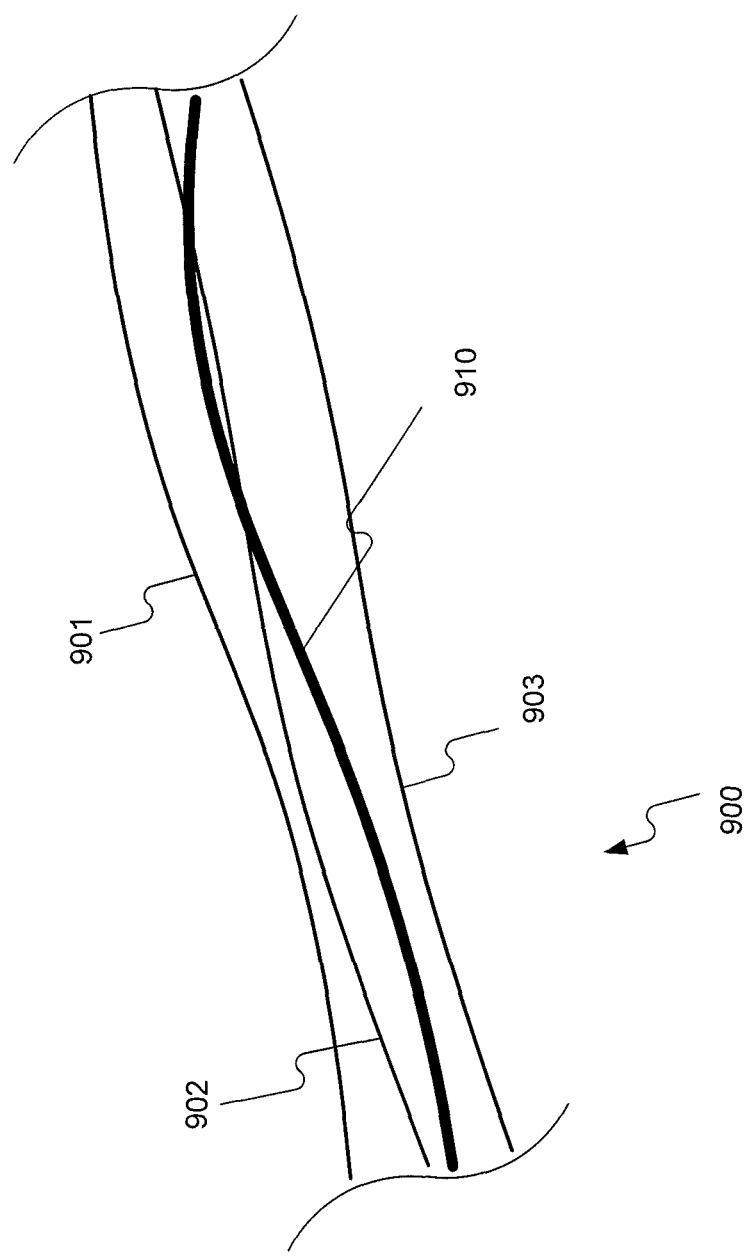
FIG. 9A shows polynomial representations of trajectories consistent with the disclosed embodiments.

In addition to target trajectories and identified landmarks, a sparse may include information relating to various other road features. For example, FIG. 9A illustrates a representation of curves along a particular road segment that may be stored in a sparse map. In some embodiments, a single lane of a road may be modeled by a three-dimensional polynomial description of left and right sides of the road. Such polynomials representing left and right sides of a single lane are shown in FIG. 8A. Regardless of how many lanes a road may have, the road may be represented using polynomials in a way similar to that illustrated in FIG. 8A. For example, left and right sides of a multi-lane road may be represented by polynomials similar to those shown in FIG. 8A, and intermediate lane markings included on a multi-lane road (e.g., dashed markings representing lane boundaries, solid yellow lines representing boundaries between lanes traveling in different directions, etc.) may also be represented using polynomials such as those shown in FIG. 8A.

As shown in FIG. 8A, a lane 800 may be represented using polynomials (e.g., a first order, second order, third order, or any suitable order polynomials). For illustration, lane 800 is shown as a two-dimensional lane and the polynomials are shown as two-dimensional polynomials. As depicted in FIG. 8A, lane 800 includes a left side 810 and a right side 820. In some embodiments, more than one polynomial may be used to represent a location of each side of the road or lane boundary. For example, each of left side 810 and right side 820 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 810 and right side 820 may be represented by a plurality of third order polynomials separated into segments of about 100 meters in length (an example of the first predetermined range), and overlapping each other by about 50 meters. The polynomials representing the left side 810 and the right side 820 may or may not have the same order. For example, in some embodiments, some polynomials may be second order polynomials, some may be third order polynomials, and some may be fourth order polynomials.

In the example shown in FIG. 8A, left side 810 of lane 800 is represented by two groups of third order polynomials. The first group includes polynomial segments 811, 812, and 813. The second group includes polynomial segments 814, 815, and 816. The two groups, while substantially parallel to each other, follow the locations of their respective sides of the road. Polynomial segments 811, 812, 813, 814, 815, and 816 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 8A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 8A, right side 820 of lane 800 is further represented by a first group having polynomial segments 821, 822, and 823 and a second group having polynomial segments 824, 825, and 826.

Figure 8B:
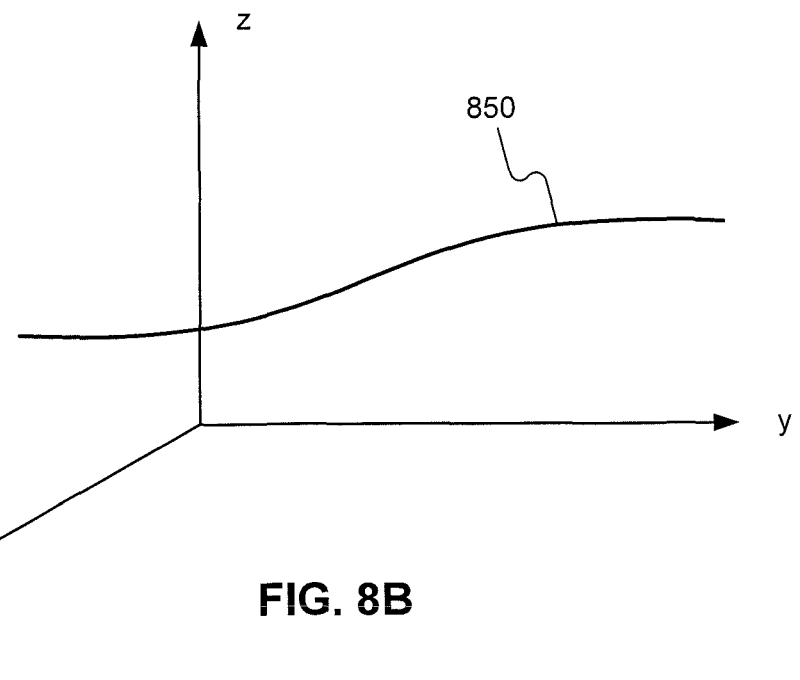
FIG. 8B illustrates a curve in three-dimensional space representing a target trajectory of a vehicle, for a particular road segment, included in a sparse map consistent with the disclosed embodiments.

Returning to the target trajectories of a sparse map, FIG. 8B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in a sparse map may be represented by one or more three-dimensional polynomials, like the three-dimensional polynomial 850 shown in FIG. 8B. A sparse map may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in a sparse map, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

A sparse map may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

FIG. 9A shows polynomial representations of trajectories captured during a process of building or maintaining a sparse map. A polynomial representation of a target trajectory included in a sparse map may be determined based on two or more reconstructed trajectories of prior traversals of vehicles along the same road segment. In some embodiments, the polynomial representation of the target trajectory included in a sparse map may be an aggregation of two or more reconstructed trajectories of prior traversals of vehicles along the same road segment. In some embodiments, the polynomial representation of the target trajectory included in a sparse map may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 9A, a road segment 900 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 9A, a first reconstructed trajectory 901 may be determined based on data received from a first vehicle traversing road segment 900 at a first time period (e.g., day 1), a second reconstructed trajectory 902 may be obtained from a second vehicle traversing road segment 900 at a second time period (e.g., day 2), and a third reconstructed trajectory 903 may be obtained from a third vehicle traversing road segment 900 at a third time period (e.g., day 3). Each trajectory 901, 902, and 903 may be represented by a polynomial, such as a three-dimensional polynomial. It should be noted that in some embodiments, any of the reconstructed trajectories may be assembled onboard the vehicles traversing road segment 900.

Additionally, or alternatively, such reconstructed trajectories may be determined on a server side based on information received from vehicles traversing road segment 900. For example, in some embodiments, vehicles 200 may transmit data to one or more servers relating to their motion along road segment 900 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 900 at a later time based on the first, second, and third trajectories 901, 902, and 903. While a target trajectory may be associated with a single prior traversal of a road segment, in some embodiments, each target trajectory included in a sparse map may be determined based on two or more reconstructed trajectories of vehicles traversing the same road segment. In FIG. 9A, the target trajectory is represented by 910. In some embodiments, the target trajectory 910 may be generated based on an average of the first, second, and third trajectories 901, 902, and 903. In some embodiments, the target trajectory 910 included in a sparse map may be an aggregation (e.g., a weighted combination) of two or more reconstructed trajectories. Aligning drive data to construct trajectories is further discussed below with respect to FIG. 29.

Figure 9B:
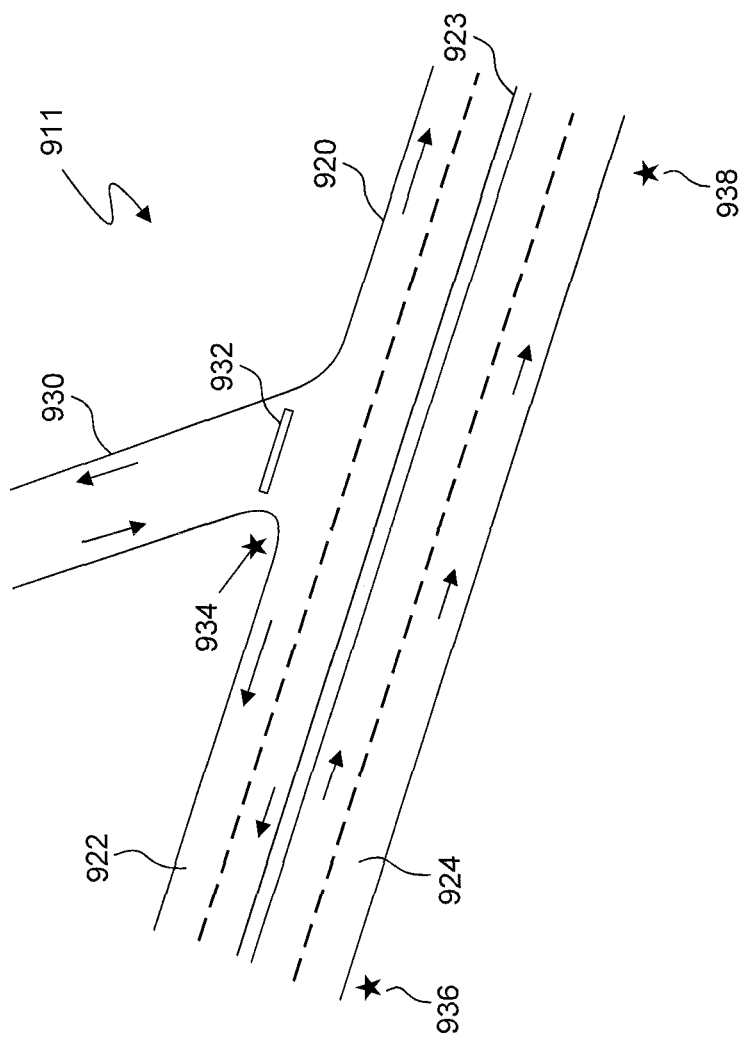
FIGS. 9B and 9C show target trajectories along a multi-lane road consistent with disclosed embodiments.
Figure 9C:
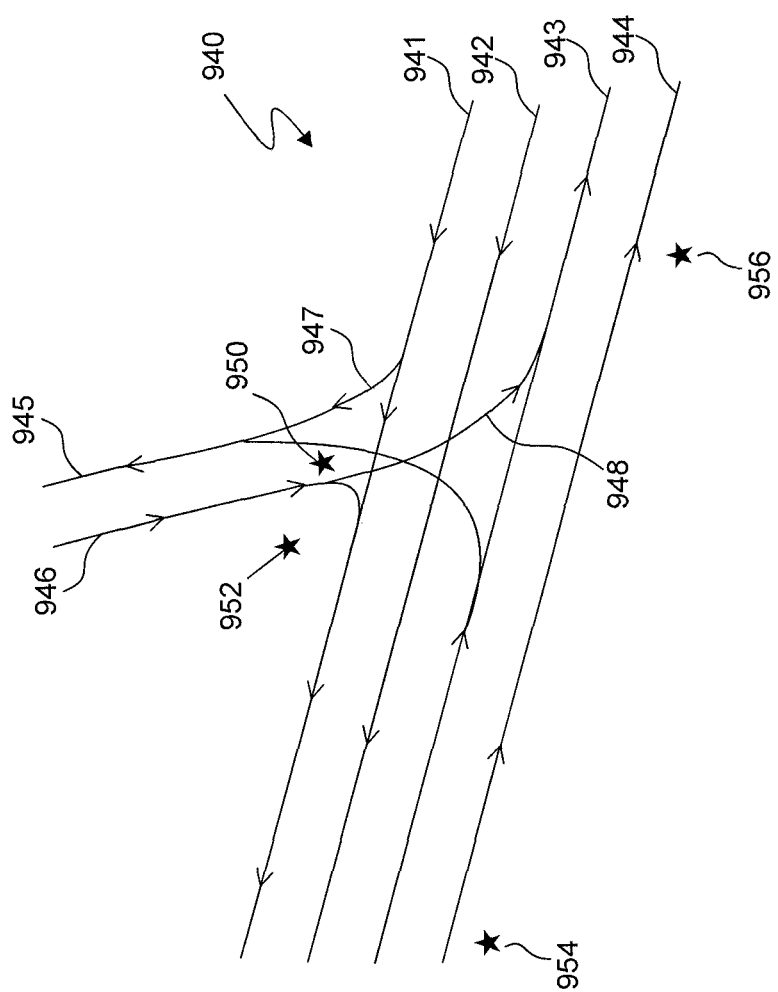

FIGS. 9B and 9C further illustrate the concept of target trajectories associated with road segments present within a geographic region 911. As shown in FIG. 9B, a first road segment 920 within geographic region 911 may include a multilane road, which includes two lanes 922 designated for vehicle travel in a first direction and two additional lanes 924 designated for vehicle travel in a second direction opposite to the first direction. Lanes 922 and lanes 924 may be separated by a double yellow line 923. Geographic region 911 may also include a branching road segment 930 that intersects with road segment 920. Road segment 930 may include a two-lane road, each lane being designated for a different direction of travel. Geographic region 911 may also include other road features, such as a stop line 932, a stop sign 934, a speed limit sign 936, and a hazard sign 938.

As shown in FIG. 9C, a sparse map may include a local map 940 including a road model for assisting with autonomous navigation of vehicles within geographic region 911. For example, local map 940 may include target trajectories for one or more lanes associated with road segments 920 and/or 930 within geographic region 911. For example, local map 940 may include target trajectories 941 and/or 942 that an autonomous vehicle may access or rely upon when traversing lanes 922. Similarly, local map 940 may include target trajectories 943 and/or 944 that an autonomous vehicle may access or rely upon when traversing lanes 924. Further, local map 940 may include target trajectories 945 and/or 946 that an autonomous vehicle may access or rely upon when traversing road segment 930. Target trajectory 947 represents a preferred path an autonomous vehicle should follow when transitioning from lanes 920 (and specifically, relative to target trajectory 941 associated with a right-most lane of lanes 920) to road segment 930 (and specifically, relative to a target trajectory 945 associated with a first side of road segment 930. Similarly, target trajectory 948 represents a preferred path an autonomous vehicle should follow when transitioning from road segment 930 (and specifically, relative to target trajectory 946) to a portion of road segment 924 (and specifically, as shown, relative to a target trajectory 943 associated with a left lane of lanes 924.

A sparse map may also include representations of other road-related features associated with geographic region 911. For example, a sparse map may also include representations of one or more landmarks identified in geographic region 911. Such landmarks may include a first landmark 950 associated with stop line 932, a second landmark 952 associated with stop sign 934, a third landmark associated with speed limit sign 954, and a fourth landmark 956 associated with hazard sign 938. Such landmarks may be used, for example, to assist an autonomous vehicle in determining its current location relative to any of the shown target trajectories, such that the vehicle may adjust its heading to match a direction of the target trajectory at the determined location.

Figure 9D:
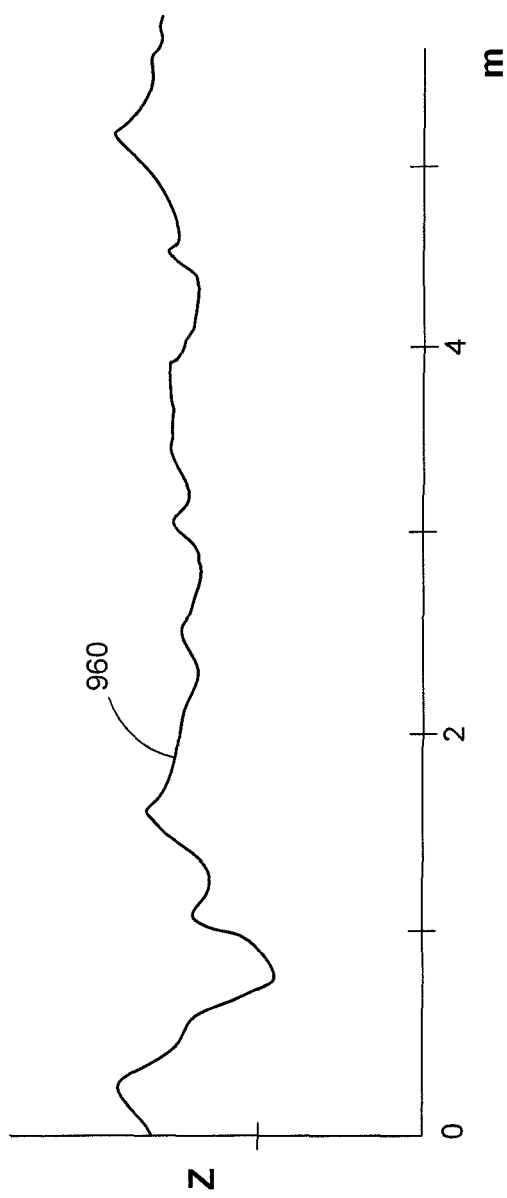
FIG. 9D shows an example road signature profile consistent with disclosed embodiments.

In some embodiments, a sparse map may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 9D shows an example of a road signature profile 960. While profile 960 may represent any of the parameters mentioned above, or others, in one example, profile 960 may represent a measure of road surface roughness, as obtained, for example, by monitoring one or more sensors providing outputs indicative of an amount of suspension displacement as a vehicle travels a particular road segment.

Alternatively or concurrently, profile 960 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, a sparse map may include different trajectories based on different characteristics associated with a user of autonomous vehicles, environmental conditions, and/or other parameters relating to driving. For example, in some embodiments, different trajectories may be generated based on different user preferences and/or profiles. A sparse map including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in a sparse map based on different environmental conditions, such as day and night, snow, rain, fog, etc. Autonomous vehicles driving under different environmental conditions may be provided with a sparse map generated based on such different environmental conditions. In some embodiments, cameras provided on autonomous vehicles may detect the environmental conditions, and may provide such information back to a server that generates and provides sparse maps. For example, the server may generate or update an already generated a sparse map to include trajectories that may be more suitable or safer for autonomous driving under the detected environmental conditions. The update of a sparse map based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in a sparse map such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Figure 10:
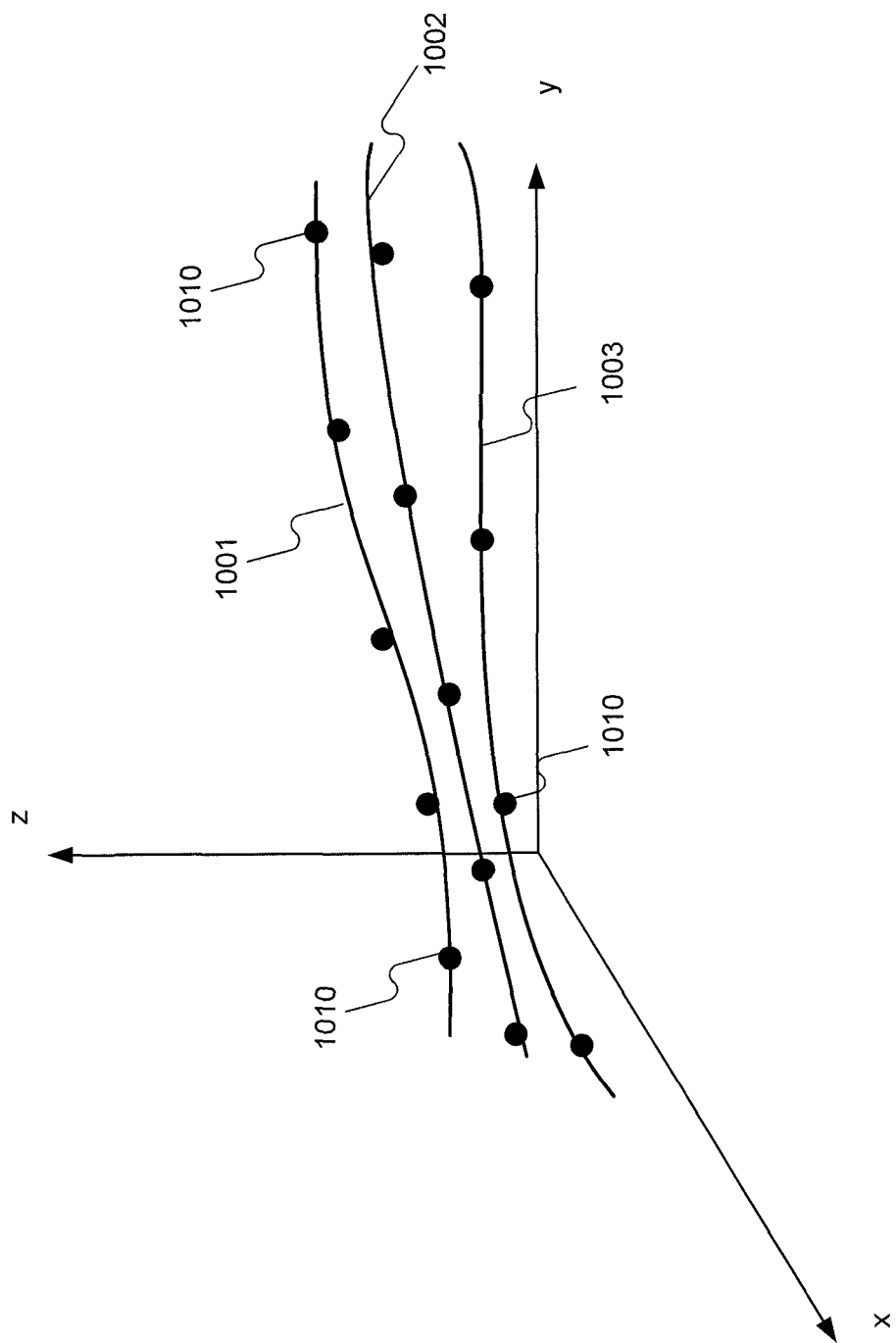
FIG. 10 illustrates an example autonomous vehicle road navigation model represented by a plurality of three dimensional splines, consistent with the disclosed embodiments.

FIG. 10 illustrates an example autonomous vehicle road navigation model represented by a plurality of three dimensional splines 1001, 1002, and 1003. The curves 1001, 1002, and 1003 shown in FIG. 10 are for illustration purpose only. Each spline may include one or more three dimensional polynomials connecting a plurality of data points 1010. Each polynomial may be a first order polynomial, a second order polynomial, a third order polynomial, or a combination of any suitable polynomials having different orders. Each data point 1010 may be associated with the navigation information received from a plurality of vehicles. In some embodiments, each data point 1010 may be associated with data related to landmarks (e.g., size, location, and identification information of landmarks) and/or road signature profiles (e.g., road geometry, road roughness profile, road curvature profile, road width profile). In some embodiments, some data points 1010 may be associated with data related to landmarks, and others may be associated with data related to road signature profiles.

Figure 11:
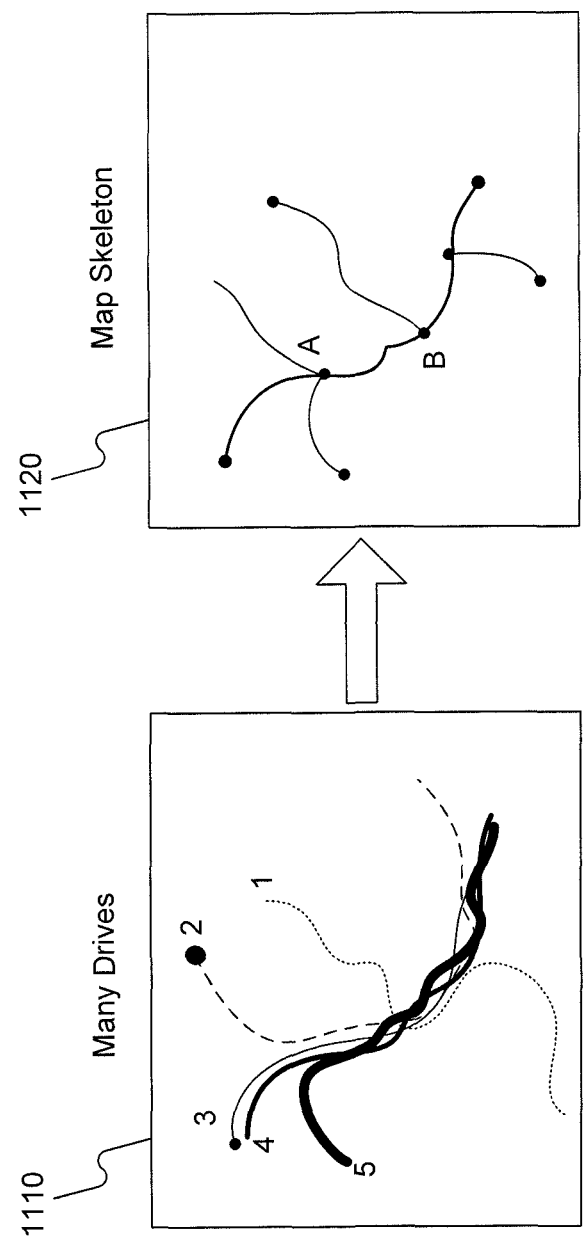
FIG. 11 shows a map skeleton generated from combining location information from many drives, consistent with the disclosed embodiments.

FIG. 11 illustrates raw location data 1110 (e.g., GPS data) received from five separate drives. One drive may be separate from another drive if it was traversed by separate vehicles at the same time, by the same vehicle at separate times, or by separate vehicles at separate times. To account for errors in the location data 1110 and for differing locations of vehicles within the same lane (e.g., one vehicle may drive closer to the left of a lane than another), a remote server may generate a map skeleton 1120 using one or more statistical techniques to determine whether variations in the raw location data 1110 represent actual divergences or statistical errors. Each path within skeleton 1120 may be linked back to the raw data 1110 that formed the path. For example, the path between A and B within skeleton 1120 is linked to raw data 1110 from drives 2, 3, 4, and 5 but not from drive 1. Skeleton 1120 may not be detailed enough to be used to navigate a vehicle (e.g., because it combines drives from multiple lanes on the same road unlike the splines described above) but may provide useful topological information and may be used to define intersections.

Road Edge Mapping

Embodiments of the present disclosure may use mapping of horizontal and vertical functions to road features in order to delineate road edges. In particular, the mappings disclosed herein may allow for multiple road edge points to be calculated within a single column of an image, unlike conventional systems. The mappings disclosed herein are therefore more accurate than conventional determinations. Furthermore, filtering and union disclosed herein provide even greater accuracy in mapping points to road edges than in conventional systems.

Figure 12:
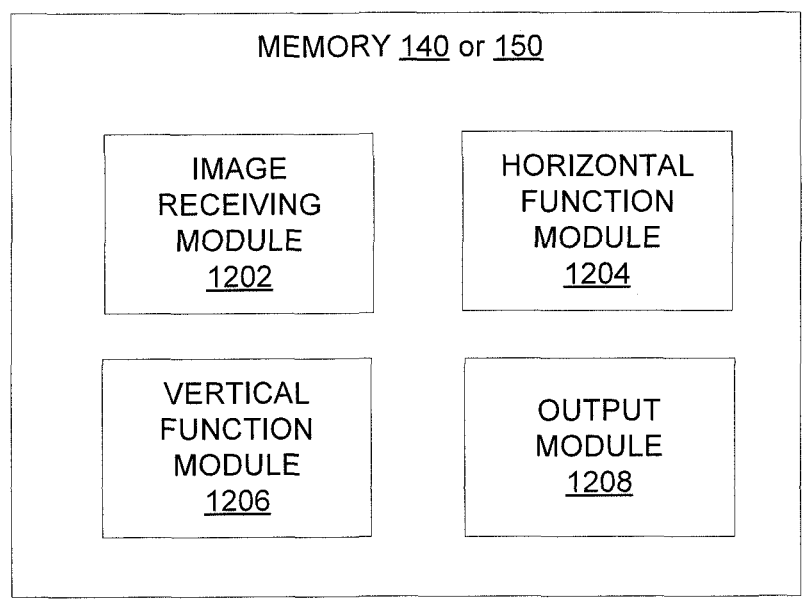
FIG. 12 is an exemplary block diagram of a memory configured to store instructions for mapping features of a roadway traversed by a host vehicle consistent with the disclosed embodiments.

FIG. 12 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 12, memory 140 may store an image receiving module 1202, a horizontal function module 1204, a vertical function module 1206, and an output module 1208. The disclosed embodiments are not limited to any particular configuration of memory 140. Further, applications processor 180 and/or image processor 190 may execute the instructions stored in any of modules 1202, 1204, 1206, and 1208 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image receiving module 1202 may store instructions which, when executed by processing unit 110, cause processing unit 110 to receive, from an image capture device, at least one image representative of an environment of a host vehicle. For example, image receiving module 1202 may receive (and, in some embodiments, store) at least one image acquired by one of image capture devices 122, 124, and 126.

The at least one image may include a plurality of image features representing a corresponding plurality of road boundary edges. For example, the at least one image may include a curb, a barrier (such as a concrete barrier, a guardrail, or the like), a lane marking (such as a dashed line, a solid line, or the like), a road edge (such as a border between concrete or asphalt comprising the road and grass, gravel, or the like comprising non-paved areas, a border between gravel or dirt comprising the road and grass or the like comprising non-road areas, or the like), or the like.

In some embodiments, image receiving module 1202 may identify one or more of the image features representing the road boundary edges. For example, image receiving module 1202 may identify the feature(s) using pixel matching, patch matching, classifiers (or cascading classifiers), neural networks (such as a You Only Look Once (YOLO) network, a single-shot detector (SSD) network, or the like), or any combination. Any of the techniques described above may be implemented using a trained system. For example, image receiving module 1202 may comprise one or more systems trained (e.g., using an annotated training set and/or unsupervised learning techniques) to identify curbs, barriers, lane markings, road edges, or the like.

As discussed, memory 140 may include horizontal function module 1204 and vertical function module 1206. As used herein, the term "function" refers to a relationship from a set of inputs to a set of possible outputs where each input is related to one output.

In one embodiment, horizontal function module 1204 may store instructions which, when executed by processing unit 110, cause processing unit 110 to identify, based on analysis of the plurality of image features, a predetermined number of horizontal functions that map to one or more of the plurality of image features. As used herein, the term "horizontal function" refers to any mathematical function (e.g., y=f(x)) that maps inputs on a horizontal direction (e.g., along an "x" axis) to outputs on a vertical direction (e.g., along a "y" axis). Horizontal function module 1204 may use logistic regression or any other techniques to determine the one or more horizontal functions. In some embodiments, one or more constraints may be imposed on the functions, e.g., continuity, differentiability, or the like. Additionally or alternatively, the plurality of image features may be divided into groups such that each function of the one or more horizontal functions is determined for a particular group. By grouping the image features, horizontal function module 1204 may differentiate between separate road boundaries. For example, one function of the predetermined number of horizontal functions may be assigned to a first cluster of features that is for a curb while another function of the predetermined number of horizontal functions may be assigned to a second cluster of features that is for a lane marking. In another example, one function of the predetermined number of horizontal functions may be assigned to a first cluster of features that is for a curb bordering a lane of travel of the host vehicle while another function of the predetermined number of horizontal functions may be assigned to a second cluster of features that is for another curb bordering a neighboring lane.

In one embodiment, vertical function module 1206 may store instructions which, when executed by processing unit 110, cause processing unit 110 to identify, based on analysis of the plurality of image features, a predetermined number of vertical functions that map to one or more of the plurality of image features. As used herein, the term "vertical function" refers to any mathematical function (e.g., x=f(y)) that maps inputs on a vertical direction (e.g., along a "y" axis) to outputs on a horizontal direction (e.g., along a "x" axis). Vertical function module 1206 may determine the functions similar to horizontal function module 1204, described above. Moreover, vertical function module 1206 may perform grouping of the features similar to horizontal function module 1204, described above.

In some embodiments, horizontal function module 1204 and vertical function module 1206 may cooperate to identify, based on analysis of the plurality of image features, a predetermined number of vertical functions and a predetermined number of horizontal functions that, when taken together, map to each of the plurality of image features. For example, a plurality of horizontal functions may be used to allow for multiple "y" points on a single "x" points, and a plurality of vertical functions may be used to allow for multiple "x" points on a single "y" point. The cooperation may further include grouping, as described above for horizontal function module 1204 and vertical function module 1206. The grouping used by horizontal function module 1204 may be the same or different than that used by vertical function module 1206. Moreover, horizontal function module 1204 and vertical function module 1206 may determine functions for the total number of features or may divide at least some of the features such that at least some of the features are only used by one of the horizontal function module 1204 and vertical function module 1206.

In one embodiment, output module 1208 may store instructions which, when executed by processing unit 110, cause processing unit 110 to output the identified predetermined number of vertical functions and the identified predetermined number of horizontal functions mapping to the plurality of image features representative of the corresponding plurality of road edge boundaries. For example, the functions may be written to one or more files in storage for later use.

In other embodiments, the functions may comprise polynomials, and the functions may be written as arrays of coefficients. In yet other embodiments, to allow for other types of functions, such as logarithmic functions and exponential functions, the arrays may include an identifier (e.g., at the initial position, such as the 0 position, the (0,0) position, or the like, depending on the dimensionality of the array) indicating whether the functions is polynomial, logarithmic, or the like. The identifier may therefore allow for a decoder to properly use the following coefficients, powers, constants, or the like to re-assemble the determined functions.

In some embodiments, output module 1208 may merge the predetermined number of vertical functions and the predetermined number of horizontal functions into at least one curve representing the plurality of road boundary edges. Further, in some embodiments, output module 1208 may output the at least one curve representing the plurality of road boundary edges. In some embodiments, output module 1208 may cause transmission to a server remotely located with respect to the host vehicle of the at least one curve representing the plurality of road boundary edges. For example, output module 1208 may transmit the at least one curve over a digital connection (e.g., Wi-Fi, 4G, 4G LTE, Bluetooth®, etc.) to the remote server.

In some embodiments, output module 1208 may cause transmission to a server remotely located with respect to the host vehicle of the identified predetermined number of vertical functions and the identified predetermined number of horizontal functions. For example, output module 1208 may transmit the functions over a digital connection (e.g., Wi-Fi, 4G, 4G LTE, Bluetooth®, etc.) to the remote server.

Figure 13A:
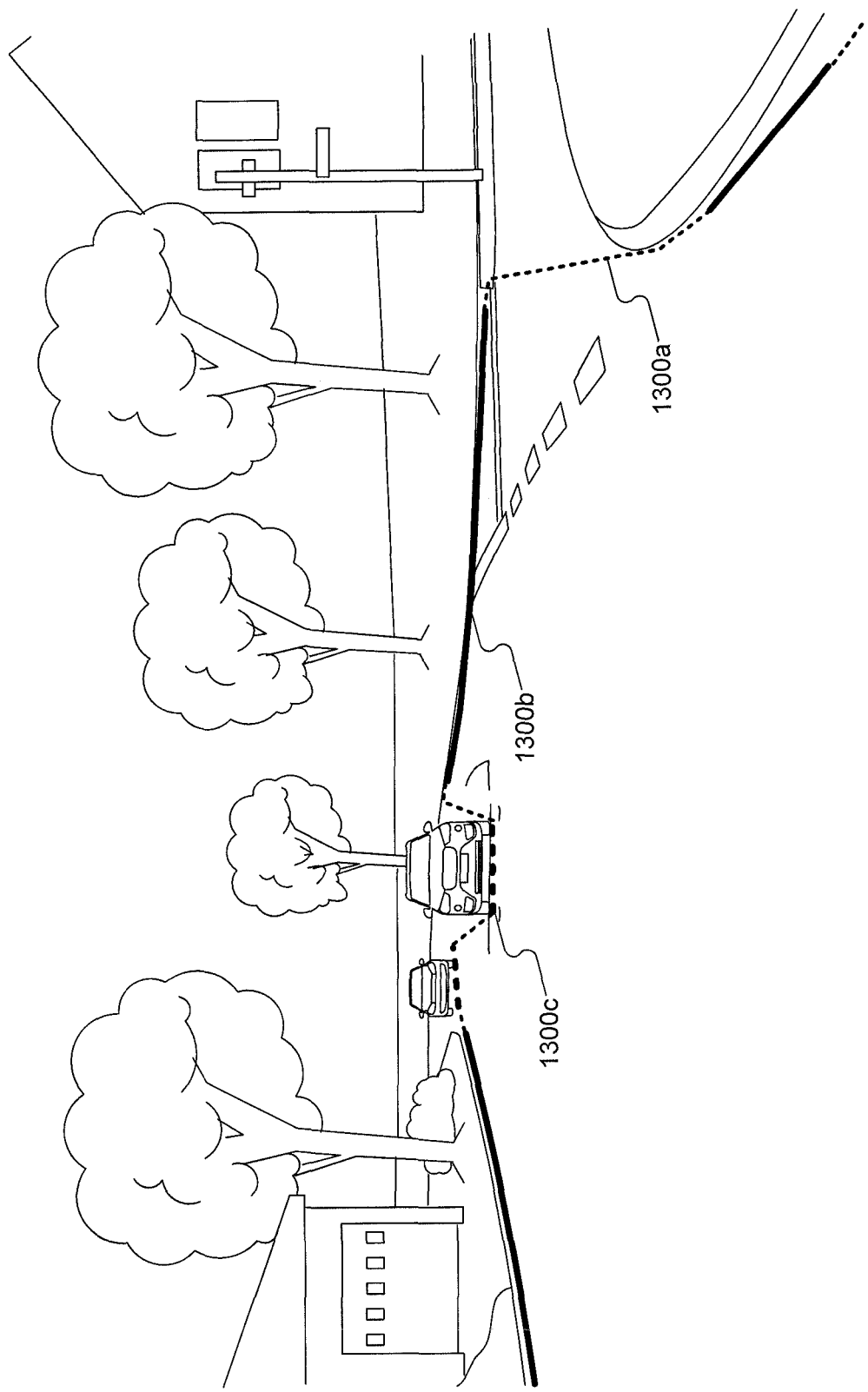
FIG. 13A illustrates an example of using a free space algorithm for road edge detection.

FIG. 13A illustrates an example of using a free space algorithm for road edge detection. FIG. 13A therefore depicts the technical problem with conventional determinations of road edges. In particular, as depicted in the example of FIG. 13A, a conventional free space algorithm typically only outputs one point detected as a road edge per column. Accordingly, a piecewise function defining the road edges is comprised of function 1300*a* (used to connect gaps to ensure that a continuous function is output), function 1300*b* (based on curb detections), and function 1300*c* (based on vehicle detections). As may be seen in FIG. 13A, this conventional function suffers from numerous shortcomings, such as including vehicles in the determination and failing to recognize the intersection.

Figure 13B:
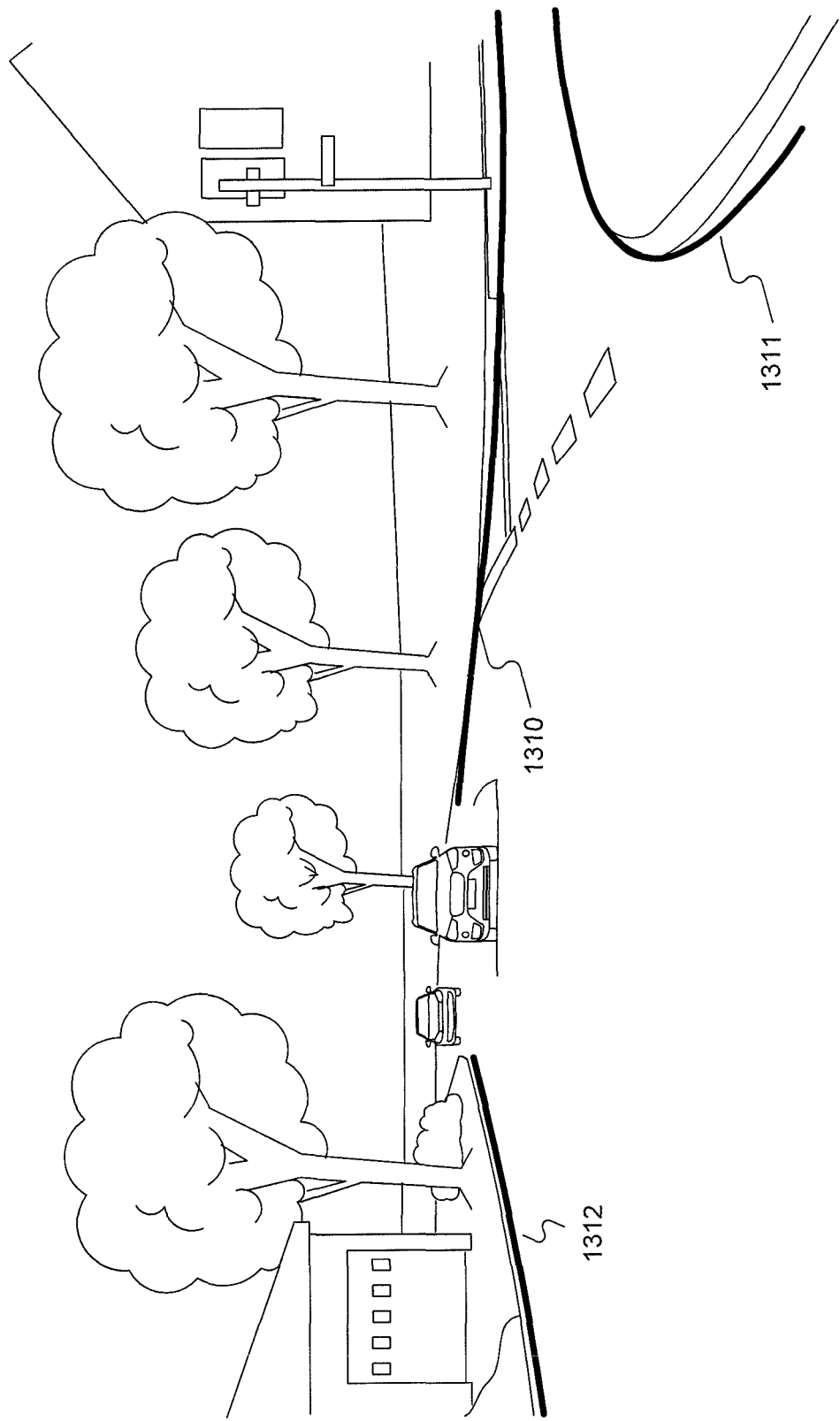
FIG. 13B illustrates an example of using an algorithm of the present disclosure for road edge detection consistent with the disclosed embodiments.

FIG. 13B illustrates an example of using an algorithm of the present disclosure for road edge detection. FIG. 13B therefore depicts the technical advantages of the disclosed techniques for determining road edges. In particular, as depicted in the example of FIG. 13B, both horizontal and vertical functions are combined (e.g., in a piecewise fashion and/or in an algorithmic combination, such as added or subtracted) to provide a single representation, curve 1310, of the road edge. In addition to avoiding erroneous detections and/or interpolations depicted in FIG. 13A, representation 1310 also allows for detection of intersections (e.g., by recognizing that the curbs slope towards the intersection street on the right). Furthermore, the system may detect the full extent of curb 1310 and curb 1311. This, together with (correctly) not joining curb 1310 with curb 312 may provide a more complete and more accurate description of the intersection. Further, in some embodiments, the system may further detect, based on the foregoing, that the arrangement of curbs shown in FIG. 23C is an intersection.

Figure 13C:
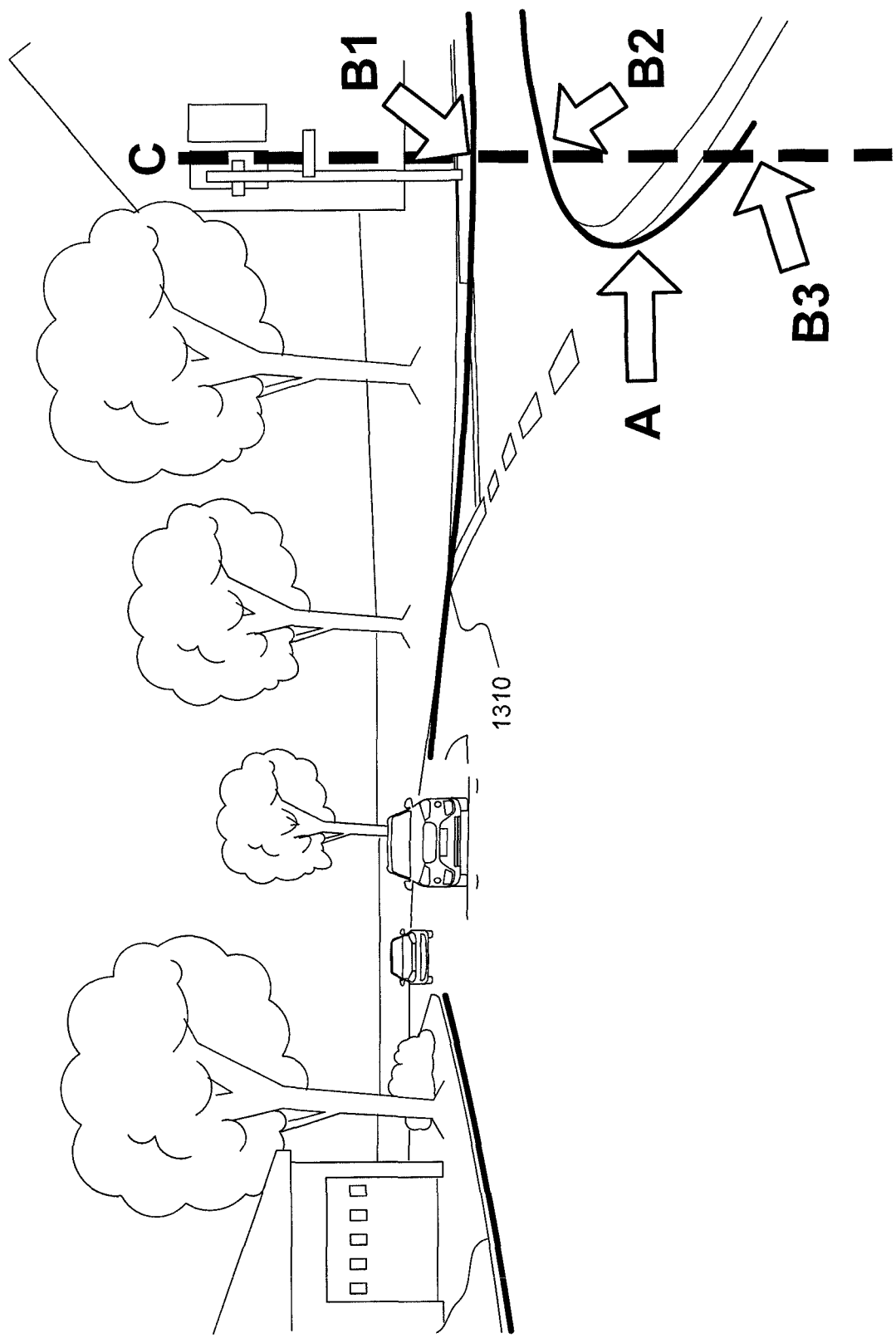
FIG. 13C illustrates an example of aligning map data with the example road edge detection of FIG. 13B.

FIG. 13C illustrates an example of aligning map data with the example road edge detection of FIG. 13B. As shown in FIG. 13A, portion A of the road edge is best represented by a vertical function. Portion A may therefore be accurately represented because two points (e.g., points B2 and B3) may be represented in a single column (e.g., column C) rather than a single point, to which the technique of FIG. 13A is limited. Indeed, in the example of FIG. 13C, three points, B1, B2, and B3, are all represented in column C by the incorporation of vertical functions as well as horizontal functions in representing a road edge.

By allowing for this greater flexibility, the representation of FIG. 13C may be aligned with map data. For example, the functions may be mapped to global coordinates (or local coordinates of a map being used for navigation) based on location information related to the host vehicle (e.g., GPS location, ego motion, camera pose coordinates, or the like). In the example of FIG. 13C, then, the gap between points B1 and B2 may be aligned with a map and identified as a representation of a gap in the road edge caused by the cross-road on the right of FIG. 13C intersecting with the lane of travel of FIG. 13C.

Figure 13D:
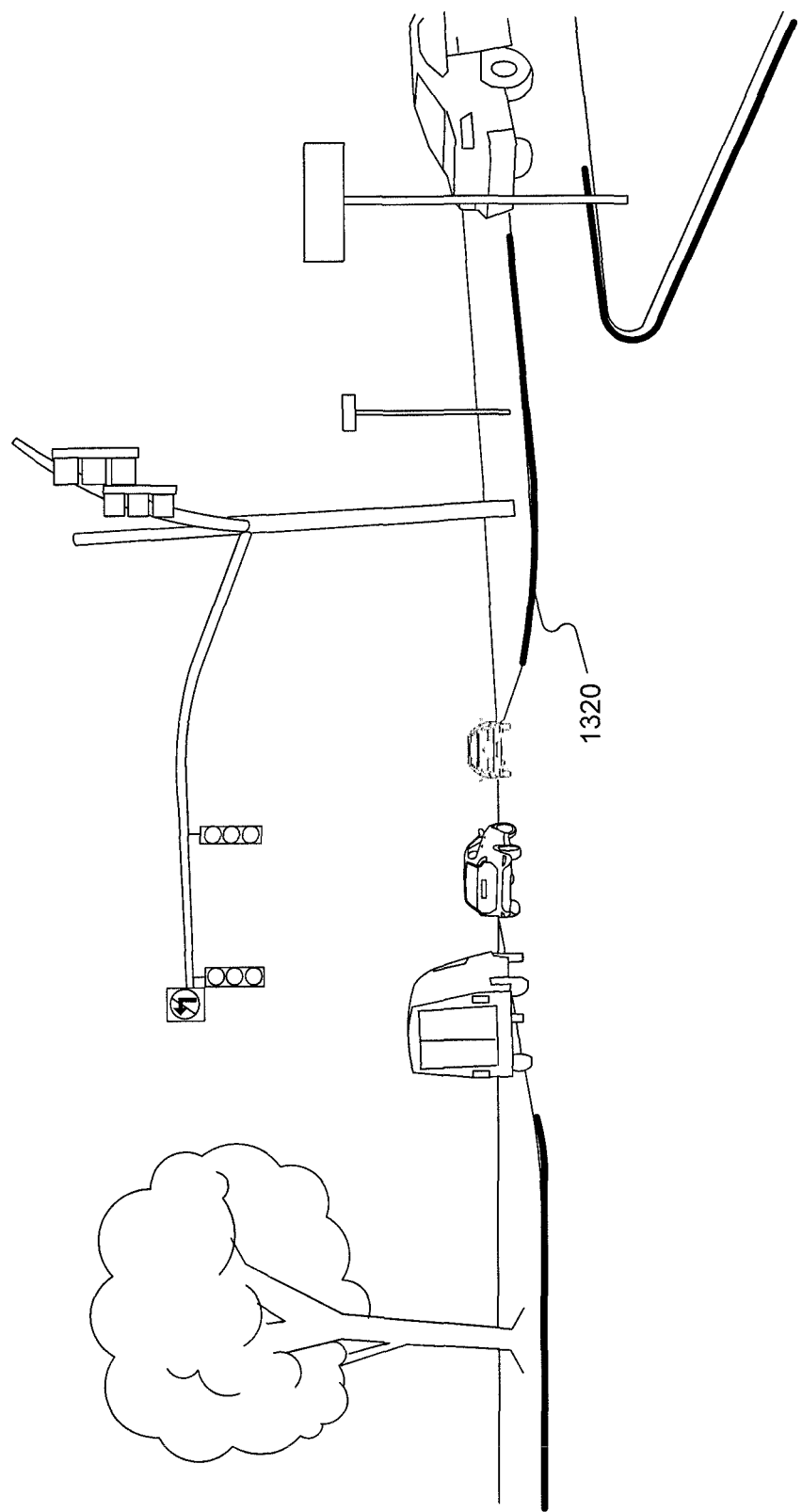
FIG. 13D illustrates another example of using an algorithm of the present disclosure for road edge detection consistent with the disclosed embodiments.

FIG. 13D illustrates another example of using an algorithm of the present disclosure for road edge detection consistent with the disclosed embodiments. Similar to FIG. 13C, FIG. 13D depicts a single representation, curve 1320, of the road edge. Moreover, similar to representation 1310 of FIG. 13C, representation 1320 of FIG. 13D may be aligned with map data in order to, for example, determine that the gap on the right of FIG. 13D is caused by the cross-road on the right of FIG. 13D intersecting with the lane of travel of FIG. 13D and that the gap in the center of FIG. 13D shows that the current lane of travel of FIG. 13D continues beyond the current stoplight.

Figure 13E:
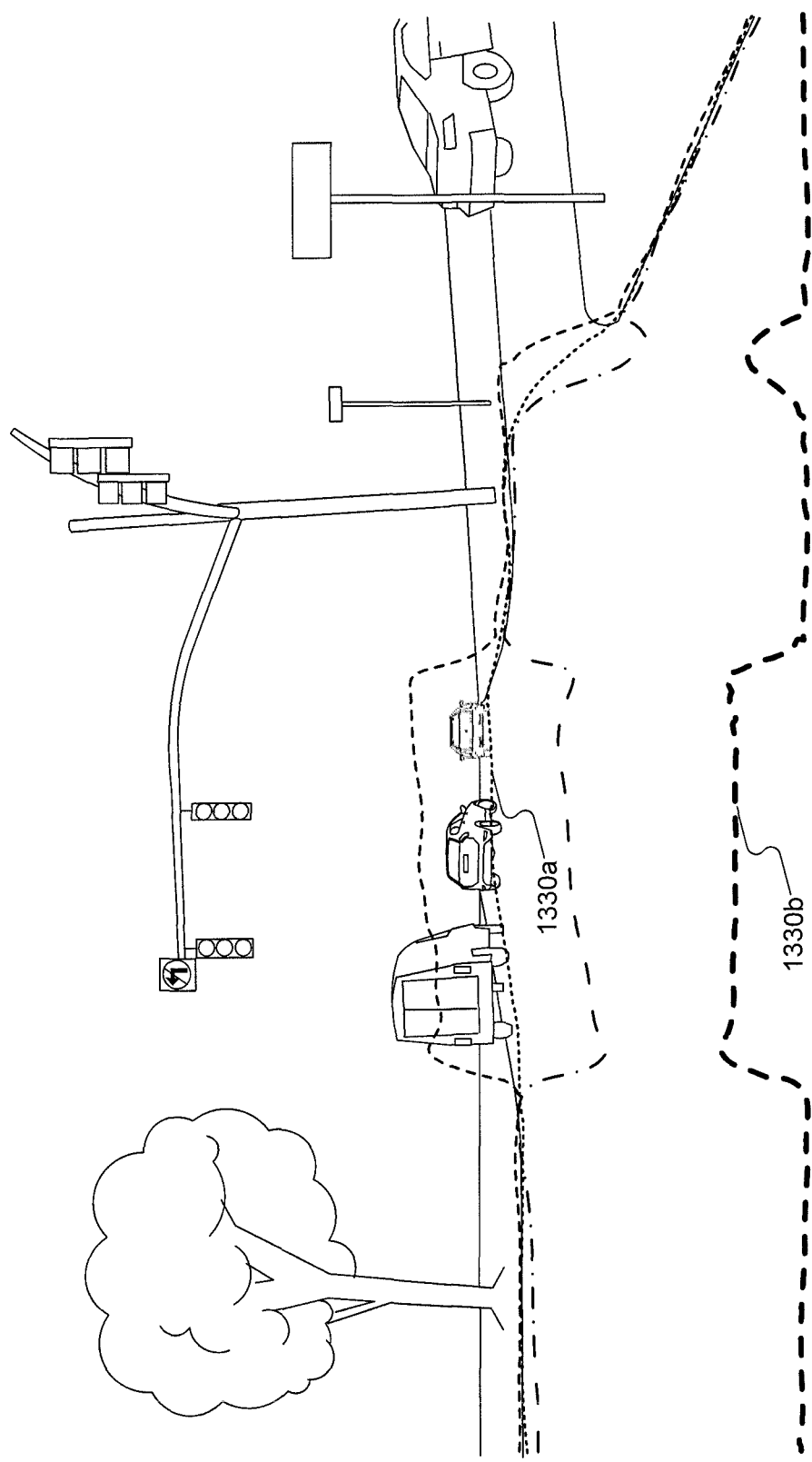
FIG. 13E illustrates an example of distance learning for road edge detection consistent with the disclosed embodiments.

FIG. 13E illustrates an example of distance learning for road edge detection consistent with the disclosed embodiments. In the example of FIG. 13E, a neural network (e.g., the neural network implementing the functions of horizontal function module 1204 and/or vertical function module 1206 of FIG. 12, described above) has been trained to score one or more horizontal functions (e.g., function 1330*a*) to the image.

As depicted in the training of FIG. 13E, the image features that are being fit may be scored by a different neural network. For example, a corresponding score may be lower for a point that has one or more functions passing through it and higher for a point that has no functions passing through it. Moreover, the corresponding score may be based on the distance of one or more of the functions from the point (e.g., the distance to the closest function).

Additionally or alternatively, function points may be scored, the scores being depicted as 1330*b* in FIG. 13E. For example, a corresponding score may be lower for a function point that passes through an image feature and higher for a function point that does not pass through an image feature. Moreover, the corresponding score may be based on the distance of one or more image features from the function point (e.g., the distance to the closest image feature). As a result, if there are multiple road edge points along a particular column and one function fits one of the edge points and another function fits the other point the score will be low. If both functions fit the same point and no function fits the other point that point will give a high score and be penalized.

Additionally or alternatively, a score may be determined for each function point based on its distance from a function point of a neighboring column (e.g., the distance to the closest function point on a neighboring column). This score may enforce smoothness for the final determined function.

Although all of the examples above use high scores as indicators of error, any of the scoring above may be reversed, e.g., such as low scores are indicators of error. Alternatively, any of the scoring above may use positive (or negative) numbers of as indicators of matching and negative (or positive, respectively) numbers as indicators of error.

By using the training of FIG. 13E, the neural network may be trained to score functions without knowledge of the exact locations of the image features. For example, the neural network may be trained to give lower scores to function points that are near portions of images that look like curbs and to give higher scores to functions points that are near portions of images that look like horizons, even though the neural network does not perform explicit detection and identification of curbs, horizons, and the like.

Figure 13F:
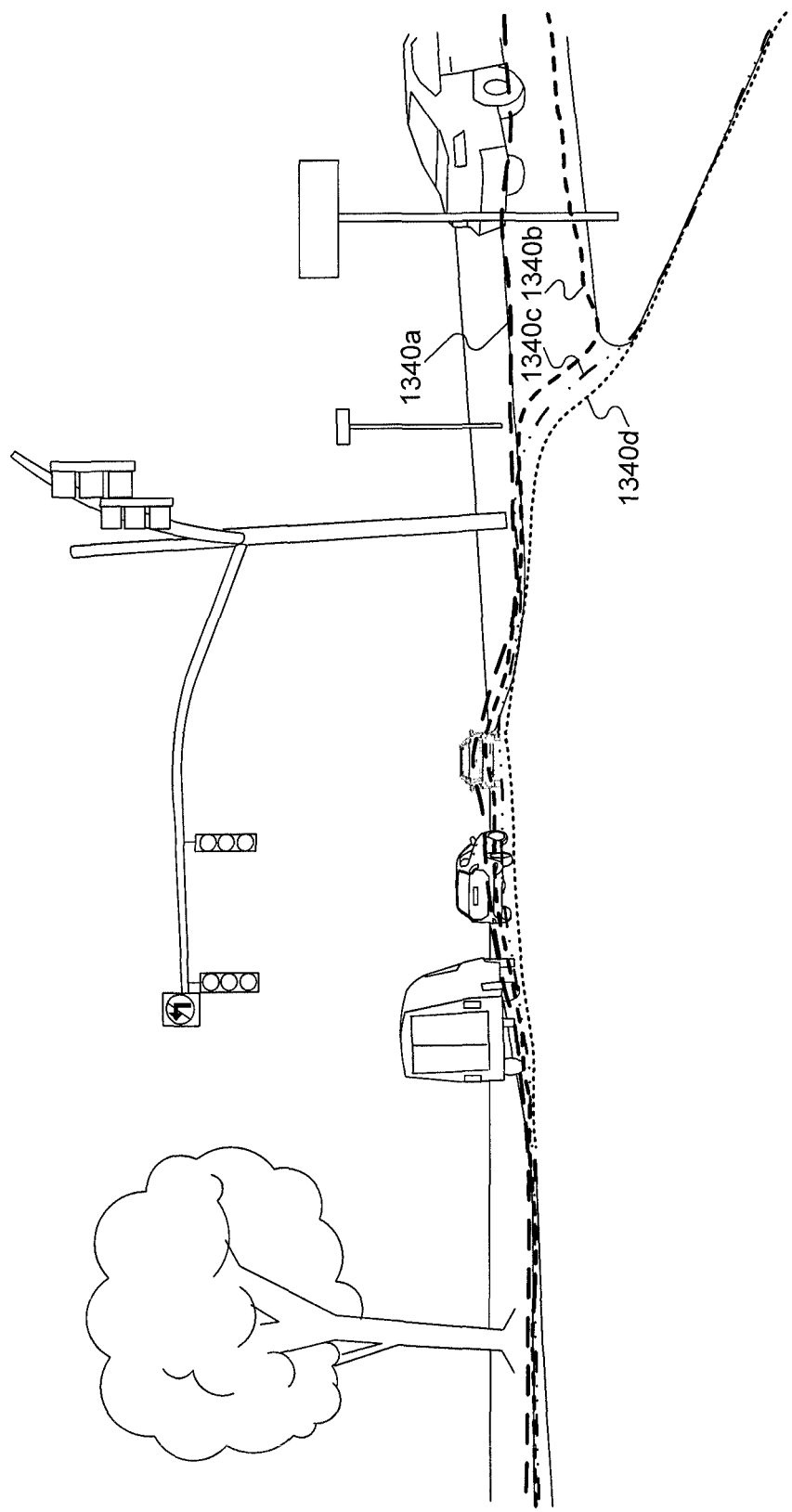
FIG. 13F illustrates an example of partially merged curves from FIG. 13E.

FIG. 13F illustrates an example of horizontal functions output from a neural network (e.g., the neural network implementing the functions of horizontal function module 1204, described above) trained to impose horizontal functions on the image. Although not depicted in FIG. 13F, a similar neural network may be used to implement the functions of vertical function module 1206 of FIG. 12 and thus to impose vertical functions on the image. For example, functions 1340*a*, 1340*b*, 1340*c*, and 1340*d* have been imposed on the image. Thereafter, another neural network (e.g., the neural network trained as depicted in FIG. 13E) may be applied to score each functions and thus adjust functions 1340*a*, 1340*b*, 1340*c*, and 1340*d* accordingly to reduce the scores (or, in embodiments where low scores indicate error, increase the scores). Additionally or alternatively, an optimization function may be applied to the scores.

Figure 13G:
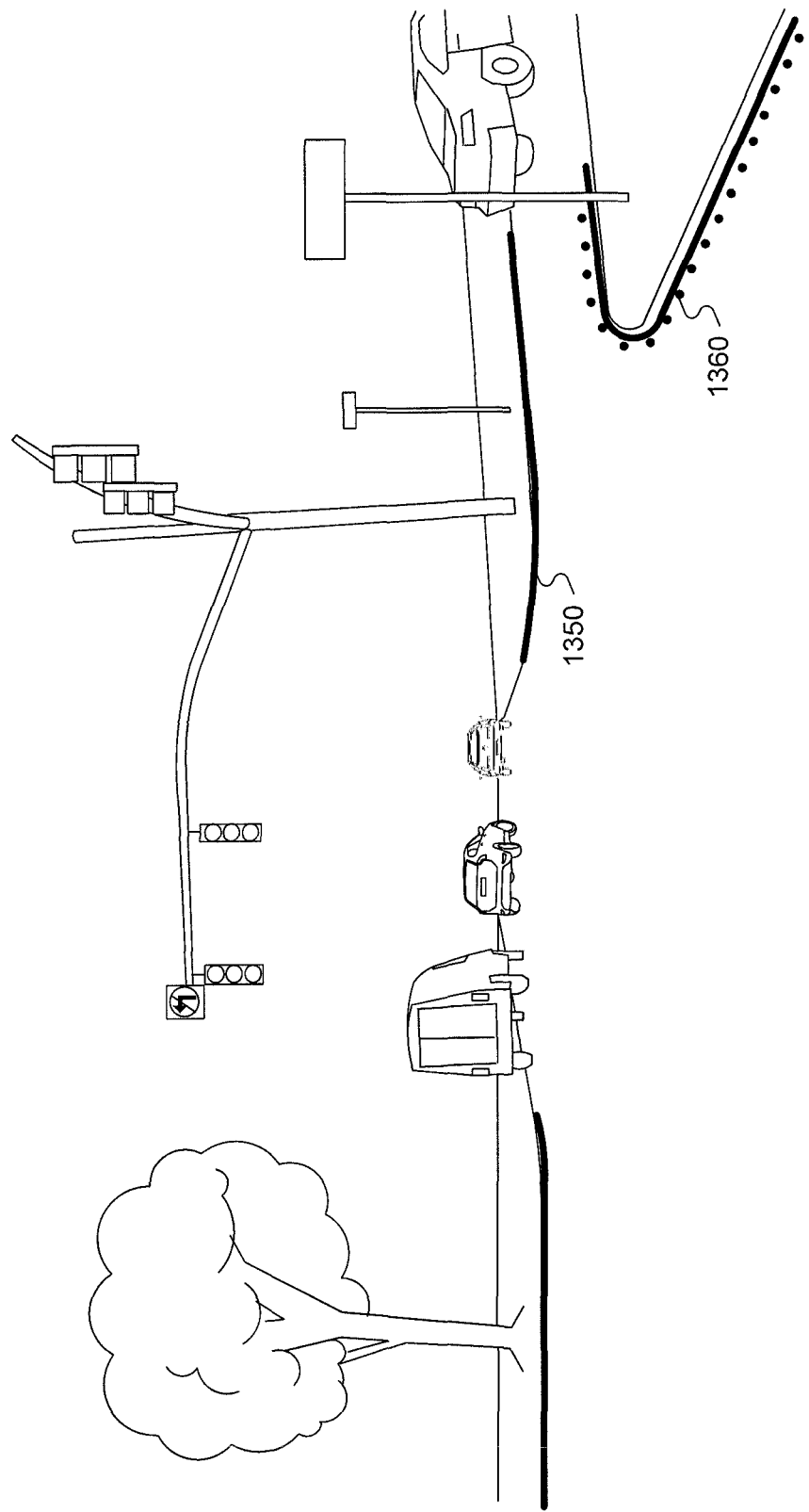
FIG. 13G illustrates further filtering and union of the partially merged curves from FIG. 13F.

FIG. 13G illustrates further filtering and union of the functions from FIG. 13F. As shown in FIG. 13G, functions 1340*a*, 1340*b*, 1340*c*, and 1340*d* have been merged into a single curve 1350. The filtering may eliminate portions of functions 1340*a*, 1340*b*, 1340*c*, and 1340*d* that where the score as estimated by the neural network trained per FIG. 13E in the same column. The unioning may be weighted, e.g., based on normalized distance between image features and corresponding function points. Accordingly, the curve 1350 may represent a collection of the most accurate points from the horizontal functions.

As further depicted in FIG. 13G, a similar process may be used to generate a single curve 1360. Although not depicted in FIGS. 13E and 13F, the same process of generating a plurality of vertical functions (e.g., a predetermined number such as four), scoring the plurality of functions and then filtering and/or performing unioning on the scored functions to derive curve 1360. In some embodiments, the vertical and horizontal functions may be merged in the same process, resulting in a single curve that is the union of both horizontal and vertical functions.

FIG. 13H illustrates yet another example of using an algorithm of the present disclosure for road edge detection consistent with the disclosed embodiments. As shown in FIG. 13H, multiple curves generated from filtered and unioned functions may be determined for a plurality of road boundaries. Accordingly, a concrete barrier may be represented as a bottom curve 1370a and a top curve 1370b. As further depicted in the example of FIG. 13H, a guard rail may be represented as a top curve 1380a and a bottom curve 1380b. Moreover, a curb may be represented as a top curve 1390a and a bottom curve 1390b. Other road boundaries not depicted in FIG. 13H may be represented by one or more curves determined as described above. For example, road edges, lane markings, or the like may also be represented.

Figure 14A:
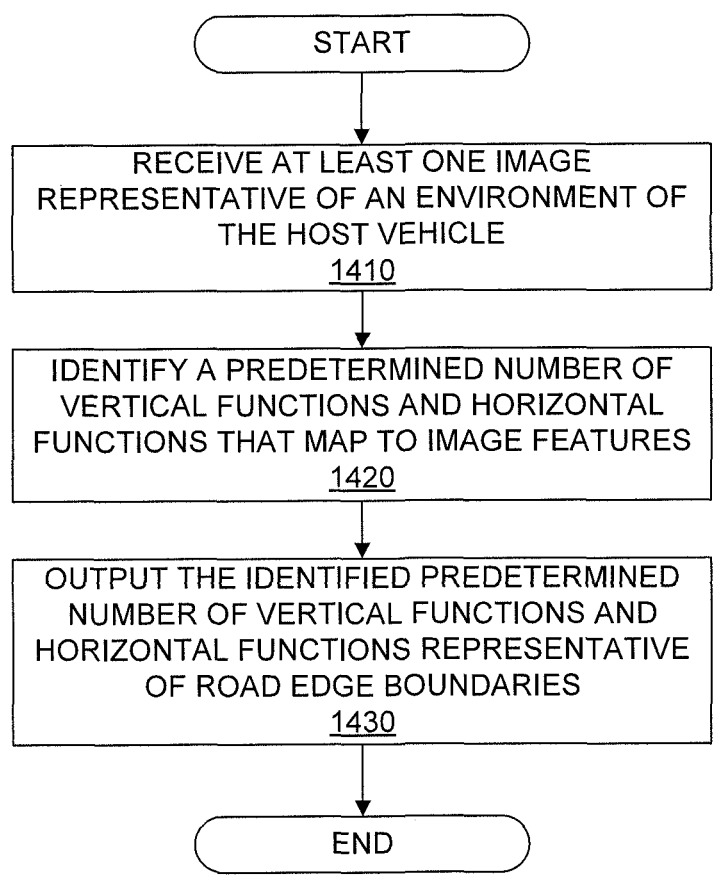
FIG. 14A is a flowchart showing an exemplary process for mapping features of a roadway traversed by a host vehicle consistent with the disclosed embodiments.

FIG. 14A provides a flowchart representing an example process 1400 for mapping features of a roadway traversed by a host vehicle. Process 1400 may be performed by at least one processing device, such as processing device 110.

At step 1410, the at least one processing device (e.g., processing device 110) of the host vehicle navigation system may receive, from an image capture device, at least one image representative of an environment of the host vehicle. For example, processing device 110 may receive (and, in some embodiments, store) images acquired by one of image capture devices 122, 124, and 126.

The at least one image may include a plurality of image features representing a corresponding plurality of road boundary edges. In some embodiments, as explained above with respect to image receiving module 1202, the plurality of image features representing the corresponding plurality of road boundary edges may be identified using a trained system. Furthermore, as explained above with respect to image receiving module 1202, the trained system may include a neural network.

The plurality of road boundary edges may include at least one road edge. Additionally or alternatively, the plurality of road boundary edges may include at least one road barrier edge. For example, the at least one road barrier edge may be associated with at least one of a curb (as depicted in FIGS. 13B, 13D, and 13H), guardrail (as depicted in FIG. 13H), lane divider, or Jersey wall (as depicted in FIG. 13H).

In some embodiments, the plurality of road boundary edges may include at least a first road edge associated with a road on which the host vehicle is traveling and at least a second road edge associated with a crossing road that intersects the road on which the host vehicle is traveling. For example, FIGS. 13B and 13G depict a road edge for a current road and along with a road edge for an intersecting road.

In some embodiments, the plurality of road boundary edges may include at least one road edge associated with a road on which the host vehicle is traveling and at least one road barrier edge. In such embodiments, the at least one processing device (e.g., processing device 110) may determine a height difference between the at least one road edge and the at least one road barrier edge based on analysis of the at least one image. For example, in FIG. 13H, the height of the concrete barrier may be determined based on top function 1370b and bottom function 1370a. Similarly, in FIG. 13H, the height of the curb may be determined based on top function 1390a and bottom function 1390b.

At step 1420, the at least one processing device (e.g., processing device 110) may identify, based on analysis of the plurality of image features, a predetermined number of vertical functions and a predetermined number of horizontal functions that, when taken together, map to each of the plurality of image features.

In some embodiments, the predetermined number of horizontal functions may include at least one horizontal function, and the predetermined number of vertical functions may include at least one vertical function. For example, the predetermined number of vertical functions may include at least two vertical functions. Furthermore, the predetermined number of vertical functions may include at least four vertical functions. Alternatively, the predetermined number of vertical functions may include up to four vertical functions.

Similarly, the predetermined number of horizontal functions may include at least three horizontal functions. Furthermore, the predetermined number of horizontal functions may include at least six horizontal functions. Alternatively, the predetermined number of horizontal functions may include up to six horizontal functions. The predetermined number of vertical functions may be the same or different than the predetermined number of horizontal functions. Still further, in some embodiments, the predetermined number of horizontal functions may include any number of appropriate horizontal functions (e.g., 1, 2, 3, 4, 5, 6, 7, 8, 9, 10, 15, 20, etc.) and the predetermined number of vertical functions may include any number of appropriate vertical functions (e.g., 1, 2, 3, 4, 5, 6, 7, 8, 9, 10, 15, 20, etc.).

At step 1430, the at least one processing device (e.g., processing device 110) may output the identified predetermined number of vertical functions and the identified predetermined number of horizontal functions mapping to the plurality of image features representative of the corresponding plurality of road edge boundaries. For example, step 1430 may be performed as explained above with respect to output module 1208.

Method 1400 may further include additional steps. For example, method 1400 may further include filtering the identified predetermined number of vertical functions and the identified predetermined number of horizontal functions by removing segments from at least one of the identified predetermined number of vertical functions and the identified predetermined number of horizontal functions that are determined as not coinciding with at least one of the plurality of image features representing the corresponding plurality of road boundary edges. For example, the filtering may remove segments as explained above with respect to FIG. 13G. In such embodiments, filtering of the identified predetermined number of vertical functions and the identified predetermined number of horizontal functions may include removing segments of any of the identified vertical or horizontal functions determined to cross a representation of a road in the at least one image. Additionally or alternatively, filtering of the identified predetermined number of vertical functions and the identified predetermined number of horizontal functions may include removing segments of any of the identified vertical or horizontal functions determined to correspond to a representation of a horizon in the at least one image.

Additionally with or alternatively to the filtering described above, the at least one processing device (e.g., processing device 110) may subject the identified predetermined number of vertical functions and the identified predetermined number of horizontal functions to a unification process to generate a single curve, based on the identified predetermined number of vertical functions and the identified predetermined number of horizontal functions, associated with each of the plurality of image features representing the corresponding plurality of road boundary edges. For example, the unioning may combine functions as explained above with respect to FIG. 13G. In such embodiments, the unification process may include averaging of one or more segments of the identified predetermined number of vertical functions and the identified predetermined number of horizontal functions. Additionally or alternatively, the unification process may include generating the single curve for a particular image feature corresponding to a particular road boundary edge based on whether two or more of the identified predetermined number of vertical functions and the identified predetermined number of horizontal functions map to the particular image feature corresponding to the particular road boundary edge.

In any of the embodiments described above, method 1400 may further include causing transmission to a server remotely located with respect to the host vehicle of the identified predetermined number of vertical functions and the identified predetermined number of horizontal functions. In embodiments where the functions are filtered, the at least one processing device (e.g., processing device 110) may cause transmission of the filtered identified predetermined number of vertical functions and the filtered identified predetermined number of horizontal functions. The transmission may be performed as explained above with respect to output module 1208.

Figure 14B:
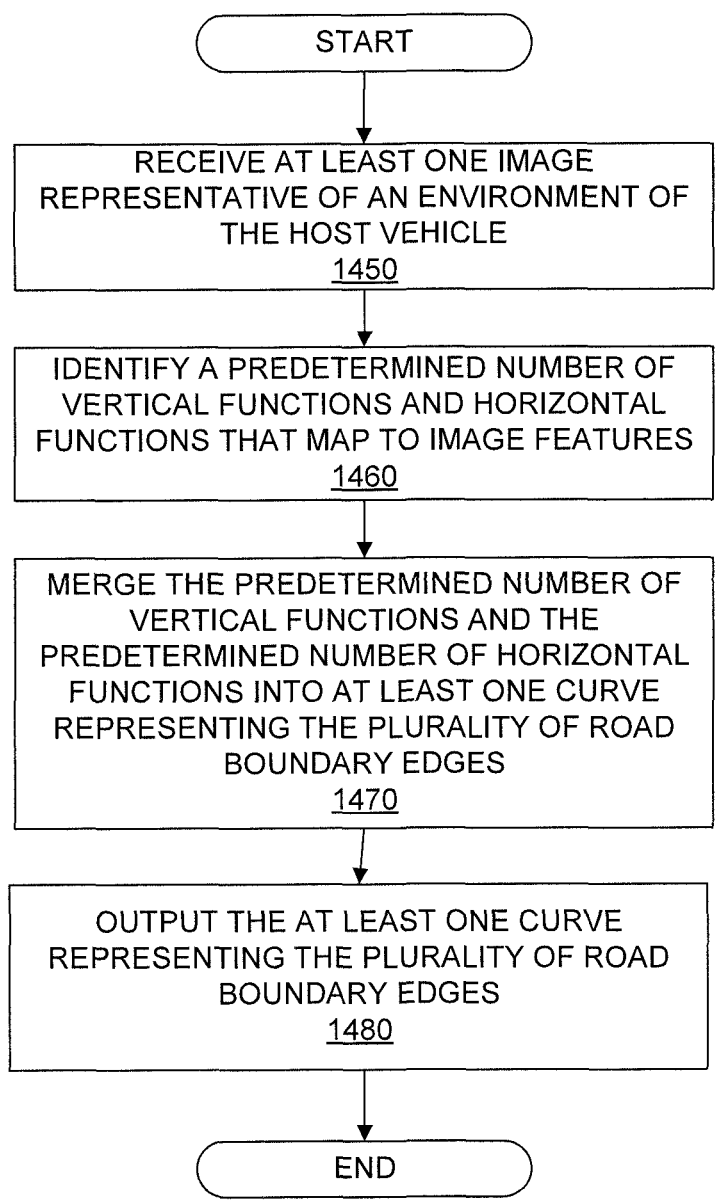
FIG. 14B is another flowchart showing an exemplary process for mapping features of a roadway traversed by a host vehicle consistent with the disclosed embodiments.

FIG. 14B provides another flowchart representing an example process 1440 for mapping features of a roadway traversed by a host vehicle. Process 1440 may be performed by at least one processing device, such as processing device 110.

At step 1450, the at least one processing device may receive, from an image capture device, at least one image representative of an environment of the host vehicle. The at least one image may include a plurality of image features representing a corresponding plurality of road boundary edges. For example, processing device 110 may receive (and, in some embodiments, store) images acquired by one of image capture devices 122, 124, and 126.

The at least one image may include a plurality of image features representing a corresponding plurality of road boundary edges. In some embodiments, as explained above with respect to image receiving module 1202, the plurality of image features representing the corresponding plurality of road boundary edges may be identified using a trained system. Furthermore, as explained above with respect to image receiving module 1202, the trained system may include a neural network.

The plurality of road boundary edges may include at least one road edge. Additionally or alternatively, the plurality of road boundary edges may include at least one road barrier edge. For example, the at least one road barrier edge may be associated with at least one of a curb (as depicted in FIGS. 13B, 13D, and 13H), guardrail (as depicted in FIG. 13H), lane divider, or Jersey wall (as depicted in FIG. 13H).

In some embodiments, the plurality of road boundary edges may include at least a first road edge associated with a road on which the host vehicle is traveling and at least a second road edge associated with a crossing road that intersects the road on which the host vehicle is traveling. For example, FIGS. 13B and 13G depict a road edge for a current road and along with a road edge for an intersecting road.

In some embodiments, the plurality of road boundary edges may include at least one road edge associated with a road on which the host vehicle is traveling and at least one road barrier edge. In such embodiments, the at least one processing device (e.g., processing device 110) may determine a height difference between the at least one road edge and the at least one road barrier edge based on analysis of the at least one image. For example, in FIG. 13H, the height of the concrete barrier may be determined based on top function 1370b and bottom function 1370a. Similarly, in FIG. 13H, the height of the curb may be determined based on top function 1390a and bottom function 1390b.

At step 1460, the at least one processing device may identify, based on analysis of the plurality of image features, a predetermined number of vertical functions and a predetermined number of horizontal functions that, when taken together, map to each of the plurality of image features.

In some embodiments, the predetermined number of horizontal functions may include at least one horizontal function, and the predetermined number of vertical functions may include at least one vertical function. For example, the predetermined number of vertical functions may include at least two vertical functions. Furthermore, the predetermined number of vertical functions may include at least four vertical functions. Alternatively, the predetermined number of vertical functions may include up to four vertical functions.

Similarly, the predetermined number of horizontal functions may include at least three horizontal functions. Furthermore, the predetermined number of horizontal functions may include at least six horizontal functions. Alternatively, the predetermined number of horizontal functions may include up to six horizontal functions. The predetermined number of vertical functions may be the same or different than the predetermined number of horizontal functions. Still further, in some embodiments, the predetermined number of horizontal functions may include any number of appropriate horizontal functions (e.g., 1, 2, 3, 4, 5, 6, 7, 8, 9, 10, 15, 20, etc.) and the predetermined number of vertical functions may include any number of appropriate vertical functions (e.g., 1, 2, 3, 4, 5, 6, 7, 8, 9, 10, 15, 20, etc.).

At step 1470, the at least one processing device may merge the predetermined number of vertical functions and the predetermined number of horizontal functions into at least one curve representing the plurality of road boundary edges. In some embodiments, merging the functions may comprise merging vectors of fixed sizes representing the predetermined number of vertical functions and the predetermined number of horizontal functions to a data structure of flexible size representing the curve. Furthermore, in some embodiments, at step 1470, the at least one processing device may filter one or more segments from the predetermined number of vertical functions and the predetermined number of horizontal functions, and merging the functions may comprise merging the filtered vertical functions and the filtered horizontal functions.

At step 1480, the at least one processing device may output the at least one curve representing the plurality of road boundary edges. For example, in some embodiments, output module 1208 may cause transmission to a server remotely located with respect to the host vehicle of the at least one curve representing the plurality of road boundary edges. In some embodiments, output module 1208 may transmit the at least one curve over a digital connection (e.g., Wi-Fi, 4G, 4G LTE, Bluetooth®, etc.) to the remote server.

Wheel Identification and Navigation Based Thereon

Embodiments of the present disclosure may use wheel identification to perform navigational adjustments of a host vehicle. For example, embodiments of the present disclosure may detect a vehicle based on its wheels in addition to or in lieu of attempting to determine bounding boxes around the vehicle itself. Accuracy of the detection may therefore be improved because wheels may be classified with greater accuracy than entire vehicles. Moreover, speed of the detection may be increased because wheels may be classified with less computationally intense classifiers than entire vehicles.

Furthermore, embodiments of the present disclosure may allow for tracking of a bounding box surrounding a vehicle wheel across time. By accurately tracking the bounding box, a trajectory of the vehicle may be determined with greater accuracy and/or more quickly than by attempting to track a bounding box of the entire vehicle.

Figure 15:
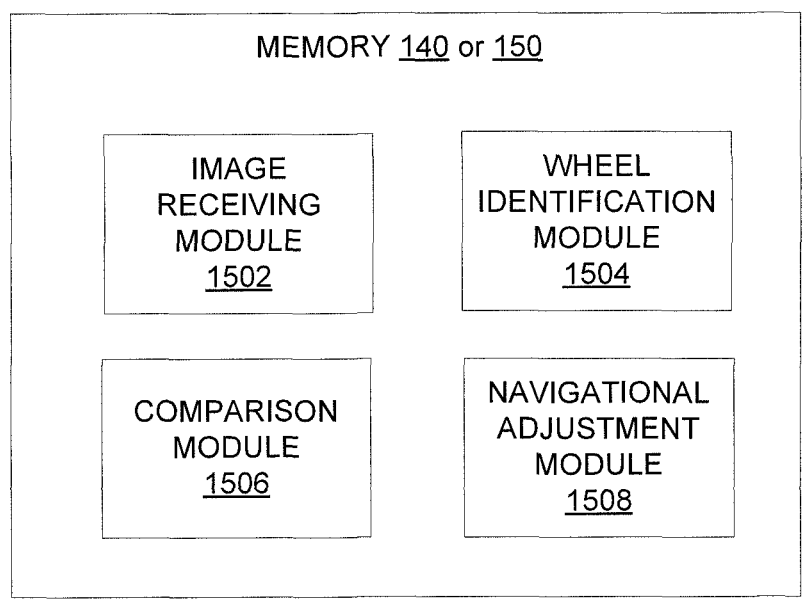
FIG. 15 is an exemplary block diagram of a memory configured to store instructions for navigating a host vehicle based on wheel detection consistent with the disclosed embodiments.

FIG. 15 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 15, memory 140 may store an image receiving module 1502, a wheel identification module 1504, a comparison module 1506, and a navigational adjustment module 1508. The disclosed embodiments are not limited to any particular configuration of memory 140. Further, applications processor 180 and/or image processor 190 may execute the instructions stored in any of modules 1502, 1504, 1506, and 1508 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image receiving module 1502 may store instructions which, when executed by processing unit 110, cause processing unit 110 to receive, from at least one image capture device, a plurality of images representative of an environment of a host vehicle. For example, image receiving module 1502 may receive (and, in some embodiments, store) images acquired by one of image capture devices 122, 124, and 126.

In one embodiment, wheel identification module 1504 may store instructions which, when executed by processing unit 110, cause processing unit 110 to identify in a first image from among the plurality of images a representation of a wheel of a target vehicle. For example, wheel identification module 1504 may identify the wheel using pixel matching, patch matching, classifiers (or cascading classifiers), neural networks (such as a You Only Look Once (YOLO) network, a single-shot detector (SSD) network, or the like), or any combination. Any of the techniques described above may be implemented using a trained system. For example, wheel identification module 1504 may comprise one or more systems trained (e.g., using an annotated training set and/or unsupervised learning techniques) to identify vehicle wheels. In some embodiments, the trained system may include one or more neural networks.

By identifying wheels, wheel identification module 1504 may be more accurate and/or faster than a corresponding system designed and/or trained to detect entire vehicles, as explained above. Accordingly, wheel identification module 1504 may be used to identify and avoid collisions with other vehicles, as explained below with respect to navigational adjustment module 1508.

Wheel identification module 1504 may further identify in a second image from among the plurality of images another representation of the wheel of the target vehicle. For example, the identification may be performed similarly for the second image as was performed for the first image, described above.

The second image may have been captured by the at least one image capture device after the first image. For example, the second image may have been captured in a shutter cycle of one of image capture devices 122, 124, and 126 as compared to the first image. In some embodiments, image receiving module 1502 (or image capture devices 122, 124, and 126) may time-stamp the plurality of images such that the second image may be selected from images having a later time-stamp than that of the first image.

In one embodiment, comparison module 1506 may store instructions which, when executed by processing unit 110, cause processing unit 110 to perform a comparison of the representation of the wheel in the first image to the representation of the wheel in the second image. For example, the comparison may be used to identify a rotation of the wheel and/or a translation of the wheel. For example, optical flow may be used to determine the rotation and/or translation of the wheel.

Additionally or alternatively, the comparison may use a predicted tracking region applied to the first image to perform the comparison. For example, the predicted tracking region may comprise a rectangular area that is at least twice as wide as a bounding box of the identified wheel and at least as tall as wide. Thereafter, a bounding box of an identified wheel may be determined for the second image. The location of the bounding boxes within the tracking region may be used to match the identified wheels as the same wheel. For example, at least 70%, at least 80%, at least 90%, or the like of the bounding box may need to stay within the tracking region to be identified as the same wheel. Additionally or alternatively, the movement of the bounding box within the tracking region may be compared to determine a rotation and/or translation of the wheel.

In one embodiment, navigational response module 1508 may store software instructions executable by processing unit 110 to determine a desired navigational response based on data derived from execution of image receiving module 1502, wheel identification module 1504, and/or comparison module 1506. For example, navigational response module 1508 may cause at least one adjustment of a navigational actuator of the host vehicle in response to identification of a representation of the wheel of the target vehicle in at least one of the first image and in the second image. Furthermore, navigational response module 1908 may cause the at least one adjustment based on a position of the target vehicle and/or a projected trajectory of the target vehicle based on the identifications. The latter may further be based on a comparison of the identifications, as explained above with respect to comparison module 1506.

In any of the embodiments described above, the navigational actuator may include at least one of a steering mechanism, a brake, or an accelerator. Accordingly, navigational response module 1908 may cause activation of the steering mechanism and/or the brake to avoid a predicted collision with a vehicle associated with the identified wheel. The collision may be predicted based on a location of the vehicle associated with the identified wheel and/or a trajectory of the vehicle based on a comparison of the identification from the first image and the identification from the second image. Similarly, navigational response module 1908 may cause activation of the steering mechanism and/or the accelerator in response to movement of a vehicle out of a path of collision with the host vehicle.

Figure 16A:
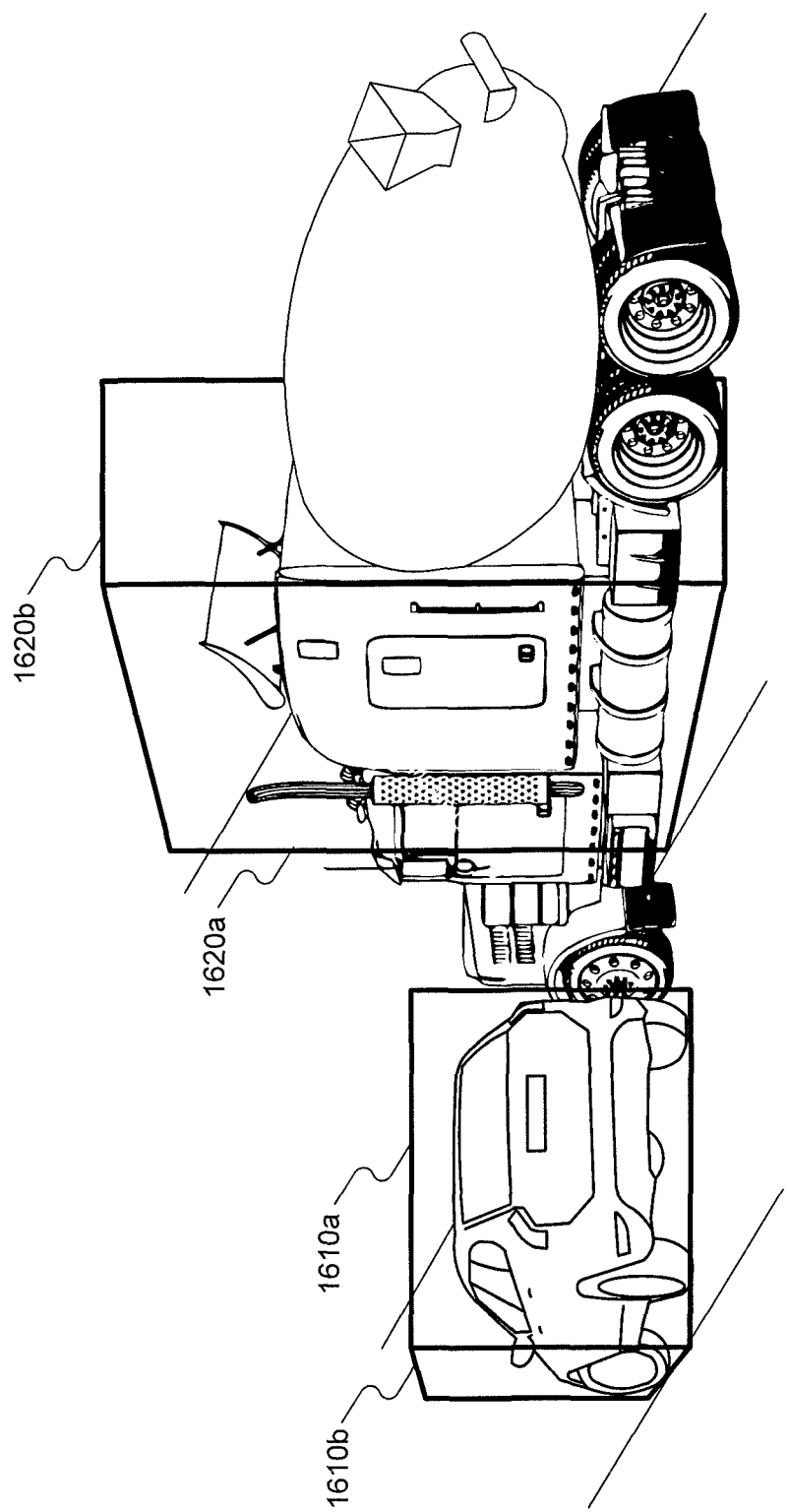
FIG. 16A illustrates an example of technical problems with vehicle detection using only bounding boxes.

FIG. 16A illustrates an example of technical problems with vehicle detection using only bounding boxes. In the example of FIG. 16A, a car may be properly identified using bounding boxes 1610a and 1610b, but other vehicles such as a cement mixer may fail to be properly identified using bounding boxes, as seen with bounding boxes 1620a and 1620b.

Figure 16B:
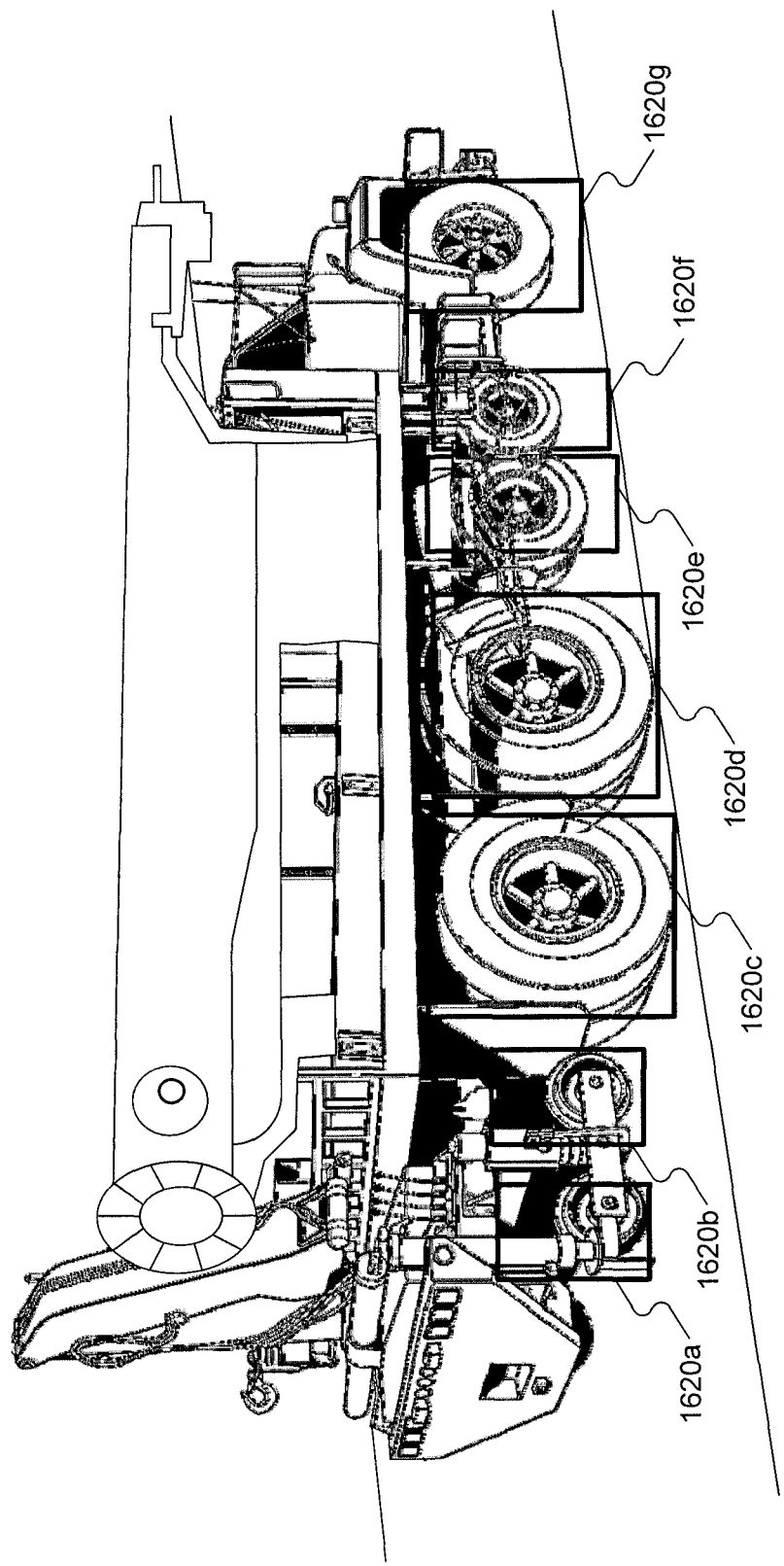
FIG. 16B illustrates an example of technical improvements in vehicle detection using wheel identification consistent with the disclosed embodiments.

FIG. 16B illustrates an example of technical improvements in vehicle detection using wheel identification consistent with the disclosed embodiments. As depicted in the example of FIG. 16B irregular vehicles, such as the crane depicted in FIG. 16B, may be properly identified using bounding boxes for wheels of the vehicle rather than bounding boxes for the vehicle itself. As shown in FIG. 16B, bounding boxes 1620a, 1620b, 1620c, 1620d, 1620e, 1620f, and 1620g fully encapsulate all visible wheels of the vehicle.

Figure 16C:
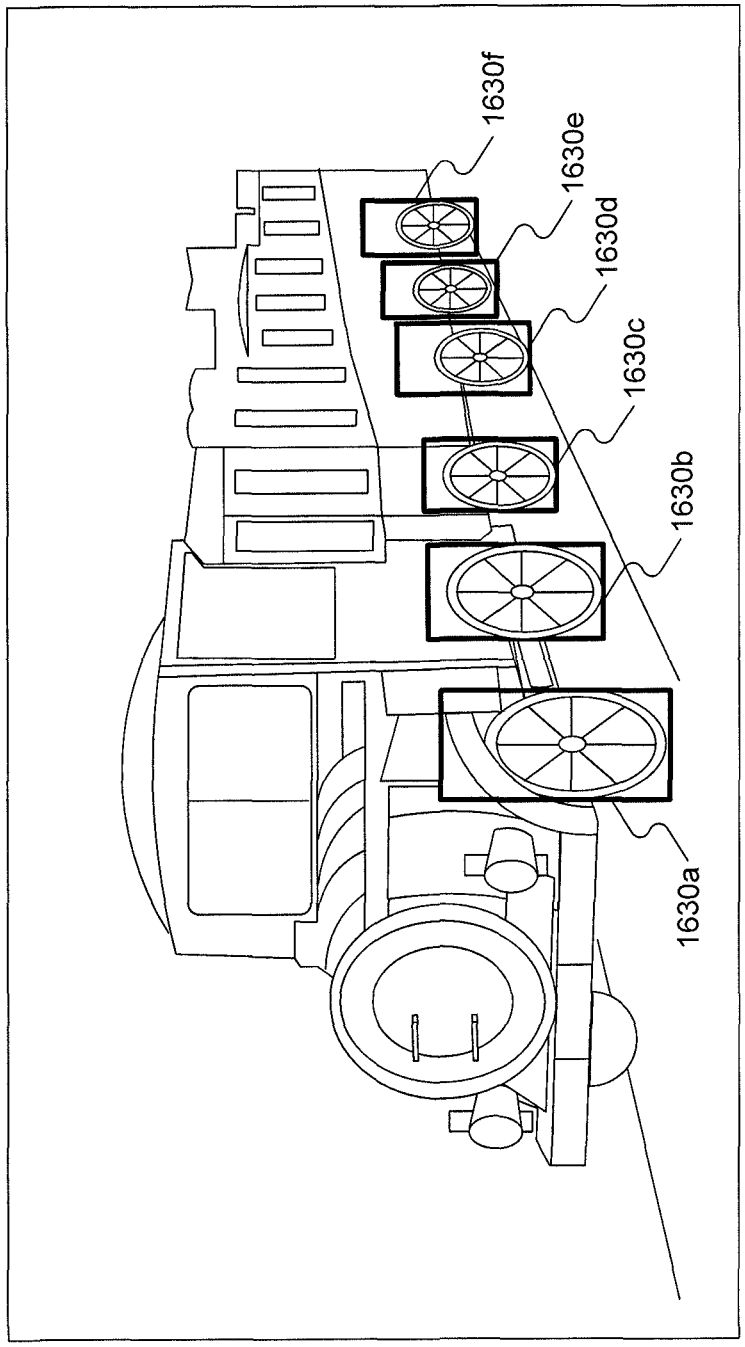
FIG. 16C illustrates another example of technical improvements in vehicle detection using wheel identification consistent with the disclosed embodiments.

FIG. 16C illustrates another example of technical improvements in vehicle detection using wheel identification consistent with the disclosed embodiments. Similar to FIG. 16B, bounding boxes 1630a, 1630b, 1630c, 1630d, 1630e, and 1630f fully encapsulate all visible wheels of the vehicle.

Figure 17A:
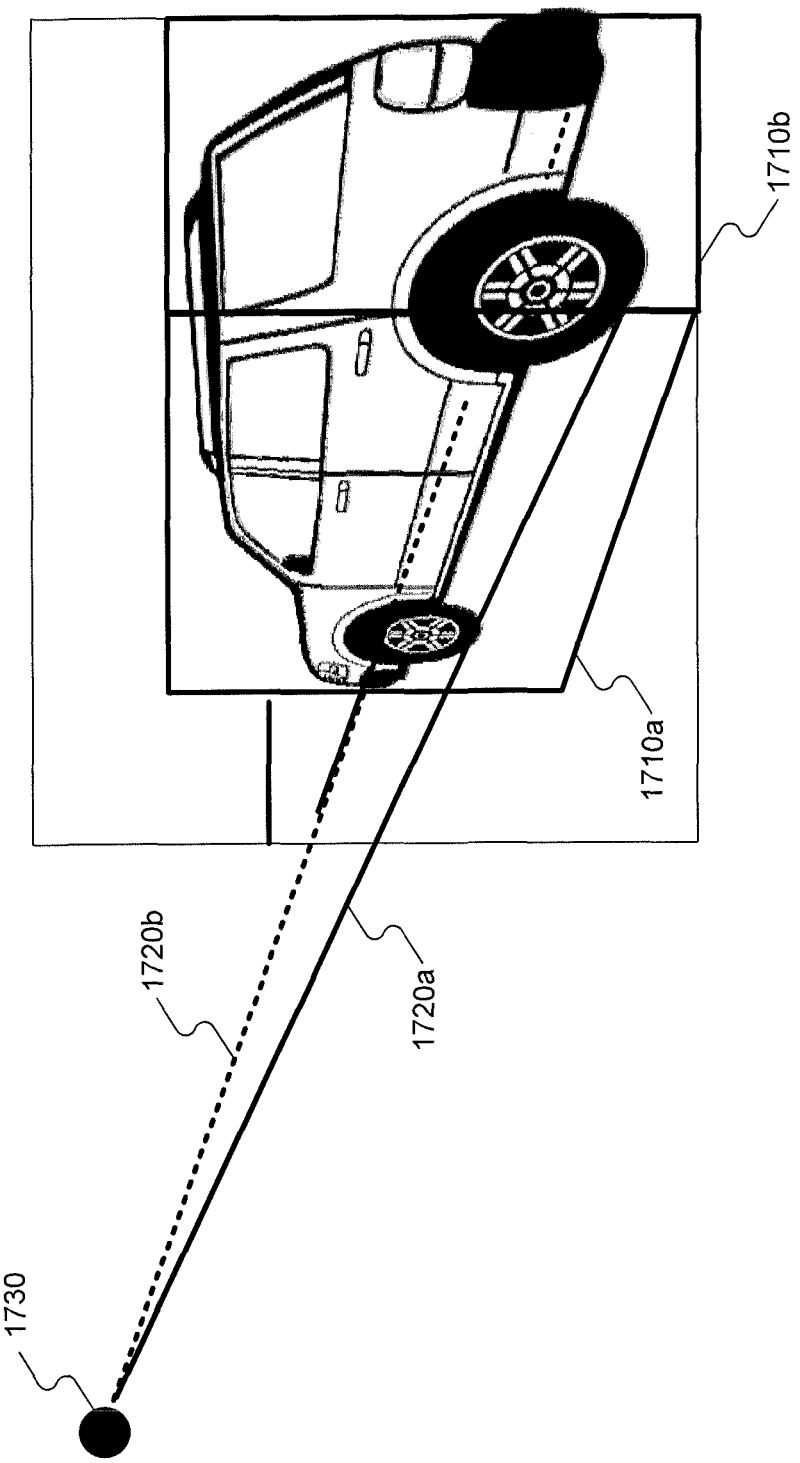
FIG. 17A illustrates an example of host vehicle navigation with wheel identification consistent with the disclosed embodiments.

FIG. 17A illustrates an example of host vehicle navigation with wheel identification consistent with the disclosed embodiments. For example, wheel bounding boxes may be used to refine predictions based on bounding boxes for the entire target vehicle. In the example depicted in FIG. 17A, the vehicle is detected using bounding boxes 1710a and 1710b. By detecting the wheels, line 1720a connecting the points of contact between the wheels and ground as well as line 1720b connecting the top points of the wheels may be determined. These lines converge towards vanishing point 1730. Based on whether vanishing point 1730 is to the one side of a centerline of the host vehicle or the other, the host vehicle may determine if the target is on a trajectory crossing the host vehicle path. For example, if vanishing point 1730 is on one side of the centerline and bounding box 1710a and/or 1710b are on the other side of the centerline, the host vehicle may determine that the target vehicle is on a trajectory projected to cross that of the host vehicle.

Figure 17B:
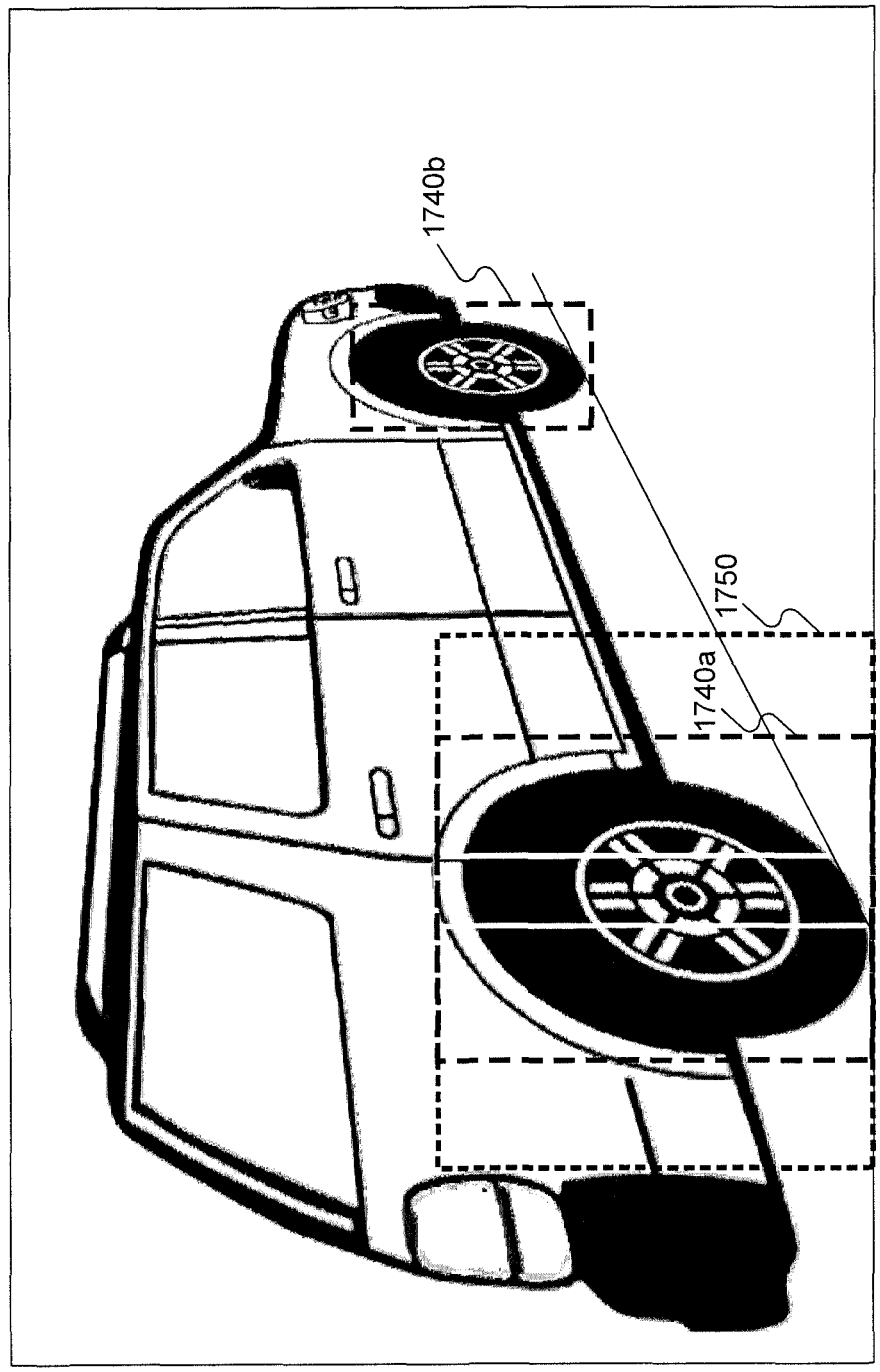
FIG. 17B illustrates an example of target vehicle prediction with wheel identification consistent with the disclosed embodiments.

FIG. 17B illustrates an example of target vehicle prediction with wheel identification consistent with the disclosed embodiments. In the example of FIG. 17B, bounding box 1740a identifies a rear wheel of the target vehicle and bounding box 1740b identifies a front wheel of the target vehicle. As further depicted in FIG. 17B, a predicted tracking region 1750 is applied to the image. For example, as depicted in FIG. 17B predicted tracking region 1750 may comprise a rectangular area that is larger than bounding 1740a in at least one dimension (in the example of FIG. 17B, length). However, in other embodiments, other tracking regions may be used, such as parallelograms, trapezoids, or other regular shapes or any irregular shapes.

Figure 17C:
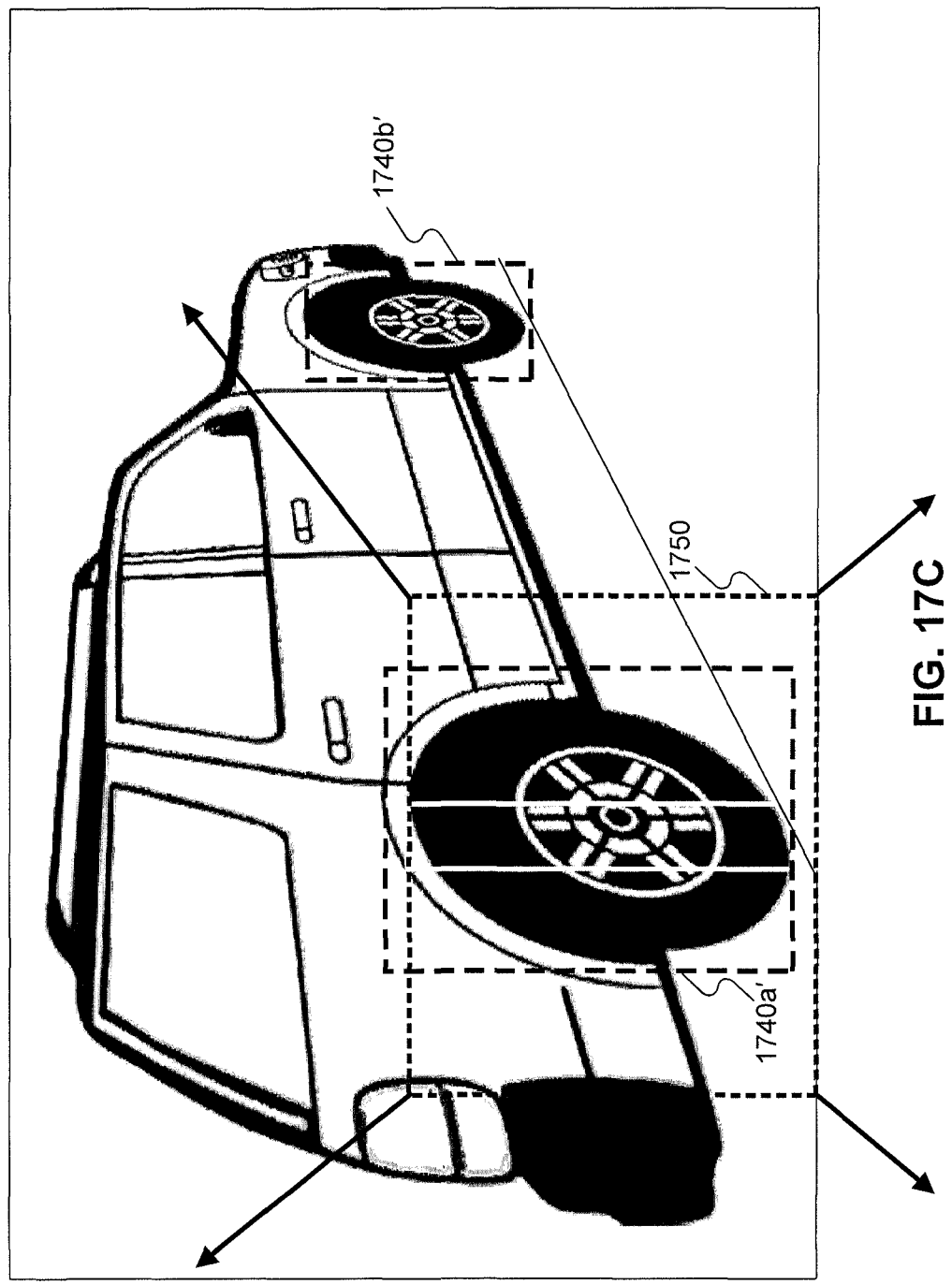
FIG. 17C illustrates an example of target vehicle predictions based on the wheel identification of FIG. 17B.

FIG. 17C illustrates an example of target vehicle predictions based on the wheel identification of FIG. 17B. For example, FIG. 17C may represent a second, later image relative to the first image of FIG. 17A. In the example of FIG. 17C, bounding box 1740a' identifies the new position of the rear wheel of the target vehicle and bounding box 1740b' identifies the new position of the front wheel of the target vehicle. Because bounding box 1740a' is (mostly, e.g., more than 80%) within tracking region 1750, bounding box 1740a' may be determined to identify the same wheel as bounding box 1740a. Moreover, based on a comparison of bounding box 1740a' and bounding box 1740a, one or more predicted motion vectors may be determined for the target vehicle. The motion vectors may be further based on one or more additional factors, such as road orientation, ego motion of the host vehicle, and the like. Moreover, as shown in FIG. 17C, multiple predictions may be determined.

In one embodiment, the system may verify the wheel detection over multiple frames. For example, at least one processing device (e.g., processing 110) may track the wheel from a first frame to a second frame and independently perform a fresh wheel detection in the second frame. The location of the new detection may approximately match the tracked location. The tracking may be performed on a patch that is larger than the actual wheel (e.g., using the portion of the image corresponding to bounding box 1750 instead of bounding box 1740a'). In some embodiments, the tracking may be initialized based on an estimate. For example, if a model of the road plane and point on the road can be mapped to 3D coordinates (X,Y,Z), the point of contact of the wheel with the road may also be mapped to 3D coordinates. The ego motion of the vehicle between the two image time steps may then be used to update the wheel location in the new vehicle coordinates, which may then be mapped back to image coordinates. This processing may provide an estimate of the expected wheel location assuming the target vehicle is stationary. A second estimate for expected wheel location in the second image may assume the target is moving together with the host vehicle and so it will not move in the image.

Although not depicted in FIG. 17C, the predicted vectors may be further filtered to identify one or more likely predicted motion vectors. For example, a Lucas-Kanade filter may be used to filter the multiple predicted motion vectors. Tracking using a Lukas-Kanade filter may include tracking using an image translation plus scale model such as described at, for example, equation 9 of U.S. Pat. No. 7,113,867, which is incorporated herein by reference.

Figure 18:
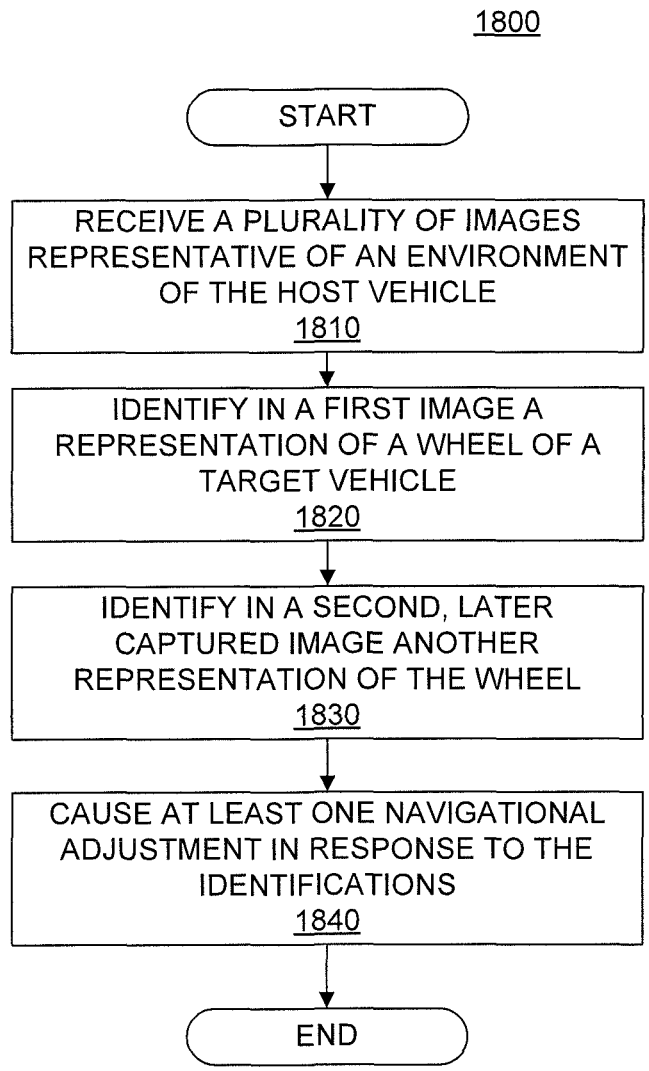
FIG. 18 is a flowchart showing an exemplary process for navigating a host vehicle based on wheel detection consistent with the disclosed embodiments.

FIG. 18 provides a flowchart representing an example process 1800 for navigating a host vehicle based on wheel detection. Process 1400 may be performed by at least one processing device, such as processing device 110.

At step 1810, the at least one processing device (e.g., processing device 110) of the host vehicle navigation system may receive, from at least one image capture device, a plurality of images representative of an environment of the host vehicle. For example, processing device 110 may receive (and, in some embodiments, store) images acquired by one of image capture devices 122, 124, and 126.

At step 1820, the at least one processing device (e.g., processing device 110) may identify in a first image from among the plurality of images a representation of a wheel of a target vehicle. For example, the at least one processing device may identify the representation as explained above with respect to wheel identification module 1504 of FIG. 15.

In some embodiments, the at least one processing device may further determine a first bounding box for the wheel in the first image. For example, the first bounding box may be determined as explained above with respect to wheel identification module 1504 of FIG. 15.

At step 1830, the at least one processing device (e.g., processing device 110) may identify in a second image from among the plurality of images another representation of the wheel of the target vehicle. The second image may have been captured by the at least one image capture device after the first image, as explained above with respect to image receiving module 1502.

Additionally with or alternatively to determining a first bounding box for the wheel in the first image, the at least one processing device may determine a second bounding box for the wheel in the second image. For example, the second bounding box may be determined as explained above with respect to wheel identification module 1504 of FIG. 15.

The first image and the second image may include a common reference feature, and a first point in the first image and a second point in the second image may be located a predetermined distance from the common reference feature. For example, the reference feature may comprise a lane marking, a road edge, a building, or any other object against which motion of the identified wheel may be determined. In some embodiments, the common reference feature may be associated with a stationary object, and in some embodiments, the common reference feature may be associated with a moving object. Further, in some embodiments, the common reference feature may comprise any part or location of the vehicle (e.g., a door edge, portion of the vehicle body, etc.) associated with the wheel or any part of a location of another vehicle in the environment of the wheel. The reference feature may be identified similarly to the wheel as explained above with respect to wheel identification module 1504 of FIG. 15.

In embodiments where a first bounding box and a second bounding box are determined, the at least one processing device may align the first bounding box and the second bounding box. For example, the at least one processing device may shift the first image and/or the second image based on ego motion of the host vehicle to perform the alignment. Additionally or alternatively, homography warping, as described further below with respect to FIGS. 21A-21C, may be used to perform the alignment.

In any of the embodiments described above, the representation of the wheel of the target vehicle may be identified in the first image or in the second image using a trained system. For example, the trained system may include a neural network, as described above with respect to wheel identification module 1504 of FIG. 15.

In any of the embodiments described above, the at least one processing device may determine an envelope associated with the target vehicle based on the identification of the representation of the wheel of the target vehicle in the first image and in the second image. For example, the envelope may comprise a tracking region, as described above with respect to comparison module 1506 of FIG. 15.

In any of the embodiments described above, the at least one processing device may determine a vehicle type associated with the target vehicle based on the identification of the representation of the wheel of the target vehicle in the first image and in the second image. For example, the at least one processing device may apply a neural network trained to identify vehicles based on features of wheel representations.

At step 1840, the at least one processing device (e.g., processing device 110) may cause at least one adjustment of a navigational actuator of the host vehicle in response to identification of a representation of the wheel of the target vehicle in the first image and in the second image. For example, the at least one processing device may cause the at least on adjustment as explained above with respect to navigational response module 1508.

The adjustment to the navigational actuator may be based on a rotation of the wheel identified based on a comparison of the representation of the wheel in the first image to the representation of the wheel in the second image. For example, the at least one processing device may decelerate the host vehicle and/or apply the brakes of the host vehicle if the rotation of the wheel indicates that the target vehicle is moving more slowly than the host vehicle and the host vehicle wants to enter a lane of travel behind the target vehicle. In another example, the at least one processing device may accelerate the host vehicle if the rotation of the wheel indicates that the target vehicle is moving more quickly than the host vehicle and the host vehicle wants to enter a lane of travel ahead of the target vehicle.

Additionally or alternatively, the adjustment to the navigational actuator may be based on a translation of the wheel identified based on a comparison of the representation of the wheel in the first image to the representation of the wheel in the second image. For example, the at least one processing device may decelerate the host vehicle, apply the brakes of the host vehicle, and/or adjust a steering mechanism of the host vehicle if the translation of the wheel indicates that the target vehicle is moving into the lane of travel of the host vehicle.

Further, embodiments disclosed above related to wheel detection may be combined with embodiments disclosed above regarding road boundary edges and/or embodiments disclosed below related to object classification. Such combinations may provide redundancy for autonomous vehicle systems, as discussed in further detail below.

Moving/Non-Moving Object Classification

Embodiments of the present disclosure may use an affine stage of one or more neural networks to classify movements of objects. In some embodiments, two neural networks may be used, one trained to score portions of images for motion and another trained to score portions of images for stationarity. By using two neural networks trained separately rather than a single neural network trained to classify portions as moving or not moving, embodiments of the present disclosure provide technical advantages over the latter, conventional neural networks. In particular, accuracy of the classification may be increased by using two specially trained neural networks rather than a single, more generally trained neural network.

Additionally or alternatively, embodiments of the present disclosure may provide for technical improvements to motion classification, regardless of whether two neural networks are used or a single neural network is used. In particular, embodiments of the present disclosure may provide for pre-warping the region based on an indicator of motion prior to using the neural network(s). Such pre-warping may reduce indicators of motion of the road surface and emphasizes indicators of motion of objects such a vehicles and pedestrians. Accordingly, the output of the neural networks) has increased accuracy due to the pre-warping.

Embodiments of the present disclosure may further provide for neural networks that score regions of images without requiring a specified target. An advantage of one or more disclosed embodiments is that the output structure of the neural network may be fixed and may not depend on the number of targets that are detected. A second advantage is that the same network output, calculated once, may be used to classify multiple target types. Thus, in some embodiments, the neural networks may perform faster than those requiring targets such as vehicles. In addition, such neural networks may recognize motion of regions of images indicative of vehicles, pedestrians, and other objects even if those objects were missed by the classifier or other neural network performing target object detection.

Embodiments of the present disclosure may further provide for neural networks that use indicators of a specified target rather than cropped portions of the images including the specified target. By using an indicator rather than removing information from the images, such neural networks may exhibit increased accuracy. In particular, the neural networks may use additional information included outside of the target indicator in order to refine the motion classification of the specified target.

Embodiments of the present disclosure may further provide for neural networks that use a target mask with multiple targets rather than cropped portions of the images including the specified target. By using a target mask, such neural networks may exhibit improved speed by performing motion classification on multiple targets simultaneously rather than sequentially. Additionally or alternatively, such neural networks may exhibit increased accuracy by using additional information included outside of the targets in order to refine the motion classifications of the specified targets. In order to achieve this, some embodiments provide for a fixed number of targets such that null targets are defined when not enough targets are detected (e.g., using a classifier or other neural network) within the images.

Embodiments of the present disclosure may further provide for neural networks that use a target mask with multiple targets that represent a subset of the total targets detected in the images (e.g., using a classifier or other neural network). In such embodiments, the target mask may be input to the neural network(s) subsequent to one or more of the initial layers (e.g., after deconvolution but before the affine stage). By providing the target mask after one or more of the initial layers, the neural network may re-use at least one output of the one or more initial layers in subsequent calculations using a new target mask that includes at least one of the targets omitted form the initial target mask. Accordingly, the entire classification process may be faster by re-using the at least one output of the one or more initial layers in the subsequent calculations.

Figure 19:
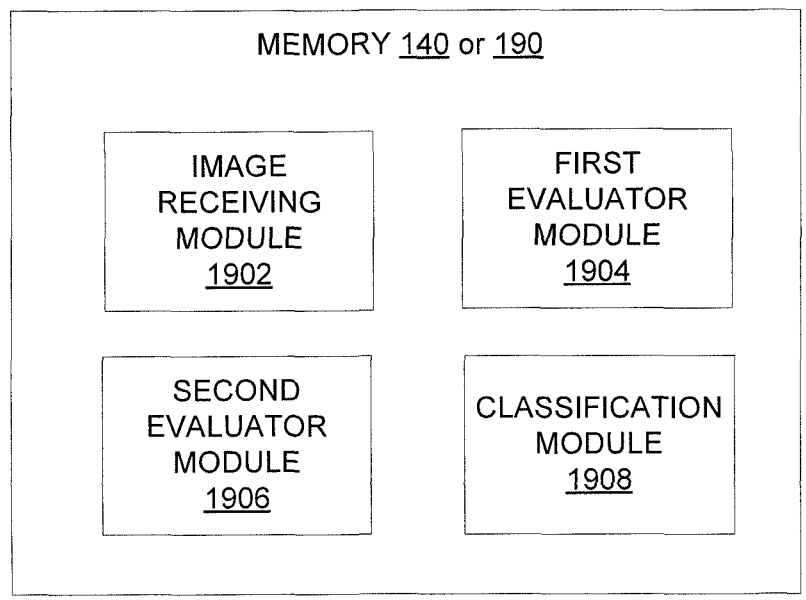
FIG. 19 is an exemplary block diagram of a memory configured to store instructions for classifying objects in an environment of a host vehicle as moving or non-moving consistent with the disclosed embodiments.

FIG. 19 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 19, memory 140 may store an image receiving module 1902, a first evaluator module 1904, a second evaluator module 1906, and a classification module 1908. The disclosed embodiments are not limited to any particular configuration of memory 140. Further, applications processor 180 and/or image processor 190 may execute the instructions stored in any of modules 1902, 1904, 1906, and 1908 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image receiving module 1902 may store instructions which, when executed by processing unit 110, cause processing unit 110 to receive, from at least one image capture device of the host vehicle, a plurality of images representative of the environment of a host vehicle. For example, image receiving module 1902 may receive (and, in some embodiments, store) images acquired by one of image capture devices 122, 124, and 126.

In one embodiment, first evaluator module 1904 may store instructions which, when executed by processing unit 110, cause processing unit 110 to provide to a first evaluator system, for an image segment defining a particular image area, a portion of a first image, from among the plurality of images, corresponding to the image segment and provide to the first evaluator system a portion of a second image, from the plurality of images, corresponding to the image segment. As used herein, the term "image segment" refers to any collection of pixels forming a subset of an image. In some embodiments, the pixels may be contiguous. In such embodiments, the segment may comprise a regular shape, such as a line, a rectangle, a parallelogram, a trapezoid, or the like or may comprise an irregular shape. In other embodiments, at least one pixel may be discontinuous from other pixels in the segment.

The image segment may define, at least in part, a particular image area. For example, the image segment may comprise an area of an object, such as a vehicle, a pedestrian, or the like. Alternatively, the image segment may comprise a portion of an area of an object, such as a column of a vehicle, a column of a pedestrian, a row of a vehicle, a row of a pedestrian, or the like. For example, the segment may also be a fixed location in the image region such as columns 1-10 of the image region. As another example, a second segment may include columns 11-20 of the image region. Thus, in some embodiments, the image segment may correspond to any number of divisions of an image or image area, such as dividing an image into a plurality of columns or rows.

The first evaluator system may be configured to provide a first output, based on a comparison between image features in the provided portion of the first image and image features in the provided portion of the second image, indicative of whether the image segment is associated with moving image features. For example, the first evaluator system may comprise a neural network configured to analyze the images, such as a convolutional neural network. The first output may comprise a Boolean or a score. For example, the score may be higher depending on a magnitude of the motion of the image segment (and, correspondingly, of an object in the particular image area) and/or on a confidence level associated with the first output.

In one embodiment, second evaluator module 1906 may store instructions which, when executed by processing unit 110, cause processing unit 110 to provide to a second evaluator system the portion of the first image corresponding to the image segment and provide to the second evaluator system the portion of the second image corresponding to the image segment.

The second evaluator system may be configured to provide a second output, based on a comparison between image features in the provided portion of the first image and image features in the provided portion of the second image, indicative of whether the image segment is associated with stationary image features. For example, the second evaluator system may comprise a neural network configured to analyze the images, such as a convolutional neural network. The second output may comprise a Boolean or a score. For example, the score may be higher depending on a degree of the stationariness of the image segment (and, correspondingly, of an object in the particular image area) and/or on a confidence level associated with the second output.

In one embodiment, classification module 1908 may store instructions which, when executed by processing unit 110, cause processing unit 110 to determine, based on the first output and the second output, a classification of the image segment as at least one of moving or not moving.

Although the embodiments described above use a single image segment, a plurality of image segments may be used. For example, the first evaluator system may provide a plurality of first outputs, each for a different image segment comprising the particular image area, and the second evaluator system may provide a plurality of second outputs, each for a different image segment. In such embodiments, classification module 1908 may determine a composite output for the particular image area based on the first outputs and the second outputs. For example, the composite output may comprise a weighted average of the moving scores, a weighted average of the stationary scores, or a single average of both the moving scores and the stationary scores. Alternatively, the first outputs and the second outputs may comprise Booleans (or may be converted to Booleans by comparing the first outputs to a moving threshold and the second outputs to a stationary threshold), and the composite output may comprise a weighted Boolean summation.

In such embodiments, classification module 1908 may determine, based on the composite output, a classification of the particular image area as at least one of moving or not moving. For example, a composite moving score may be compared against one or more thresholds, a composite stationary score may be compared against one or more thresholds, and/or a total composite score may be compared against one or more thresholds to determine the classification.

In either of the embodiments described above, the classification may allow for indeterminateness. For example, two thresholds may be used such that any moving scores (whether outputs or composite moving scores) between the two thresholds result in an indeterminate classification and/or two thresholds may be used such that any stationary scores (whether outputs or composite stationary scores) between the two thresholds result in an indeterminate classification. Additionally or alternatively, a moving score and a stationary score may be compared such that two outputs (or two composite scores) that are both high (e.g., above a threshold) for moving and stationariness or are both low (e.g., below a threshold) for moving and stationariness result in indeterminate classifications.

Figure 20:
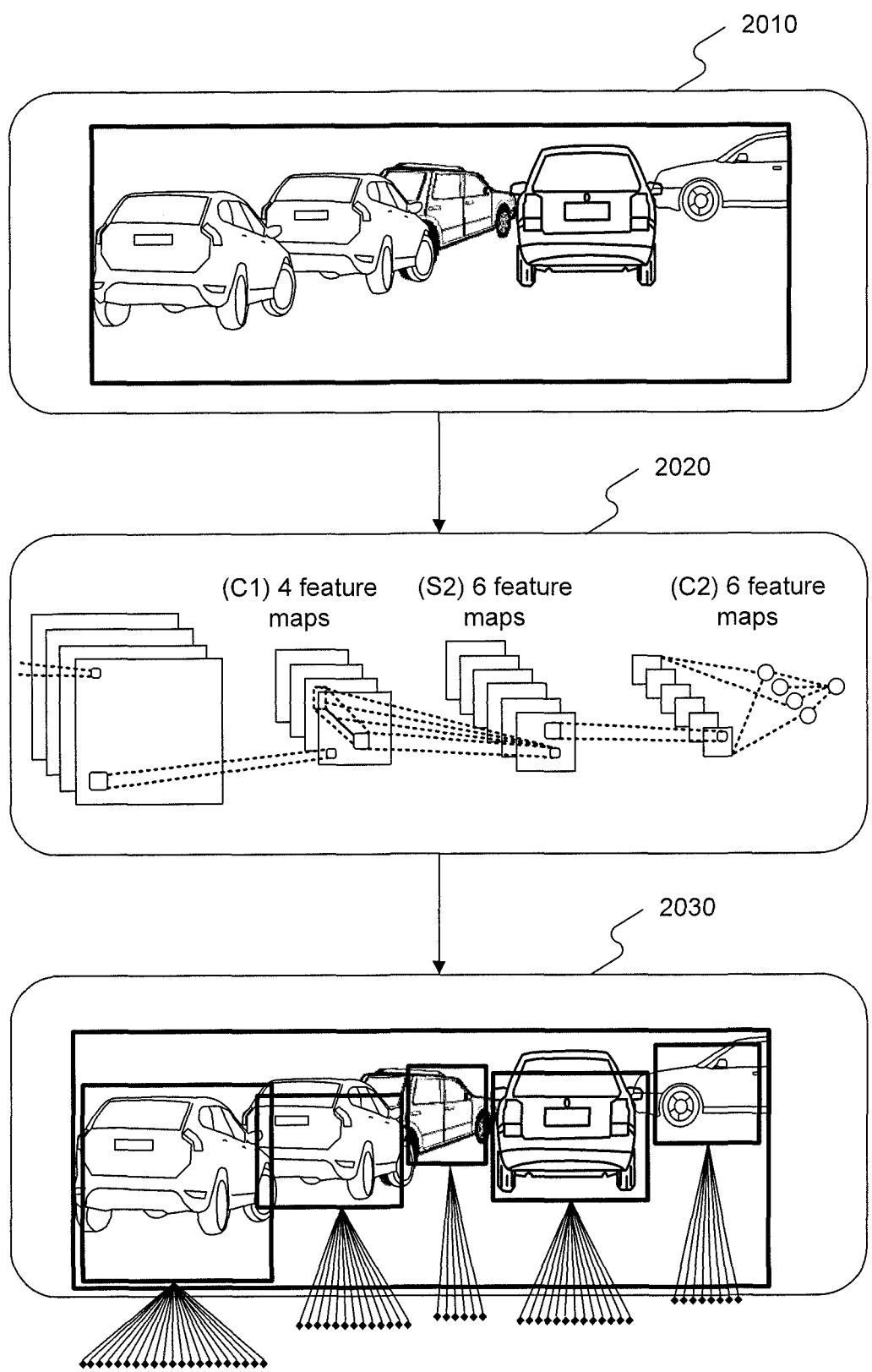
FIG. 20 illustrates an example use of one or more neural networks to determine moving/non-moving image segment scores consistent with the disclosed embodiments.

FIG. 20 illustrates an example of one or more neural networks for determining moving/non-moving image segment scores consistent with one or more of the disclosed embodiments. For example, two or more images representative of the environment of the host vehicle may be received (step 2010). In the example of FIG. 20, a plurality of target vehicles is represented within the image. Other objects, such as buildings, lane markings, pedestrians, or the like may additionally or alternatively be represented within the image. At least one neural network may then be applied to the two images (step 2020). For example, a convolutional neural network may be applied to analyze the image and output one or more scores based on the analysis.

Although the neural network of FIG. 20 is depicted as having three layers, any number of layers may be used. Moreover, although the neural network of FIG. 20 is depicted as having four feature maps in the first layer, six feature maps in the second layer, and six feature maps in the third layer, any number of feature maps may be used in each layer.

As further depicted in FIG. 20, a score for each image segment of each particular image area may be determined (step 2030). For example, each score may represent a magnitude of the motion of the image segment (and, correspondingly, of an object in the particular image area) and/or on a confidence level associated with a moving score, a degree of the stationariness of the image segment (and, correspondingly, of an object in the particular image area) and/or on a confidence level associated with the stationary score, or a combination (such as a sum, an average, or the like) of the moving score and the stationary score. In the example of FIG. 20, the plurality of points radiating from each particular image area represents a score for an image segment comprising a column of pixels in the particular image area. As explained above with respect to classification module 1908, the scores may be used to classify each column or may be combined such that the combined score for each particular image area may be used to classify the particular image area or target.

Figure 21A:
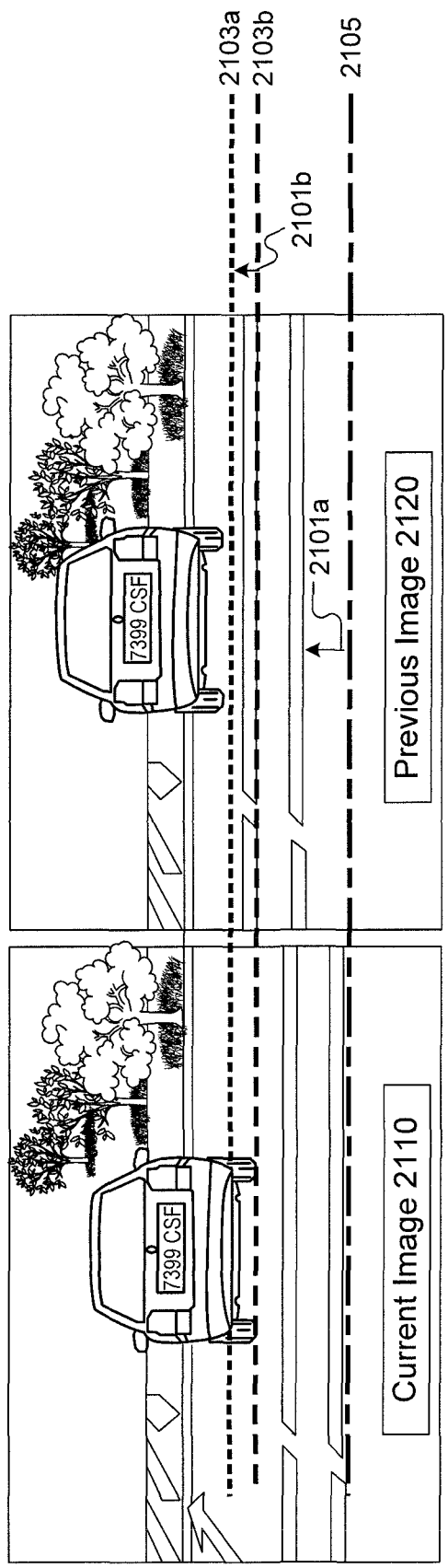
FIG. 21A illustrates an example of two images input into one or more neural networks to determine moving/non-moving classifications consistent with the disclosed embodiments.

FIG. 21A illustrates an example of two images, current image 2110 and previous image 2120, input into one or more neural networks to determine moving and/or non-moving classifications consistent with the disclosed embodiments. As depicted in FIG. 21A, motion 2101*a* of the lane markings may be determined by comparison of the lane markings along line 2105. In addition, motion 2101*b* of the target vehicle may be determined by comparison of a portion of the target vehicle (e.g., a contact point between the wheels and the road) from line 2103*a* to line 2103*b*. As may be seen in FIG. 21A, movement of the host vehicle renders the road a suboptimal surface for measuring motion of, for example, a target vehicle, a pedestrian, or other object against. This may mean that the evaluator system (e.g. a neural network) may need work harder and thus may require more training and may need to be more complex.

Figure 21B:
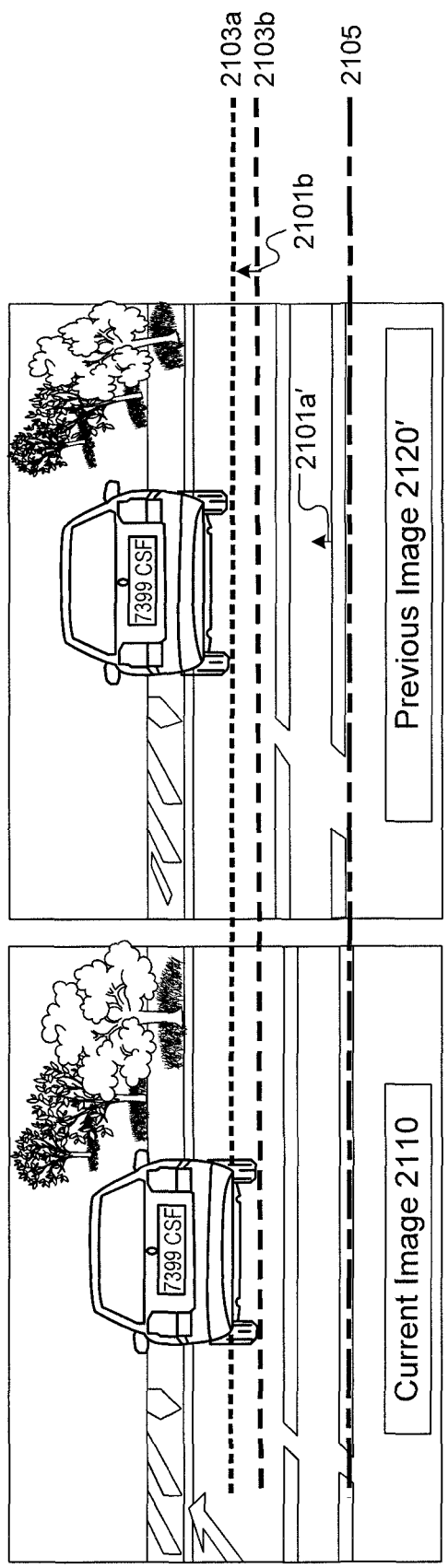
FIG. 21B illustrates an example of pre-warping, using homography warping, images input into one or more neural networks to determine moving/non-moving classifications consistent with the disclosed embodiments.

FIG. 21B illustrates an example of pre-warping, using homography warping, images input into one or more neural networks to determine moving/non-moving classifications consistent with the disclosed embodiments. As depicted in FIG. 21B, current image 2110 is unchanged but previous image 2120' has undergone homography warping with respect to current image 2110. Although not depicted in FIG. 21B, current image 2110 may instead undergo homography warping towards previous image 2120. Accordingly, as depicted in FIG. 21B, motion 2101*a'* of the lane markings may be reduced (or even eliminated) as seen along line 2105. Therefore, motion 2101*b* of the target vehicle may be emphasized (in comparison to reduced motion 2101*a'* and/or on account of the homography warping) as seen along a portion of the target vehicle (e.g., a contact point between the wheels and the road) from line 2103*a* to line 2103*b*. Accordingly, homography warping may provide for more accurate motion classification after the warped image is sent to one or more neural networks for motion classification.

Figure 21C:
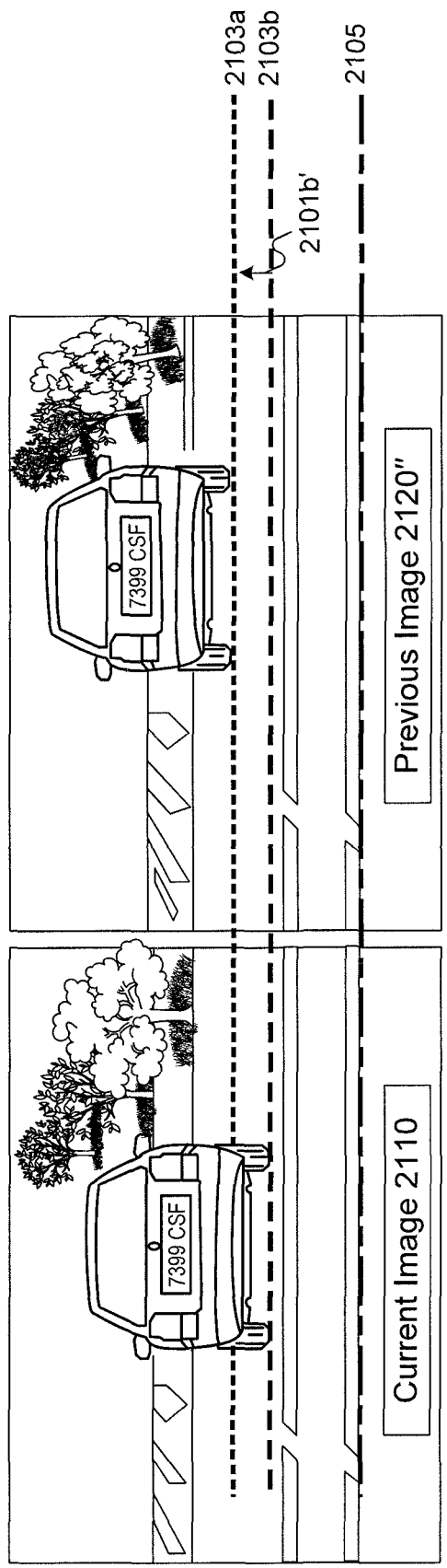
FIG. 21C illustrates an example of pre-warping, using neural network road surface warping, images input into one or more neural networks to determine moving/non-moving classifications consistent with the disclosed embodiments.

FIG. 21C illustrates an example of pre-warping, using neural network road surface warping, images input into one or more neural networks to determine moving and/or non-moving classifications consistent with the disclosed embodiments. As depicted in FIG. 21C, current image 2110 is unchanged but previous image 2120" has undergone warping with respect to current image 2110 based on output of a (convolutional) neural network trained to recover a model of the road surface. Although not depicted in FIG. 21B, current image 2110 may instead undergo neural network warping towards previous image 2120. Accordingly, as depicted in FIG. 21C, motion of the lane markings may be reduced (or even eliminated, as depicted in FIG. 21C) as seen along line 2105. Therefore, motion 2101*b'* of the target vehicle may be emphasized (in comparison to reduced motion of the lane markings and/or on account of the neural network warping) as seen along a portion of the target vehicle (e.g., a contact point between the wheels and the road) from line 2103*a* to line 2103*b*. Accordingly, neural network warping may provide for more accurate motion classification after the warped image is sent to one or more neural networks for motion classification. Moreover, as seen by comparison of FIG. 21C to FIG. 21B, neural network warping may further increase accuracy in comparison to homography warping by further reducing lane marking motion between the images and/or by further emphasizing object motion between the images as compared to homography warping. However, neural network warping may require more computational resources than homography warping.

Figure 22A:
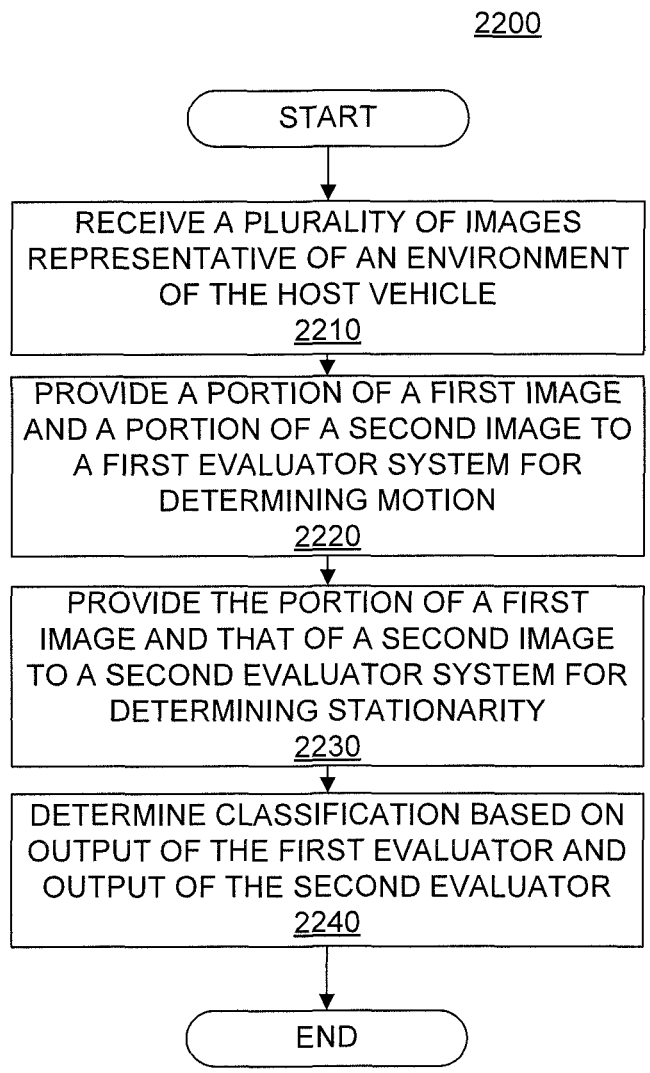
FIG. 22A is a flowchart showing an exemplary process for classifying objects in an environment of a host vehicle as moving or non-moving consistent with the disclosed embodiments.

FIG. 22A provides a flowchart representing an example process 2200 for classifying objects in an environment of a host vehicle as moving or non-moving consistent with the disclosed embodiments. Process 2200 may be performed by at least one processing device, such as processing device 110.

At step 2210, the at least one processing device (e.g., processing device 110) of the host vehicle navigation system may receive, from at least one image capture device of the host vehicle, a plurality of images representative of the environment of the host vehicle. For example, processing device 110 may receive (and, in some embodiments, store) images acquired by one of image capture devices 122, 124, and 126.

At step 2220, the at least one processing device (e.g., processing device 110) may, for an image segment defining a particular image area, provide to a first evaluator system a portion of a first image, from among the plurality of images, corresponding to the image segment and provide to the first evaluator system a portion of a second image, from the plurality of images, corresponding to the image segment. As explained with respect to first evaluator module 1904, first evaluator system may be configured to provide a first output, based on a comparison between image features in the provided portion of the first image and image features in the provided portion of the second image, indicative of whether the image segment is associated with moving image features.

Alternatively, the at least one processing device (e.g., processing device 110) may, for a plurality of image segments defining a particular image area, provide to a first evaluator system a portion of a first image, from among the plurality of images, corresponding to the plurality of image segments and provide to the first evaluator system a portion of a second image, from the plurality of images, corresponding to the plurality of image segments. Accordingly, the first evaluator system may be configured to provide first outputs, based on a comparison between image features in the provided portion of the first image and image features in the provided portion of the second image, indicative of whether the image segments are associated with moving image features.

In either embodiment described above, a first output may include a value indicative of a likelihood that image features included in at least one of the portion of the first image corresponding to the image segment and the portion of the second image corresponding to the image segment are associated with moving objects. For example, the first output may comprise a Boolean or a score, as explained with respect to first evaluator module 1904.

In any of the embodiments described above, the first evaluator system may include a first neural network. In one example applicable to any of the embodiments described above, the image features in at least the provided portion of the first image may represent a target vehicle. In another example, the image features in at least the provided portion of the first image may represent a pedestrian.

The particular image area defined by the image segment may correspond to a predetermined number of columns of pixels. Alternatively, the particular image area defined by the image segment may correspond to a predetermined number of rows of pixels. In another alternative, the particular image area defined by the image segment corresponds to a predetermined N x M block of pixels.

In any of the embodiments described above, the at least one processing device (e.g., processing device 110) may detect at least one indicator of motion of the host vehicle and make at least one image modification to the first portion of the first image to account for the at least one detected indicator of motion of the vehicle. Additionally or alternatively, the at least one processing device (e.g., processing device 110) may make at least one image modification to the corresponding portion of the second image to account for the at least one detected indicator of motion of the vehicle. In either embodiment, the at least one image modification may include a homography alignment, as explained above with respect to FIG. 21B. Additionally or alternatively, the at least one image modification may include a road surface alignment, as explained above with respect to FIG. 21C.

At step 2230, the at least one processing device (e.g., processing device 110) may provide to a second evaluator system the portion of the first image corresponding to the image segment and provide to the second evaluator system the portion of the second image corresponding to the image segment. As explained with respect to second evaluator module 1905, second evaluator system may be configured to provide a second output, based on a comparison between image features in the provided portion of the first image and image features in the provided portion of the second image, indicative of whether the image segment is associated with stationary image features.

Alternatively, the at least one processing device (e.g., processing device 110) may provide to a second evaluator system the portion of the first image corresponding to the plurality of image segments and provide to the second evaluator system the portion of the second image corresponding to the plurality of image segments. Accordingly, the second evaluator system may be configured to provide second outputs, based on a comparison between image features in the provided portion of the first image and image features in the provided portion of the second image, indicative of whether the image segments are associated with stationary image features.

In either embodiment described above, a second output may include a value indicative of a likelihood that image features included in at least one of the portion of the first image corresponding to the image segment and the portion of the second image corresponding to the image segment are associated with stationary objects. For example, the second output may comprise a Boolean or a score, as explained with respect to second evaluator module 1906.

In any of the embodiments described above, the second evaluator system may include a second neural network. In any of the embodiments described above, the at least one processing device (e.g., processing device 110) may provide, to one or more of the first evaluator system and the second evaluator system, a target mask corresponding to a target area of interest in at least one of the provided portion of the first image and the provided portion of the second image. For example, the target mask may comprise a boundary (e.g., a series of coordinates) delineating the target area of interest. In some embodiments, the target mask may comprise a binary mask of pixels inside the target area of interest.

In such embodiments, the at least one processing device may receive, from the first evaluator system, a target area output, based on analysis of image features in the target area of interest in at least one of the provided portion of the first image and the provided portion of the second image, the target area output being indicative of whether the target area of interest is associated with at least one moving image feature. Additionally or alternatively, the at least one processing device may receive, from the second evaluator system, a target area output, based on analysis of image features in the target area of interest in at least one of the provided portion of the first image and the provided portion of the second image, the target area output being indicative of whether the target area of interest is associated with at least one stationary image feature.

Alternatively, the at least one processing device (e.g., processing device 110) may provide, to the first evaluator system and the second evaluator system, a first target mask corresponding to a first target area of interest in the provided portion of the first image and a second target mask corresponding to a second target area of interest in the provided portion of the second image. The first evaluator system and the second evaluator system may generate the respective first and second outputs based on analysis of image features associated with the first target mask and the second target mask. For example, outputs of the first evaluator system and the second evaluator system may be aggregated and/or converted to classifications based on the target masks.

In some embodiments, there may be more than two targets. For example, if N=8 targets, the mask may have pixels associated with target i=1 . . . 8 labeled with a label for target i. In a simplest case, the mask image pixels associated with target i=1 . . . 8 may be labeled with the value I and may be zero otherwise.

Although the embodiments above are described using a first image and a second image, further images may be used. For example, the at least one processing device (e.g., processing device 110) may provide, to the first evaluator system, a portion of a third image, from among the plurality of images, corresponding to the image segment (or the plurality of image segments, depending on the embodiment). In the case of three images the evaluator system (e.g., a neural network) may accept as input three images and output the same moving/stationary outputs as before. Alternatively, pairs of images may be input to the evaluator system (e.g., a neural network) to obtain multiple estimates for each target. For example, three images at once may be input in some embodiments. The first evaluator system may be configured to provide a third output (or third outputs, depending on the embodiment), based on a comparison between image features in the provided portion of the second image and image features in the provided portion of the third image, indicative of whether the image segment (or the image segments, depending on the embodiment) is associated with moving image features. Similarly, the at least one processing device (e.g., processing device 110) may provide, to the second evaluator system, the portion of the third image corresponding to the image segment (or the plurality of image segments, depending on the embodiment). The second evaluator system may be configured to provide a fourth output (or fourth outputs, depending on the embodiment), based on a comparison between image features in the provided portion of the second image and image features in the provided portion of the third image, indicative of whether the image segment (or the image segments, depending on the embodiment) is associated with stationary image features. Further, in other embodiments, the at least one processing device (e.g., processing device 110) may provide any appropriate number of portions of image segments (e.g., 1, 2, 3, 4, 5, 6, 7, 9, 10, 15, 20, etc.) or any appropriate number of image segments (e.g., 1, 2, 3, 4, 5, 6, 7, 9, 10, 15, 20, etc.) to the first evaluator system and/or second evaluator system.

At step 2240, the at least one processing device (e.g., processing device 110) may determine, based on the first output and the second output, a classification of the image segment as at least one of moving or not moving. For example, the classification may be determined as described with respect to classification module 1908 of FIG. 19, described above. In embodiments where more than two images are used, step 2240 may further include, for example, determining, based on the third output and the fourth output, a classification of the image segment as at least one of moving or not moving.

The classification of the image segment may be designated as moving if the first output is indicative of a high likelihood that image features included in at least one of the portion of the first image corresponding to the image segment and the portion of the second image corresponding to the image segment are associated with moving objects, and the second output is indicative of a low likelihood that image features included in at least one of the portion of the first image corresponding to the image segment and the portion of the second image corresponding to the image segment are associated with stationary objects.

The classification of the image segment may be designated as stationary if the first output is indicative of a low likelihood that image features included in at least one of the portion of the first image corresponding to the image segment and the portion of the second image corresponding to the image segment are associated with moving objects, and the second output is indicative of a high likelihood that image features included in at least one of the portion of the first image corresponding to the image segment and the portion of the second image corresponding to the image segment are associated with stationary objects.

The image segment may be classified as indeterminate if the first output is indicative of either a low likelihood or a high likelihood that image features included in at least one of the portion of the first image corresponding to the image segment and the portion of the second image corresponding to the image segment are associated with moving objects, and the second output is not indicative of either a high likelihood or a low likelihood that image features included in at least one of the portion of the first image corresponding to the image segment and the portion of the second image corresponding to the image segment are associated with stationary objects. Alternatively, the image segment may be classified as indeterminate if the first output is not indicative of either a high likelihood or a low likelihood that image features included in at least one of the portion of the first image corresponding to the image segment and the portion of the second image corresponding to the image segment are associated with moving objects, and the second output is indicative of either a high likelihood or a low likelihood that image features included in at least one of the portion of the first image corresponding to the image segment and the portion of the second image corresponding to the image segment are associated with stationary objects. Alternatively, the image segment may be classified as indeterminate if the first output is not indicative of either a high likelihood or a low likelihood that image features included in at least one of the portion of the first image corresponding to the image segment and the portion of the second image corresponding to the image segment are associated with moving objects, and the second output is not indicative of either a high likelihood or a low likelihood that image features included in at least one of the portion of the first image corresponding to the image segment and the portion of the second image corresponding to the image segment are associated with stationary objects.

In any of the embodiments described above, the at least one processing device (e.g., processing device 110) may determine classifications for each of a plurality of image segments as at least one of moving or not moving based on comparisons, using the first and second evaluator systems, of portions of the first image and portions of the second image corresponding to respective ones of the plurality of image segments. For example, the at least one processor may use one or more further neural networks on the first output(s) and the second output(s).

Alternatively, the at least one processing device (e.g., processing device 110) may determine a composite output for the particular image area based on the first outputs and the second outputs and determine, based on the composite output, a classification of the particular image area as at least one of moving or not moving. The composite output may be determined as described above with respect to classification module 1908 of FIG. 19, described above. In embodiments where more than two images are used, the composite output may, for example, be further based on the third output and the fourth output.

Method 2200 may further include additional steps. For example, method 2200 may include storing the classification of the image segment in association with the first image portion and the second image portion. For example, the first image portion and the second image portion may be stored in a relational database and indexed by the classification or stored in a graph database and linked to the classification. In embodiments where the classification is of the particular image area, method 2200 may include storing the classification of the particular image area in association with the first image portion and the second image portion.

In any of the embodiments described above, method 2200 may further include analyzing at least one of the first or second images captured by the at least one image capture device to identify a target object in the environment of the host vehicle. Method 2200 may further include determining, at least in part based on the classification of the image segment (and/or of the particular image area) as moving or not moving, whether the target object is moving or stationary. Method 2200 may further include causing at least one adjustment of a navigational actuator of the host vehicle in response to the determination. In such embodiments, the navigational actuator may include at least one of a steering mechanism, a brake, or an accelerator.

Additionally, one of skill in the art will appreciate that although certain of the foregoing examples discuss a first evaluating system and a second evaluator system, in some embodiments, the system may use one evaluator system. In such embodiments, the evaluator system may determine whether image features are moving or whether image features are not moving. As yet another alternative, in such embodiments, the evaluator system may determine whether image features are moving and whether image features are not moving. Accordingly, features of any of the foregoing evaluator systems may be combined in some embodiments or distributed across multiple systems. Further, any of the described evaluator systems may include one or more trained systems, such as one or more neural networks, as discussed above.

Figure 22B:
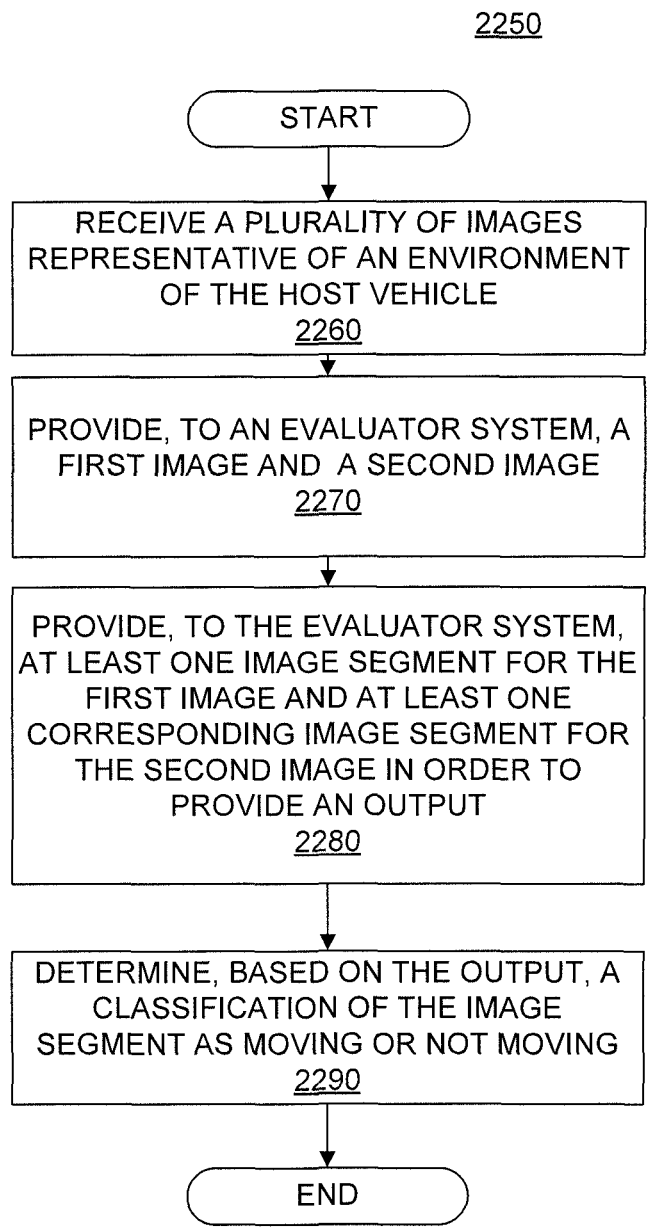
FIG. 22B is another flowchart showing an exemplary process for classifying objects in an environment of a host vehicle as moving or non-moving consistent with the disclosed embodiments.

FIG. 22B provides a flowchart representing an example process 2250 for classifying objects in an environment of a host vehicle as moving or non-moving consistent with the disclosed embodiments. Process 2250 may be performed by at least one processing device, such as processing device 110.

At step 2260, the at least one processing device may receive, from at least one image capture device of the host vehicle, a plurality of images representative of the environment of the host vehicle. For example, processing device 110 may receive (and, in some embodiments, store) images acquired by one of image capture devices 122, 124, and 126.

At step 2270, the at least one processing device may provide, to an evaluator system, a first image of the plurality of images and a second image from the plurality of images, the second image being captured later than the first image. For example, the evaluator system may include functionality corresponding to first evaluator module 1904 and/or second evaluator module 1906, discussed above.

At step 2280, the at least one processing device may provide, to the evaluator system, at least one image segment for the first image and at least one corresponding image segment for the second image, the evaluator system being configured to provide an output, based on a comparison between image features in the at least one image segment of the first image and image features in the at least one image segment of the second image, indicative of whether the at least one image segment is associated with moving image features. For example, the at least one image segment may comprise a plurality of image segments. In some embodiments, the plurality of image segments may comprise a predetermined number of image segments. Furthermore, in some embodiments, the at least one image segment may comprise a column of the first image.

In some embodiments, the at least one image segment may comprise a mask defining a particular area of the first image. For example, the particular area of the first image may comprise a target vehicle or a pedestrian.

As discussed above, the evaluator system may comprise a neural network. For example, the neural network may have two or more layers. In some embodiments, the at least one processing device may provide the at least one image segment and the at least one corresponding image segment to the evaluator system after at least one layer of the evaluator system has been applied to the first image and the second image.

In some embodiments, the at least one processing device may add one or more null segments to obtain the predetermined number of image segments. Further, in some embodiments, the at least one processing device may store one or more images segments for use in a later evaluation cycle to obtain the predetermined number of image segments.

At step 2290, the at least one processing device may determine, based on the output, a classification of the image segment as at least one of moving or not moving. For example, the classification may be determined as described with respect to classification module 1908 of FIG. 19, described above. In embodiments where more than two images are used, step 2240 may further include, for example, determining, based on additional outputs, a classification of the image segment as at least one of moving or not moving.

For example, the classification of the image segment may be designated as moving if the output is indicative of a high likelihood that image features included in at least one of the portion of the first image corresponding to the image segment and the portion of the second image corresponding to the image segment are associated with moving objects. Alternatively, the classification of the image segment may be designated as moving if the output is indicative of a low likelihood that image features included in at least one of the portion of the first image corresponding to the image segment and the portion of the second image corresponding to the image segment are associated with stationary objects.

As further examples, the classification of the image segment may be designated as stationary if the output is indicative of a low likelihood that image features included in at least one of the portion of the first image corresponding to the image segment and the portion of the second image corresponding to the image segment are associated with moving objects. Alternatively, the classification of the image segment may be designated as stationary if the output is indicative of a high likelihood that image features included in at least one of the portion of the first image corresponding to the image segment and the portion of the second image corresponding to the image segment are associated with stationary objects.

In some embodiments, the image segment may be classified as indeterminate if the output is indicative of either a low likelihood or a high likelihood that image features included in at least one of the portion of the first image corresponding to the image segment and the portion of the second image corresponding to the image segment are associated with moving objects or if the output is not indicative of either a high likelihood or a low likelihood that image features included in at least one of the portion of the first image corresponding to the image segment and the portion of the second image corresponding to the image segment are associated with stationary objects.

Alternatively, the image segment may be classified as indeterminate if the output is not indicative of either a high likelihood or a low likelihood that image features included in at least one of the portion of the first image corresponding to the image segment and the portion of the second image corresponding to the image segment are associated with moving objects or if the output is indicative of either a high likelihood or a low likelihood that image features included in at least one of the portion of the first image corresponding to the image segment and the portion of the second image corresponding to the image segment are associated with stationary objects. Alternatively, the image segment may be classified as indeterminate if the output is not indicative of either a high likelihood or a low likelihood that image features included in at least one of the portion of the first image corresponding to the image segment and the portion of the second image corresponding to the image segment are associated with moving objects, or if the output is not indicative of either a high likelihood or a low likelihood that image features included in at least one of the portion of the first image corresponding to the image segment and the portion of the second image corresponding to the image segment are associated with stationary objects.

In any of the embodiments described above, the at least one processing device (e.g., processing device 110) may determine classifications for each of a plurality of image segments as at least one of moving or not moving based on comparisons, using the evaluator system, of portions of the first image and portions of the second image corresponding to respective ones of the plurality of image segments. For example, the at least one processor may use one or more further neural networks on the first output(s) and the second output(s).

Alternatively, the at least one processing device (e.g., processing device 110) may determine a composite output for the particular image area based on one or more outputs and determine, based on the composite output, a classification of the particular image area as at least one of moving or not moving. The composite output may be determined as described above with respect to classification module 1908 of FIG. 19, described above. In embodiments where more than two images are used, the composite output may, for example, be further based on the third output and the fourth output.

To develop highly reliable detection autonomous vehicle applications, redundancy is an important component. Redundancy may be achieved using multiple sensor modalities such as cameras and radars working independently. But with a camera, one may achieve redundancy in the same sensor by applying multiple independent algorithms. As discussed above, the disclosed embodiments related to road boundary edge detection, vehicle wheel detection, and object classification may serve to provide redundancy. Accordingly, embodiments disclosed above related road boundary edge detection, wheel detection, and object classification may be combined to provide redundancy for autonomous vehicle systems. For example, the moving segments discussed above regarding object classification may provide an autonomous vehicle system an indication that an object is present, the lane boundary lines at a certain distance may indicate that there is open space between the host vehicle and a closest lane boundary, and wheel detection without prior vehicle detection may detect parts of vehicles and unusual vehicles.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for mapping features of a roadway traversed by a host vehicle, the system comprising:
   at least one processor programmed to:
   receive, from an image capture device, at least one image representative of an environment of the host vehicle, wherein the at least one image includes a plurality of image features representing a corresponding plurality of road boundary edges;
   identify, based on analysis of the plurality of image features, a predetermined number of vertical functions and a predetermined number of horizontal functions that, when taken together, map to each of the plurality of image features;
   merge the predetermined number of vertical functions and the predetermined number of horizontal functions into at least one curve representing the plurality of road boundary edges, wherein merging the functions comprises merging vectors of fixed sizes representing the predetermined number of vertical functions and the predetermined number of horizontal functions to a data structure of flexible size representing the at least one curve; and
   output the at least one curve representing the plurality of road boundary edges.

2. The system of claim 1, wherein the at least one processor is further programmed to filter one or more segments from the predetermined number of vertical functions and the predetermined number of horizontal functions, and merging the functions comprises merging the filtered vertical functions and the filtered horizontal functions.

3. A method for mapping features of a roadway traversed by a host vehicle, the method comprising:
   receiving, from an image capture device, at least one image representative of an environment of the host vehicle, wherein the at least one image includes a plurality of image features representing a corresponding plurality of road boundary edges;
   identifying, based on analysis of the plurality of image features, a predetermined number of vertical functions and a predetermined number of horizontal functions that, when taken together, map to each of the plurality of image features;
   merging the predetermined number of vertical functions and the predetermined number of horizontal functions into at least one curve representing the plurality of road boundary edges, wherein merging the functions comprises merging vectors of fixed sizes representing the predetermined number of vertical functions and the predetermined number of horizontal functions to a data structure of flexible size representing the at least one curve; and
   outputting the at least one curve representing the plurality of road boundary edges.

4. The method of claim 3, wherein the method further comprises filtering one or more segments from the predetermined number of vertical functions and the predetermined number of horizontal functions, and merging the functions comprises merging the filtered vertical functions and the filtered horizontal functions.

5. A system for mapping features of a roadway traversed by a host vehicle, the system comprising:
   at least one processor programmed to:
   receive, from an image capture device, at least one image representative of an environment of the host vehicle, wherein the at least one image includes a plurality of image features representing a corresponding plurality of road boundary edges;
   identify, based on analysis of the plurality of image features, a predetermined number of vertical functions and a predetermined number of horizontal functions that, when taken together, map to each of the plurality of image features;
   output the identified predetermined number of vertical functions and the identified predetermined number of horizontal functions mapping to the plurality of image features representative of the corresponding plurality of road boundary edges;
   merge the identified predetermined number of vertical functions and the identified predetermined number of horizontal functions into at least one curve representing the plurality of road boundary edges, wherein merging the identified predetermined number of vertical and horizontal functions comprises merging vectors of fixed sizes representing the identified predetermined number of vertical functions and the identified predetermined number of horizontal functions to a data structure of flexible size representing the at least one curve; and
   output the at least one curve representing the plurality of road boundary edges.

6. The system of claim 5, wherein the predetermined number of vertical functions includes at least two vertical functions.

7. The system of claim 5, wherein the predetermined number of vertical functions includes at least four vertical functions.

8. The system of claim 5, wherein the predetermined number of horizontal functions includes at least three horizontal functions.

9. The system of claim 5, wherein the predetermined number of horizontal functions includes at least six horizontal functions.

10. The system of claim 5, wherein the predetermined number of vertical functions includes up to four vertical functions.

11. The system of claim 5, wherein the predetermined number of horizontal functions includes up to six horizontal functions.

12. The system of claim 5, wherein the plurality of road boundary edges includes at least one road edge.

13. The system of claim 5, wherein the plurality of road boundary edges includes at least one road barrier edge.

14. The system of claim 13, wherein the at least one road barrier edge is associated with at least one of a curb, guardrail, lane divider, or Jersey wall.

15. The system of claim 5, wherein the plurality of road boundary edges includes at least a first road edge associated with a road on which the host vehicle is traveling and at least a second road edge associated with a crossing road that intersects the road on which the host vehicle is traveling.

16. The system of claim 5, wherein the plurality of road boundary edges includes at least one road edge associated with a road on which the host vehicle is traveling and at least one road barrier edge, and wherein the at least one processor is further programmed to determine a height difference between the at least one road edge and the at least one road barrier edge based on analysis of the at least one image.

17. The system of claim 5, wherein the at least one processor is further programmed to cause transmission to a server remotely located with respect to the host vehicle of the identified predetermined number of vertical functions and the identified predetermined number of horizontal functions.

18. The system of claim 5, wherein the predetermined number of horizontal functions includes at least one horizontal function, and wherein the predetermined number of vertical functions includes at least one vertical function.

19. The system of claim 5, wherein the at least one processor is further programmed to:
 filter the identified predetermined number of vertical functions and the identified predetermined number of horizontal functions by removing segments from at least one of the identified predetermined number of vertical functions and the identified predetermined number of horizontal functions that are determined as not coinciding with at least one of the plurality of image features representing the corresponding plurality of road boundary edges.

20. The system of claim 19, wherein the at least one processor is further programmed to cause transmission to a server remotely located with respect to the host vehicle of the filtered identified predetermined number of vertical functions and the filtered identified predetermined number of horizontal functions.

21. The system of claim 19, wherein filtering of the identified predetermined number of vertical functions and the identified predetermined number of horizontal functions includes removing segments of any of the identified predetermined number of vertical or horizontal functions determined to cross a representation of a road in the at least one image.

22. The system of claim 19, wherein filtering of the identified predetermined number of vertical functions and the identified predetermined number of horizontal functions includes removing segments of any of the identified predetermined number of vertical or horizontal functions determined to correspond to a representation of a horizon in the at least one image.

23. The system of claim 5, wherein the at least one processor is further programmed to subject the identified predetermined number of vertical functions and the identified predetermined number of horizontal functions to a unification process.

24. The system of claim 23, wherein the unification process includes averaging of one or more segments of the identified predetermined number of vertical functions and the identified predetermined number of horizontal functions.

25. The system of claim 23, wherein the unification process includes generating the at least one curve for a particular image feature corresponding to a particular road boundary edge based on whether two or more of the identified predetermined number of vertical functions and the identified predetermined number of horizontal functions map to the particular image feature corresponding to the particular road boundary edge.

26. The system of claim 9, wherein the plurality of image features representing the corresponding plurality of road boundary edges are identified using a trained system.

27. The system of claim 26, wherein the trained system includes a neural network.

* * * * *